March 20, 1956   J. T. MacISAAC, JR., ET AL   2,738,746
APPARATUS FOR MAKING BED SHEETS AND THE LIKE
Filed June 4, 1952                                    30 Sheets-Sheet 4
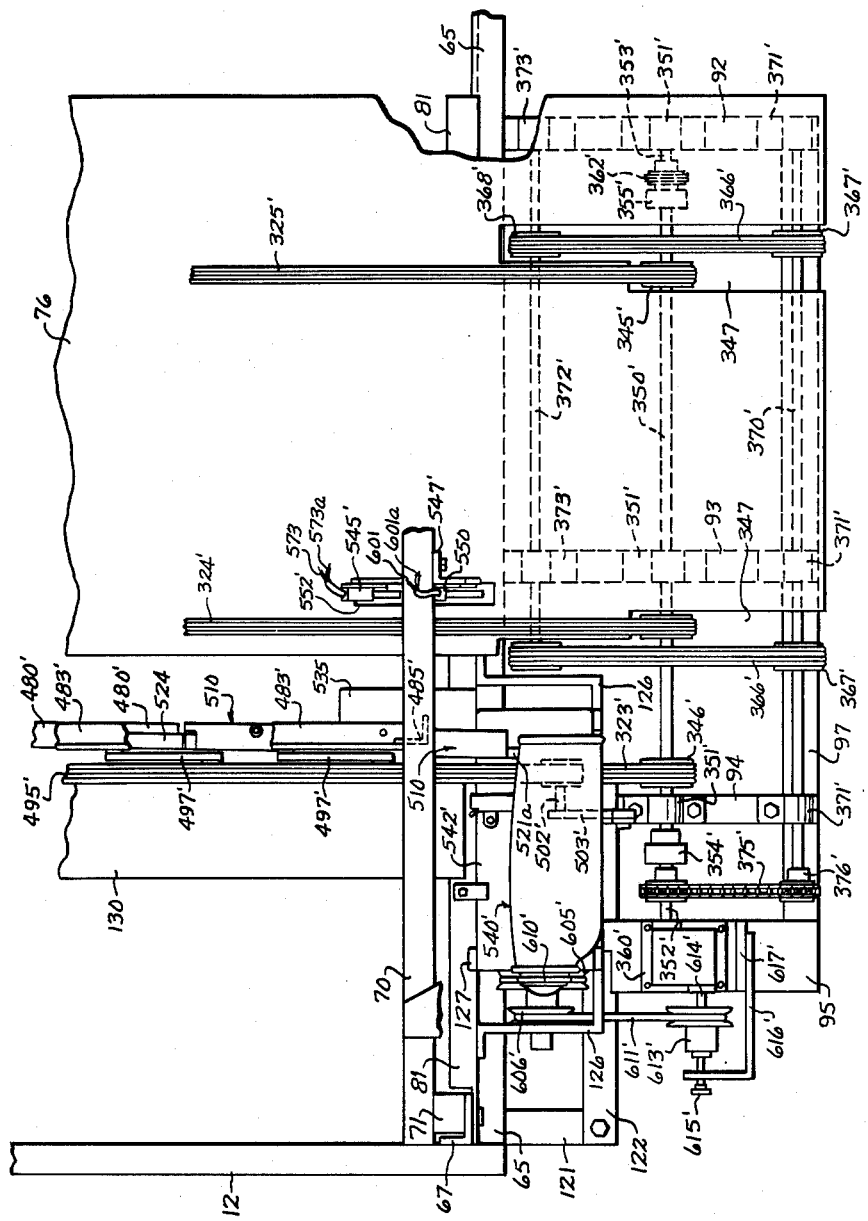
INVENTORS:
JOHN T. MacISAAC, JR.
and
ROBERT L. SELF.
BY Eaton & Bell
ATTORNEYS.

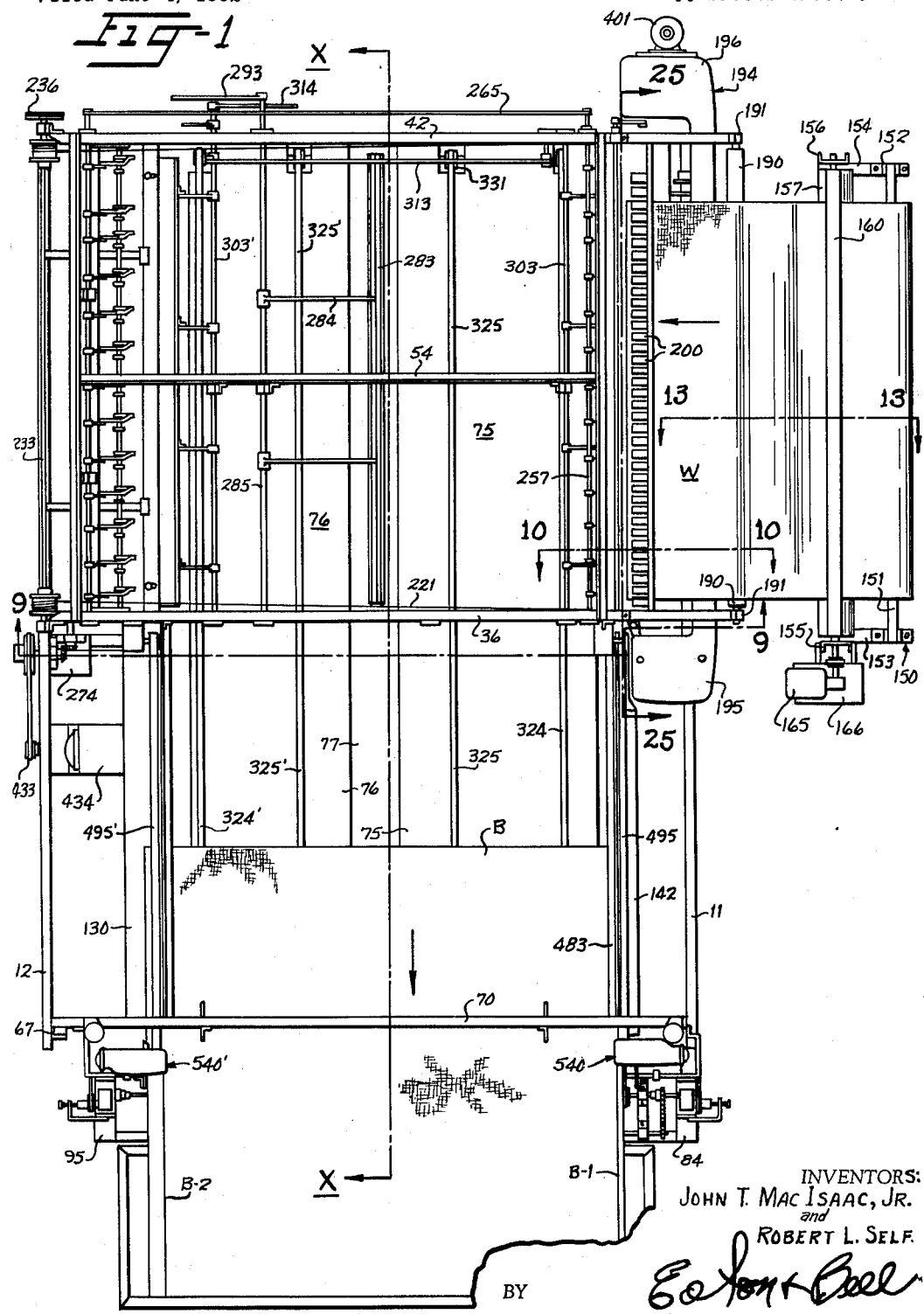

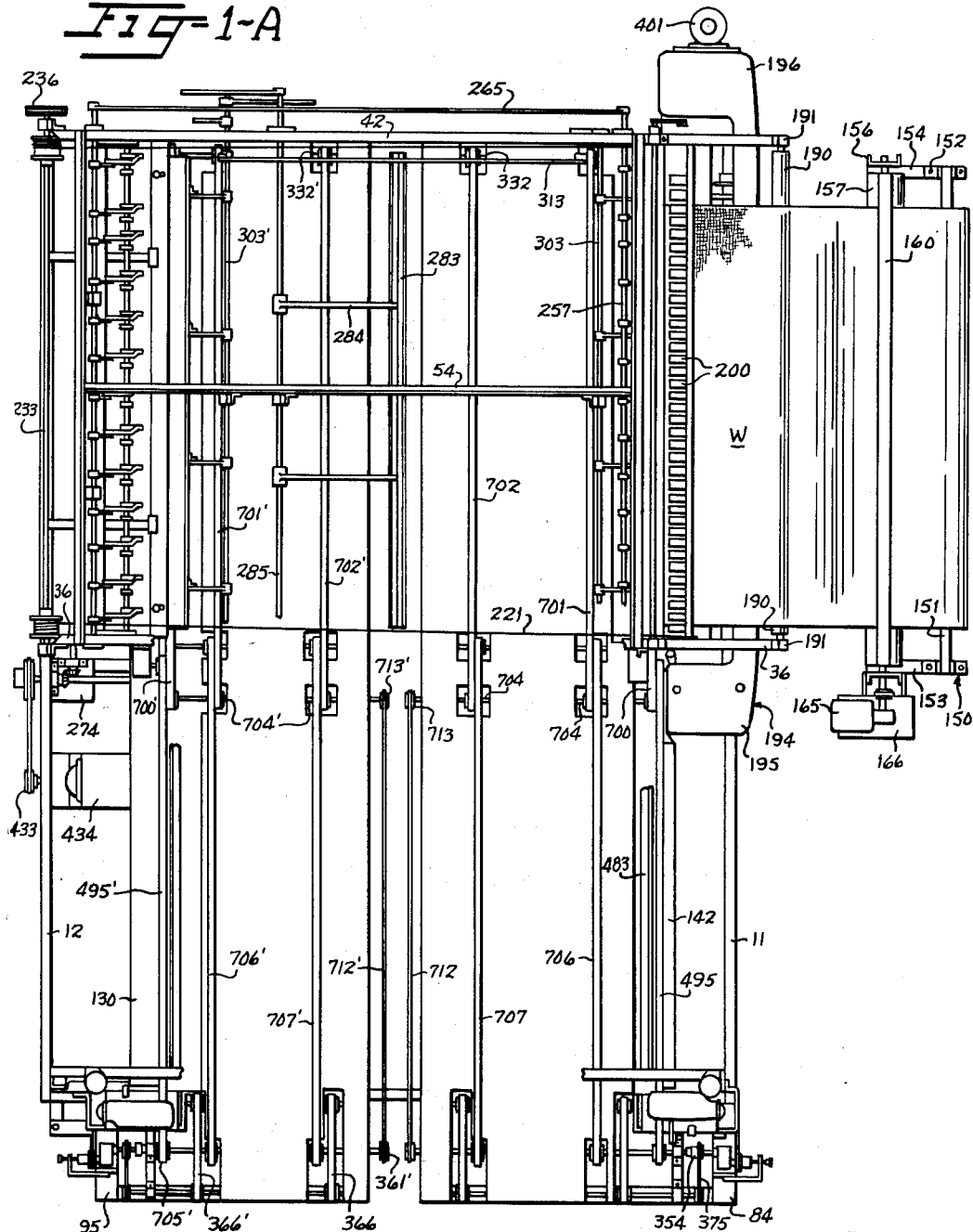

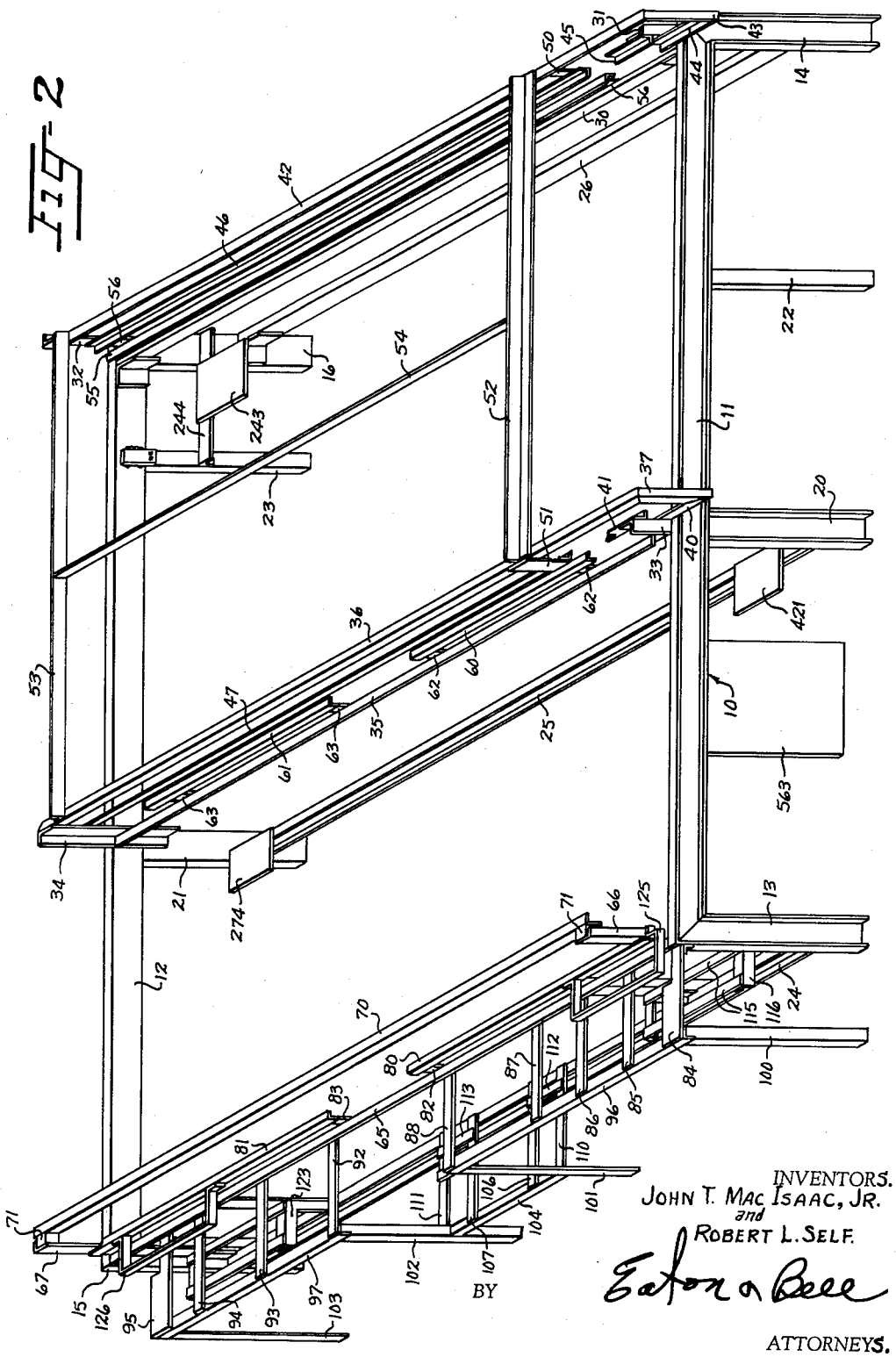

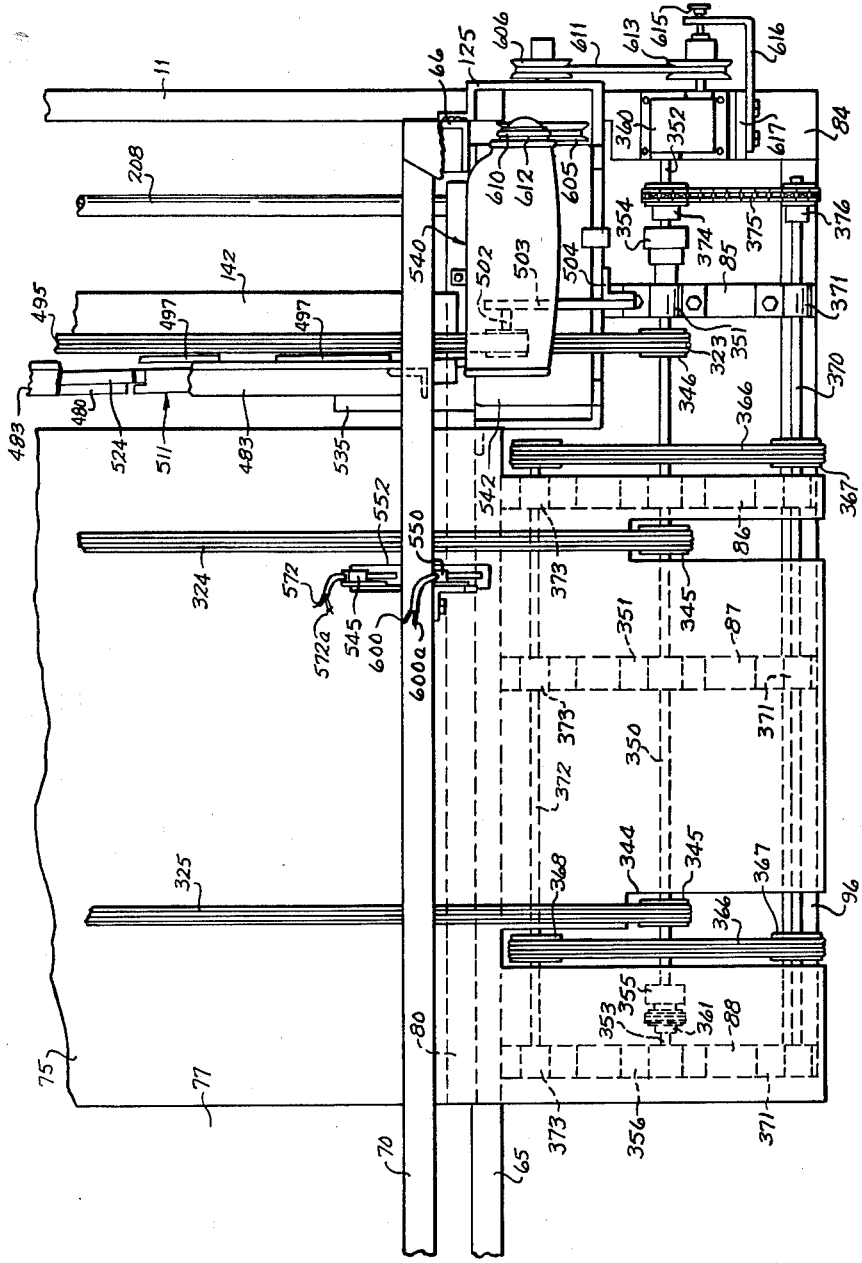

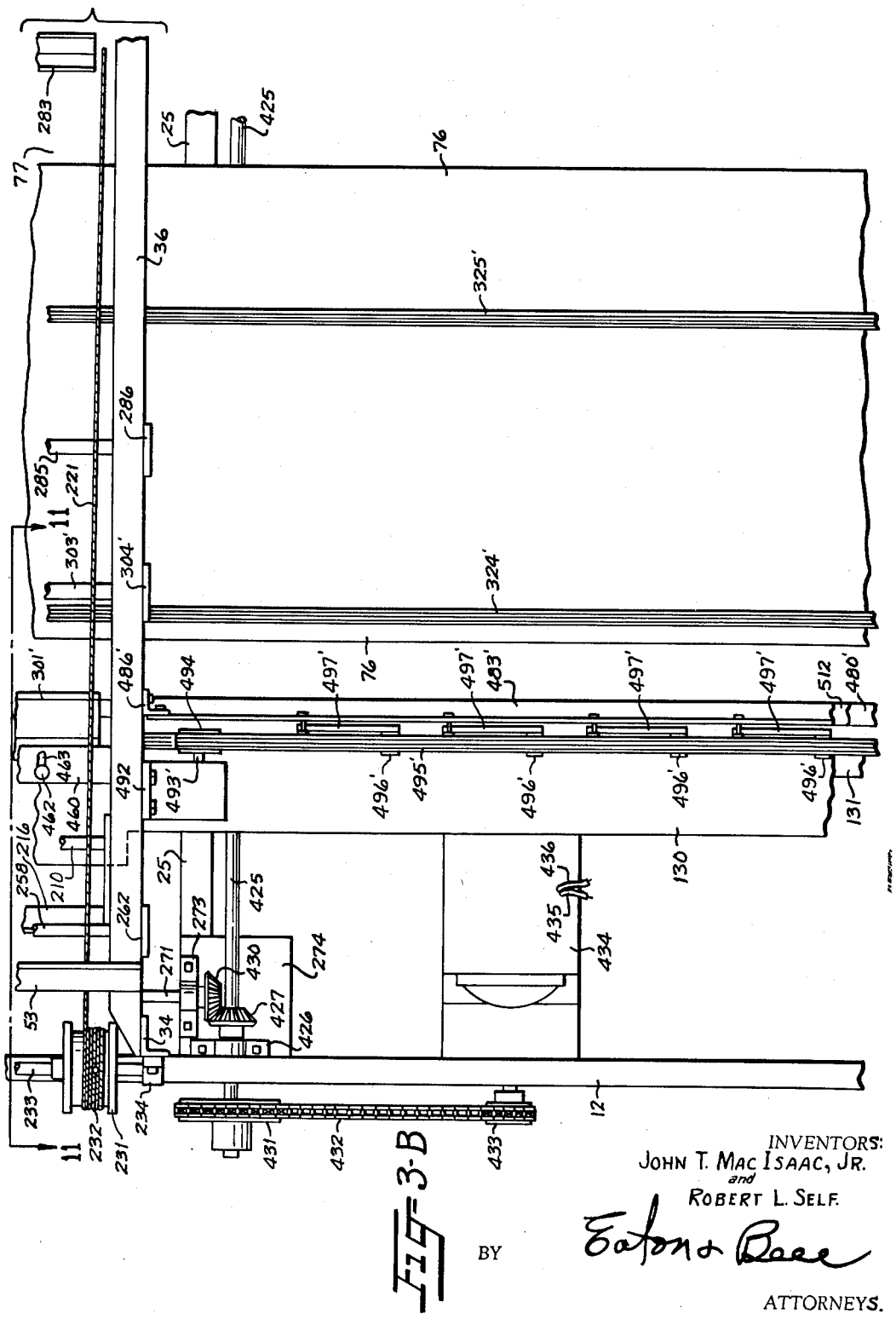

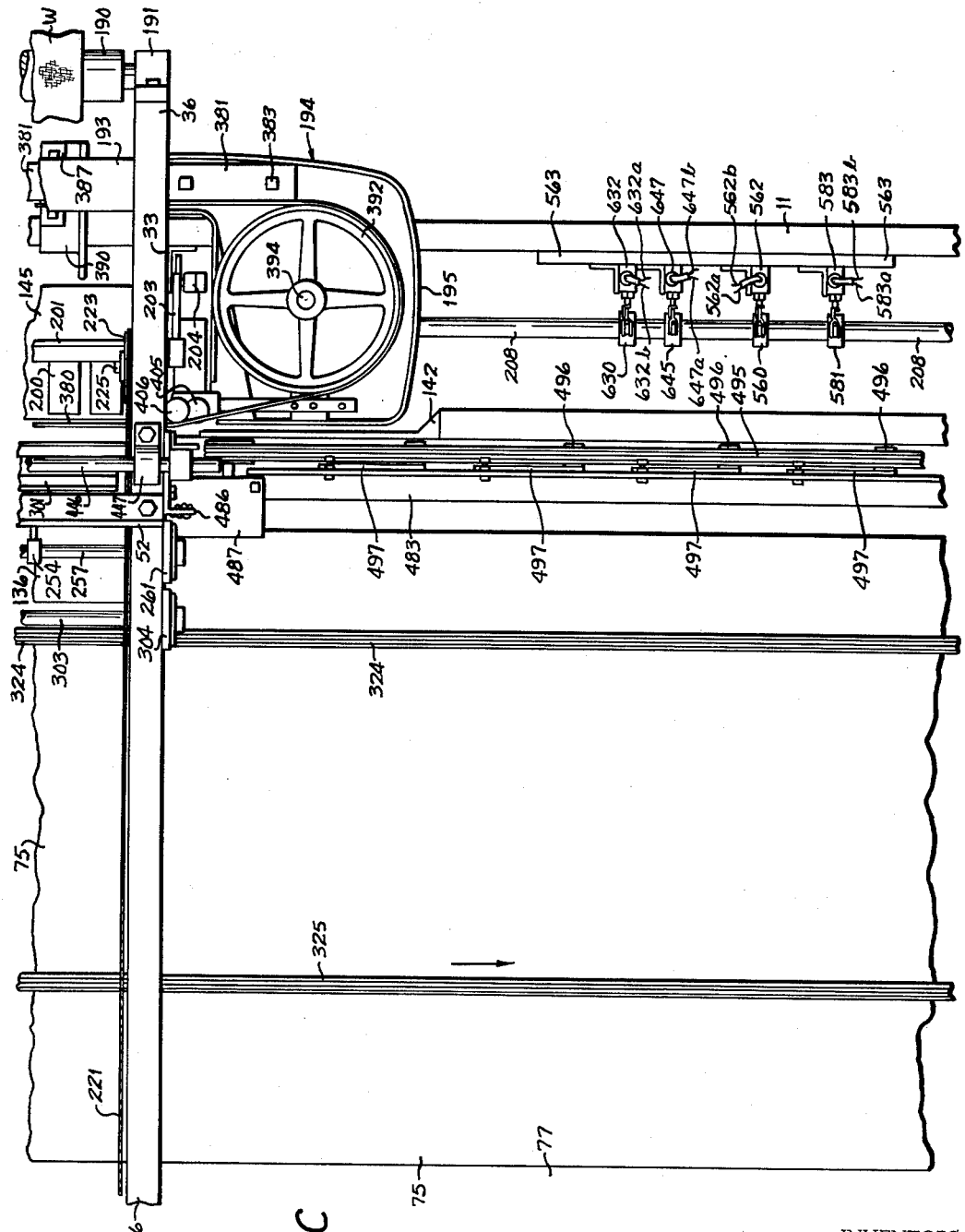

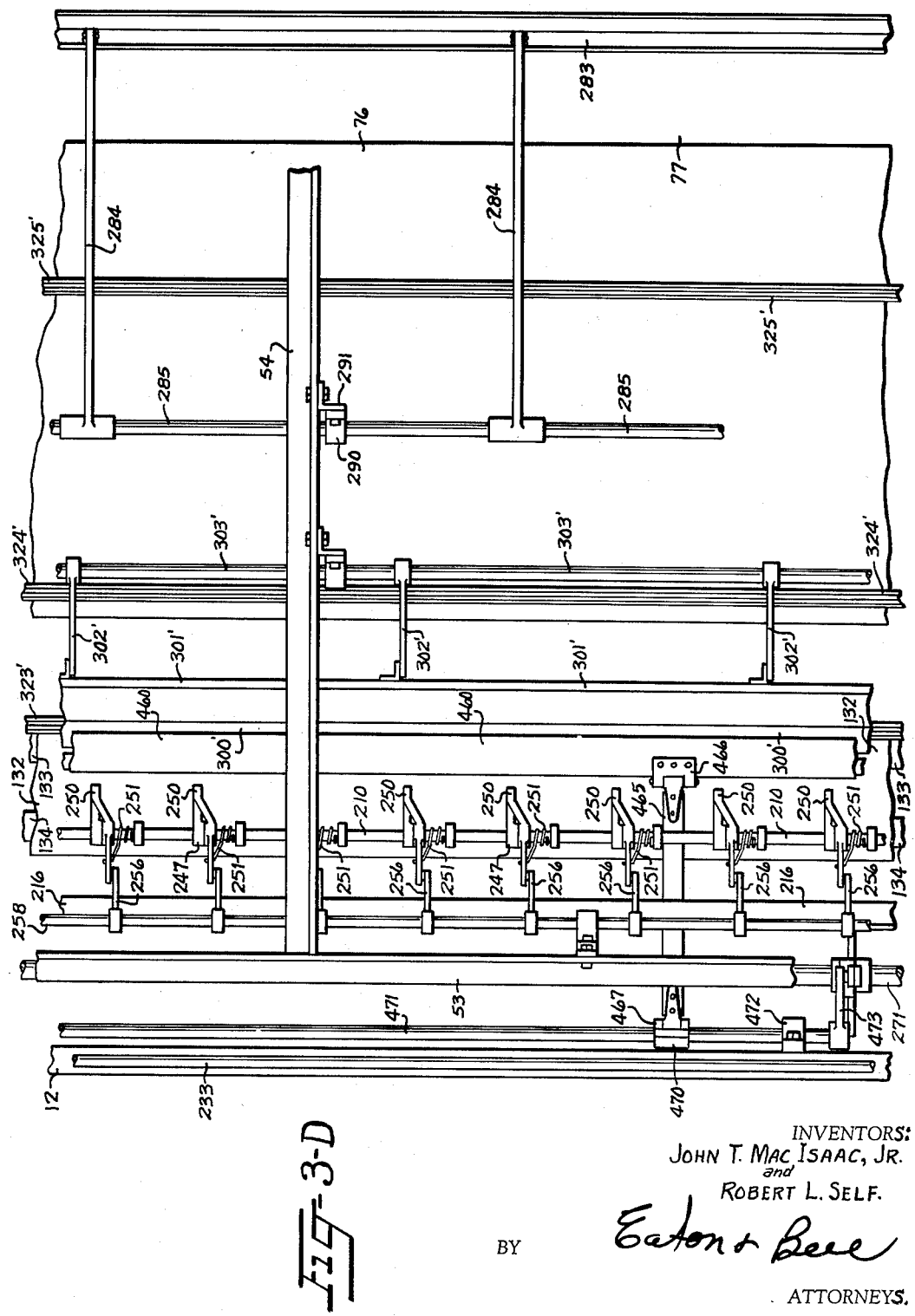

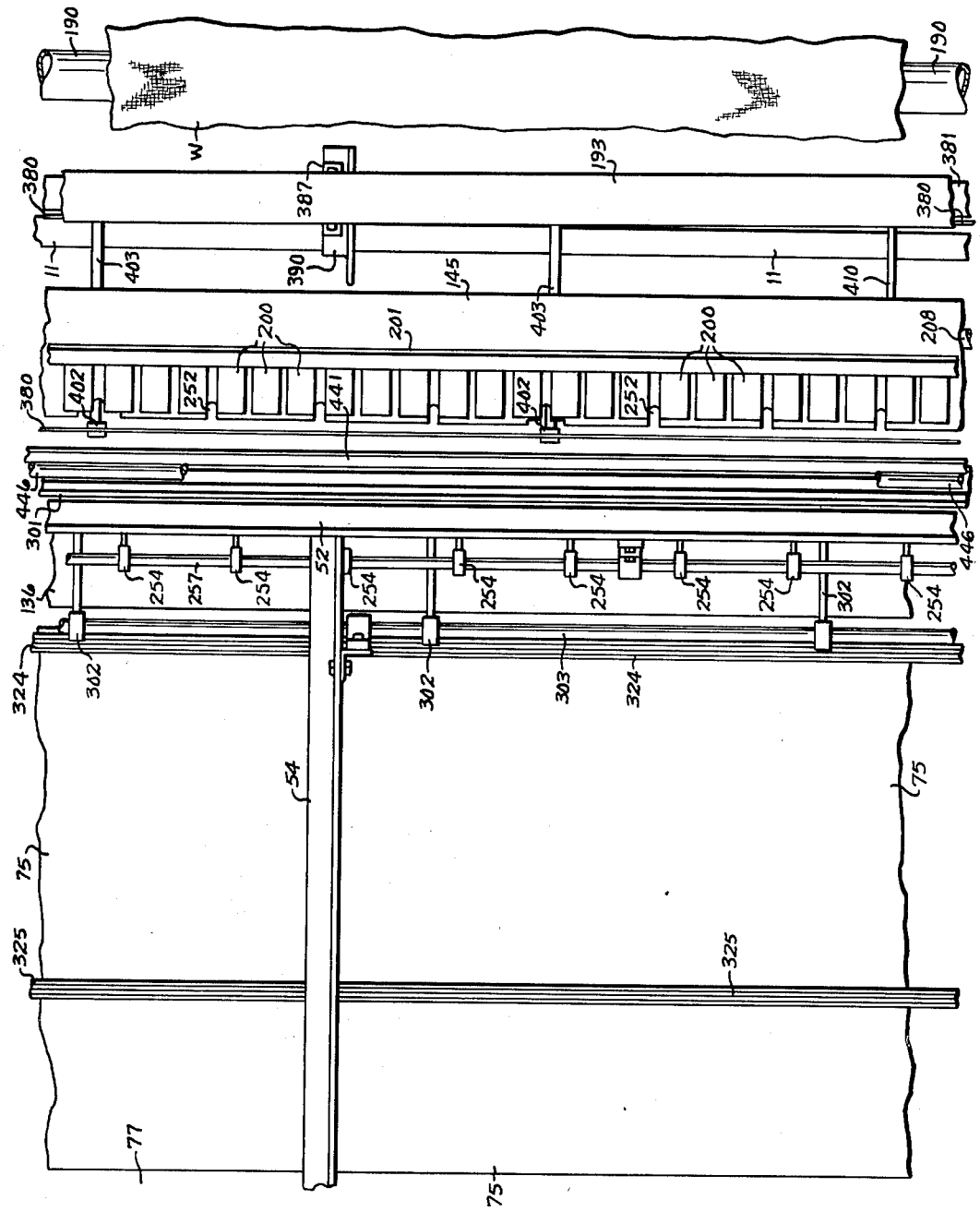

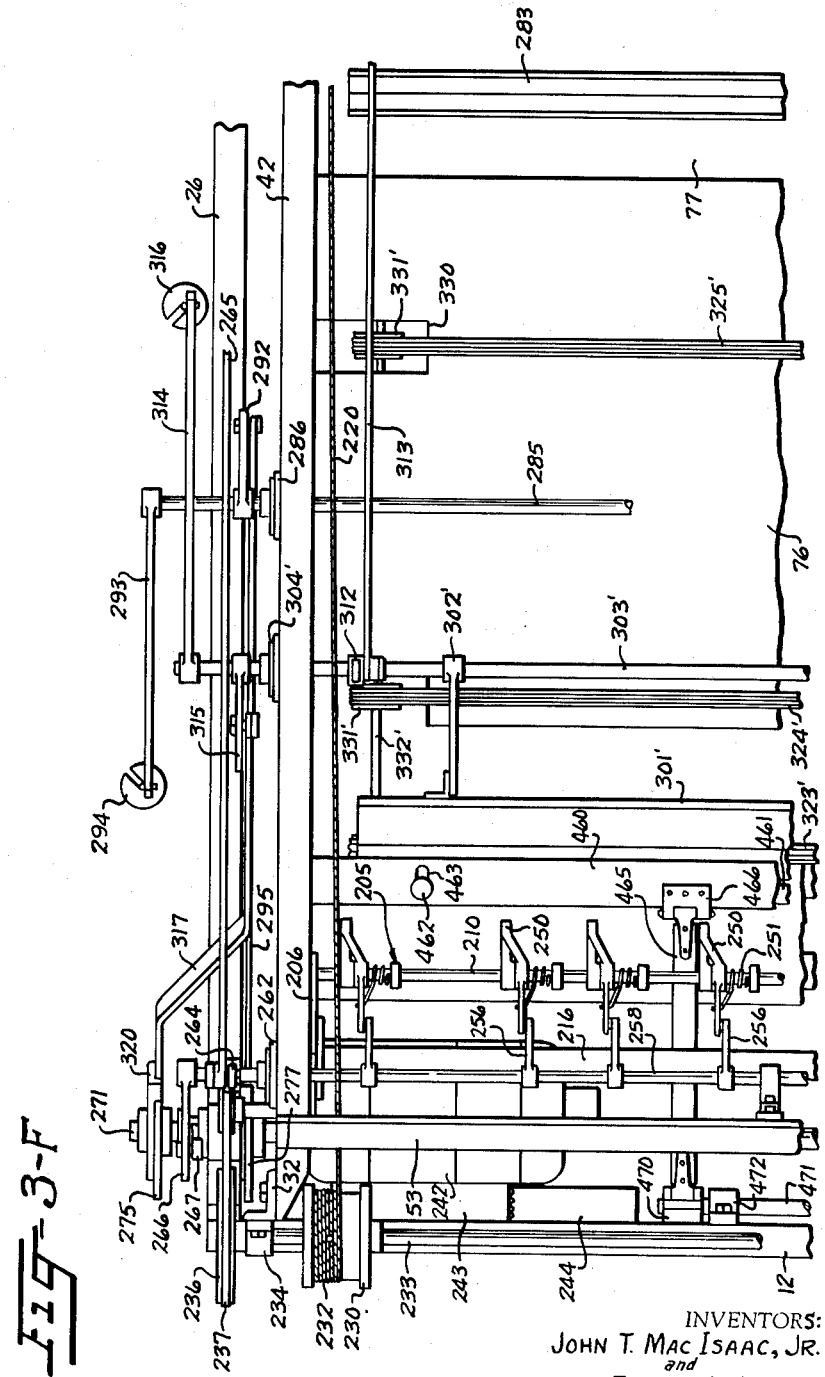

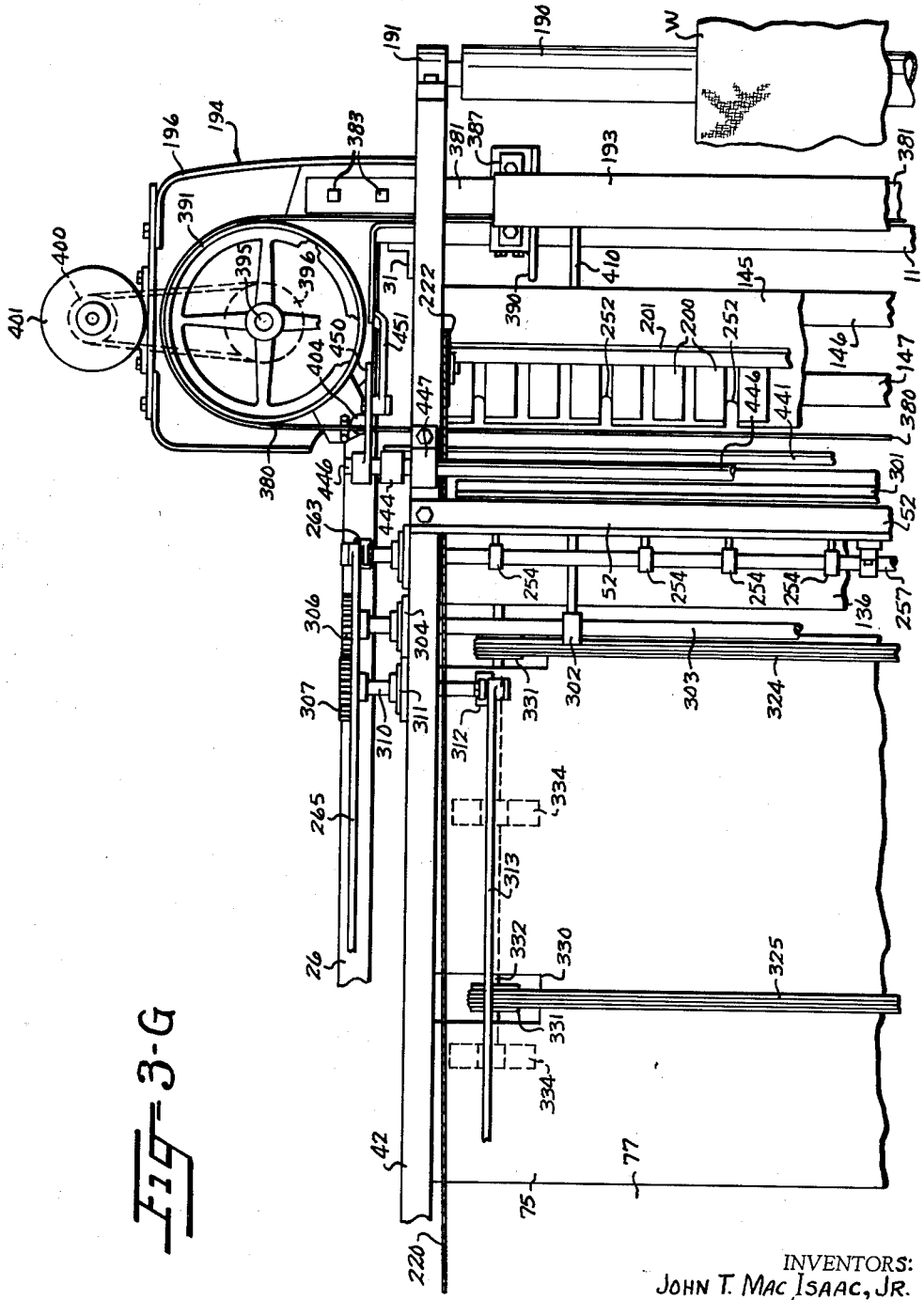

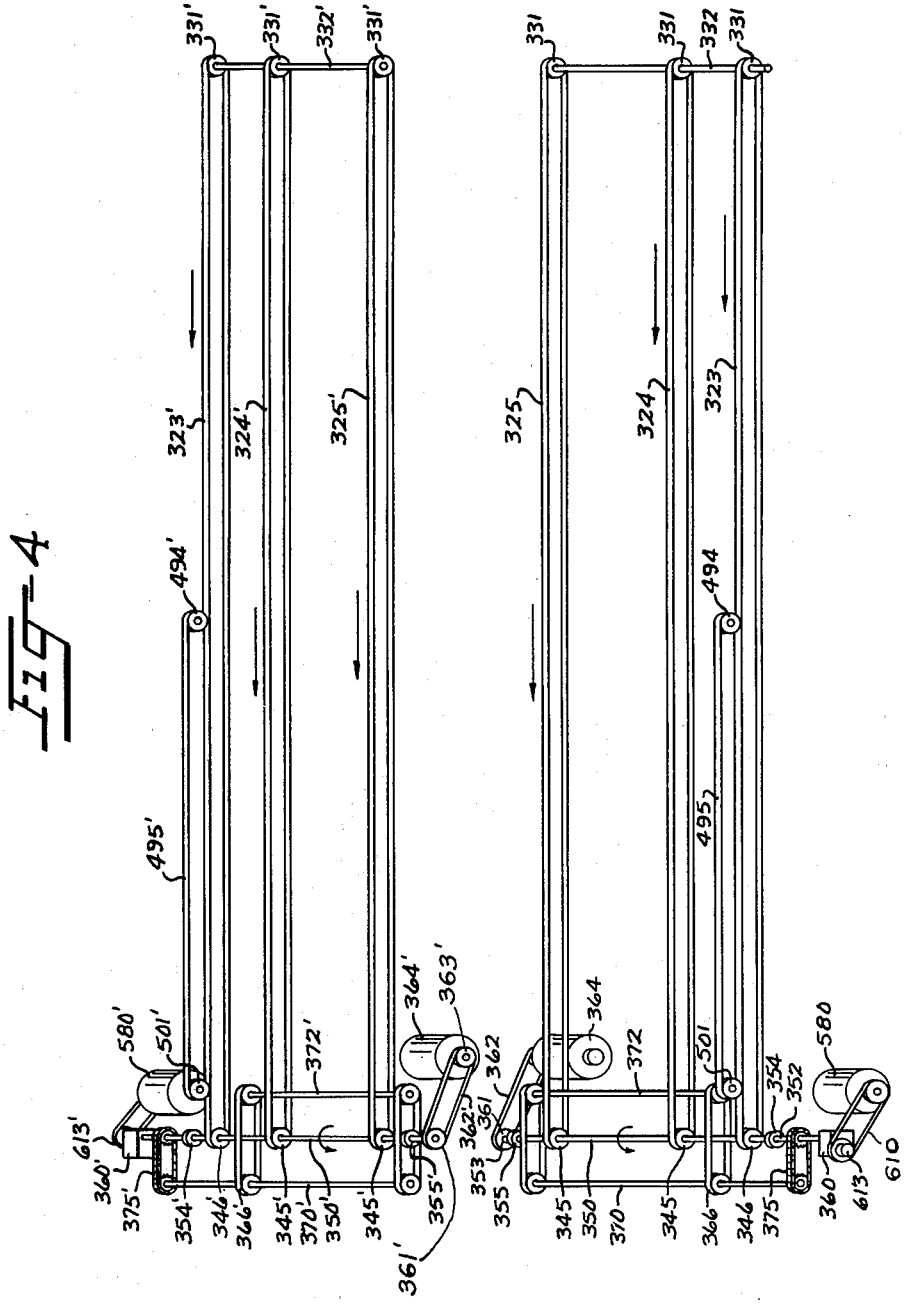

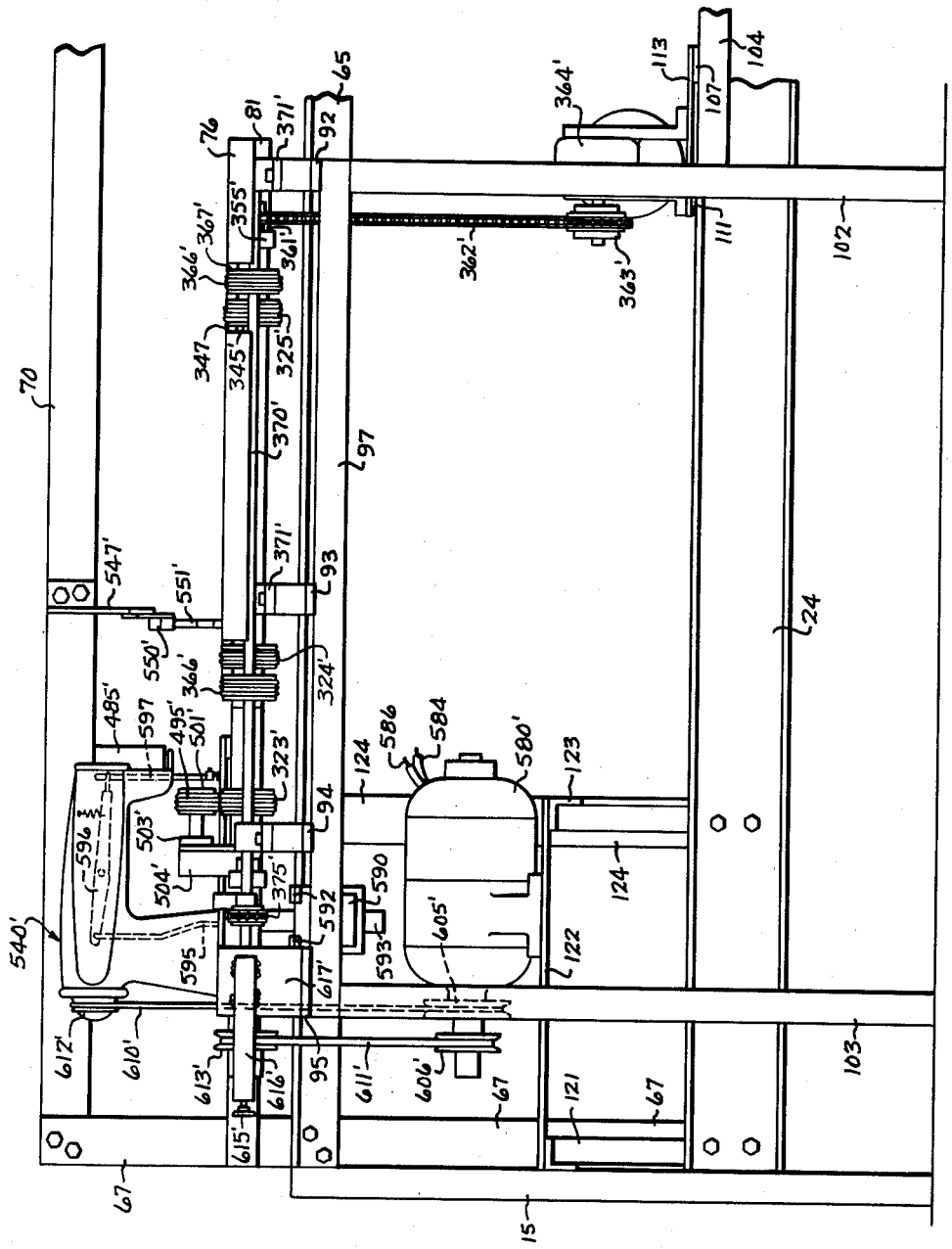

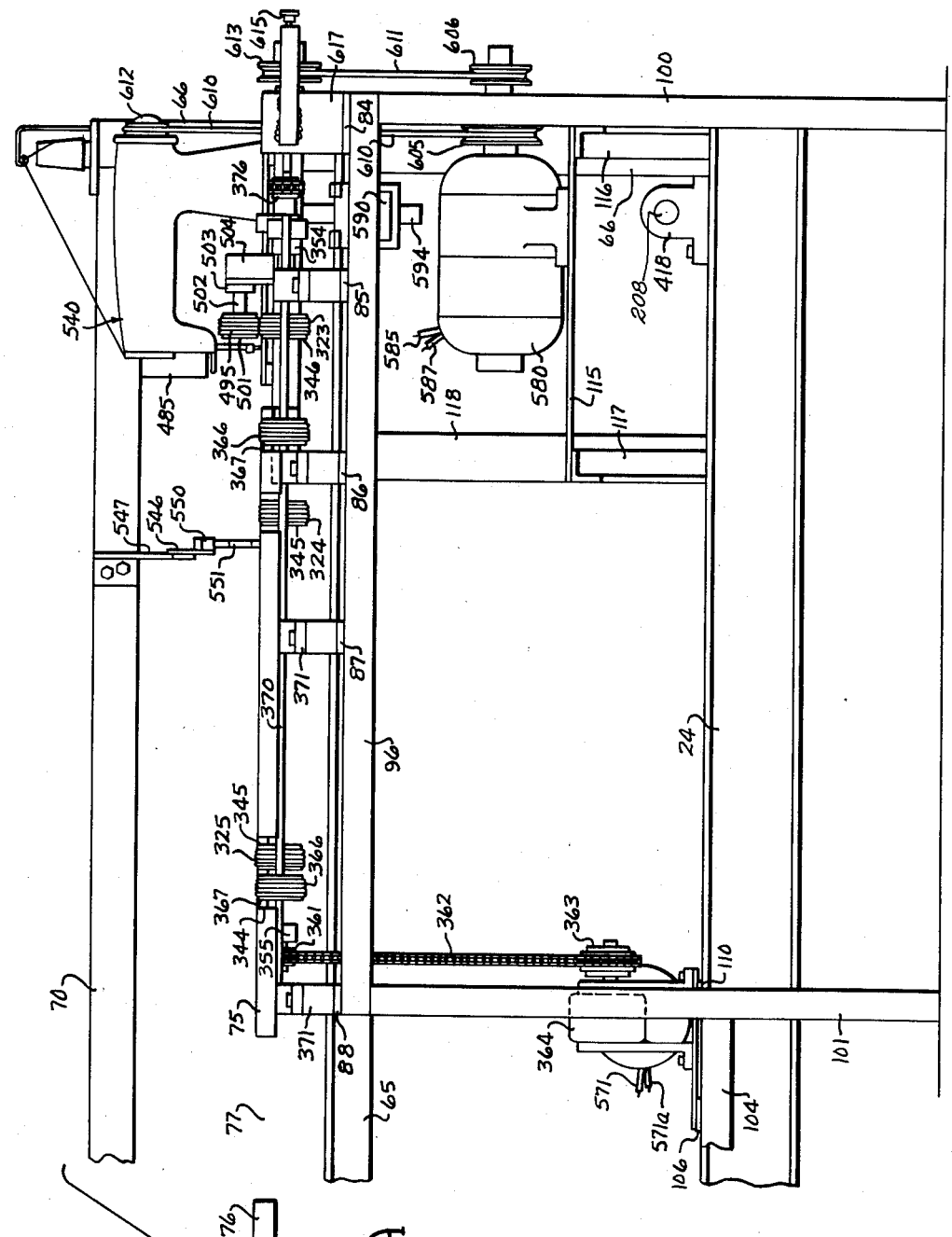

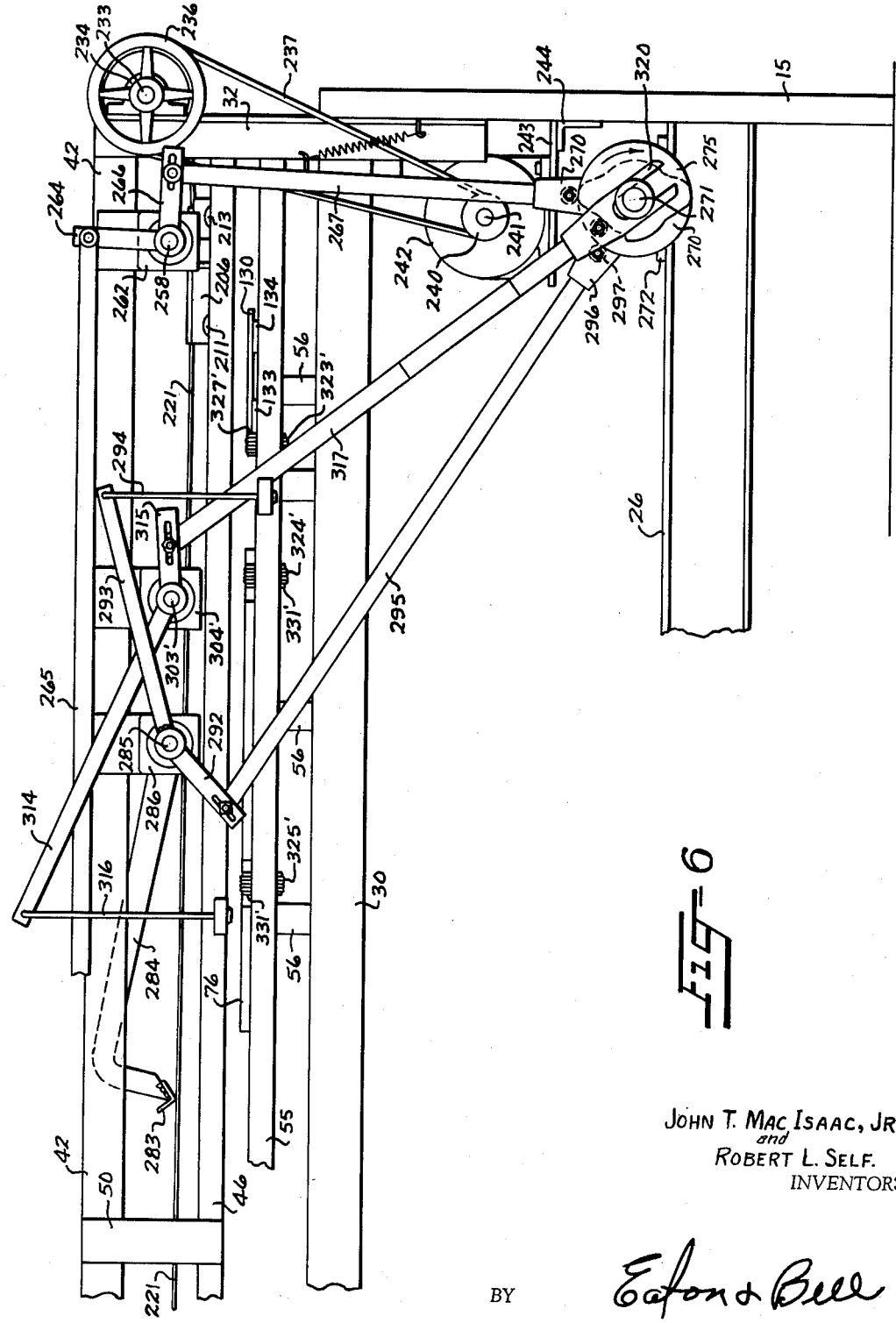

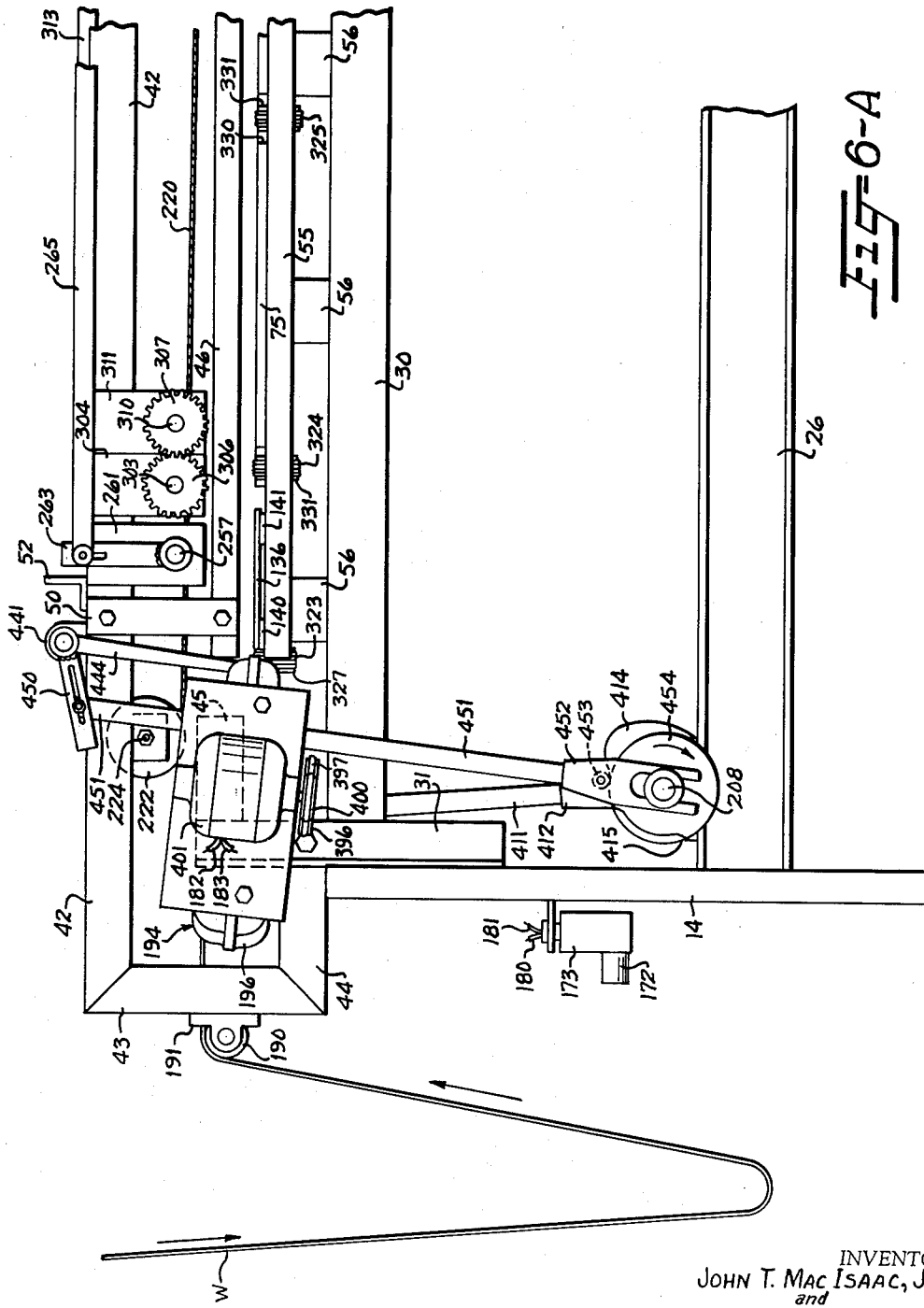

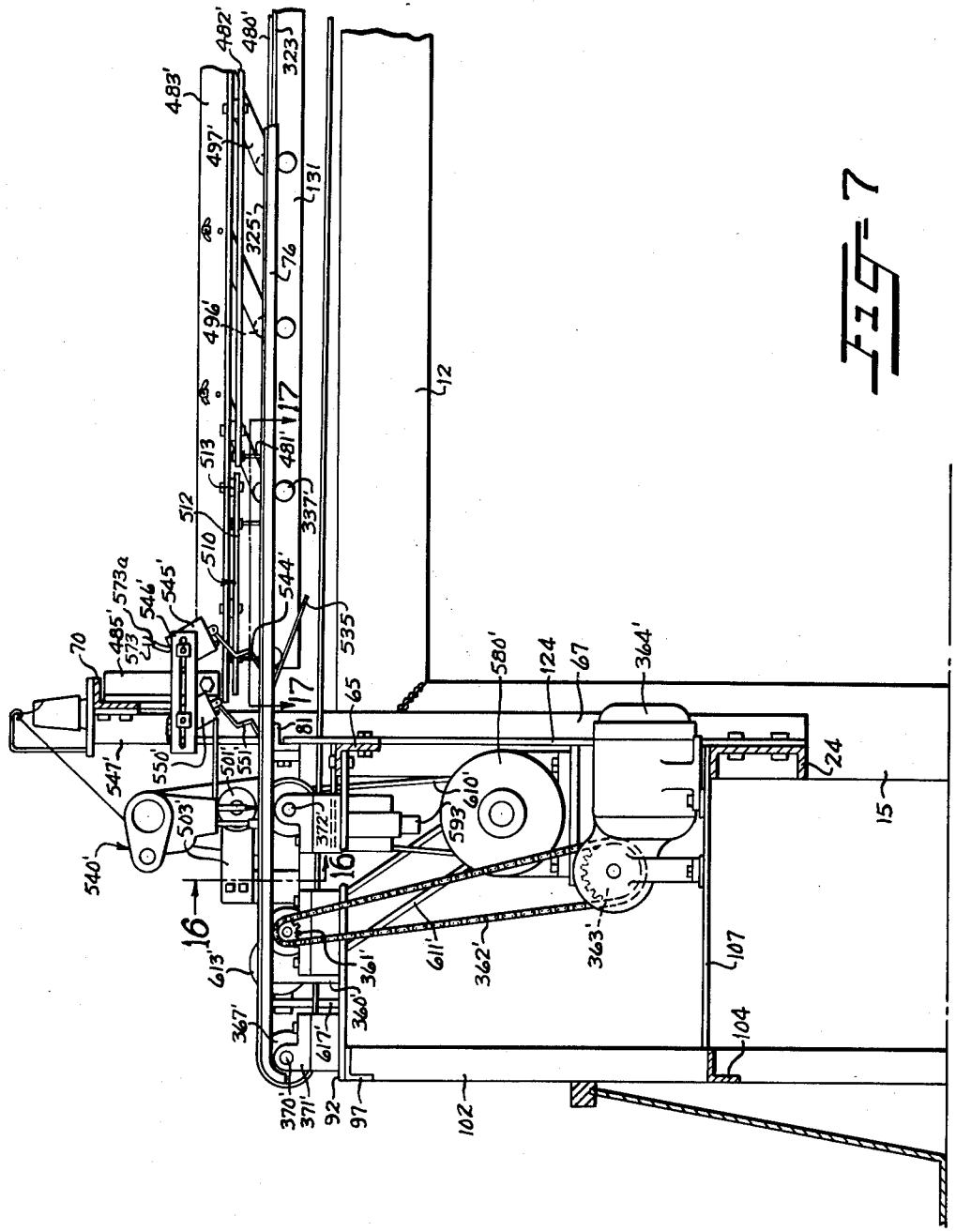

March 20, 1956 J. T. MacISAAC, JR., ET AL 2,738,746
APPARATUS FOR MAKING BED SHEETS AND THE LIKE
Filed June 4, 1952 30 Sheets-Sheet 18
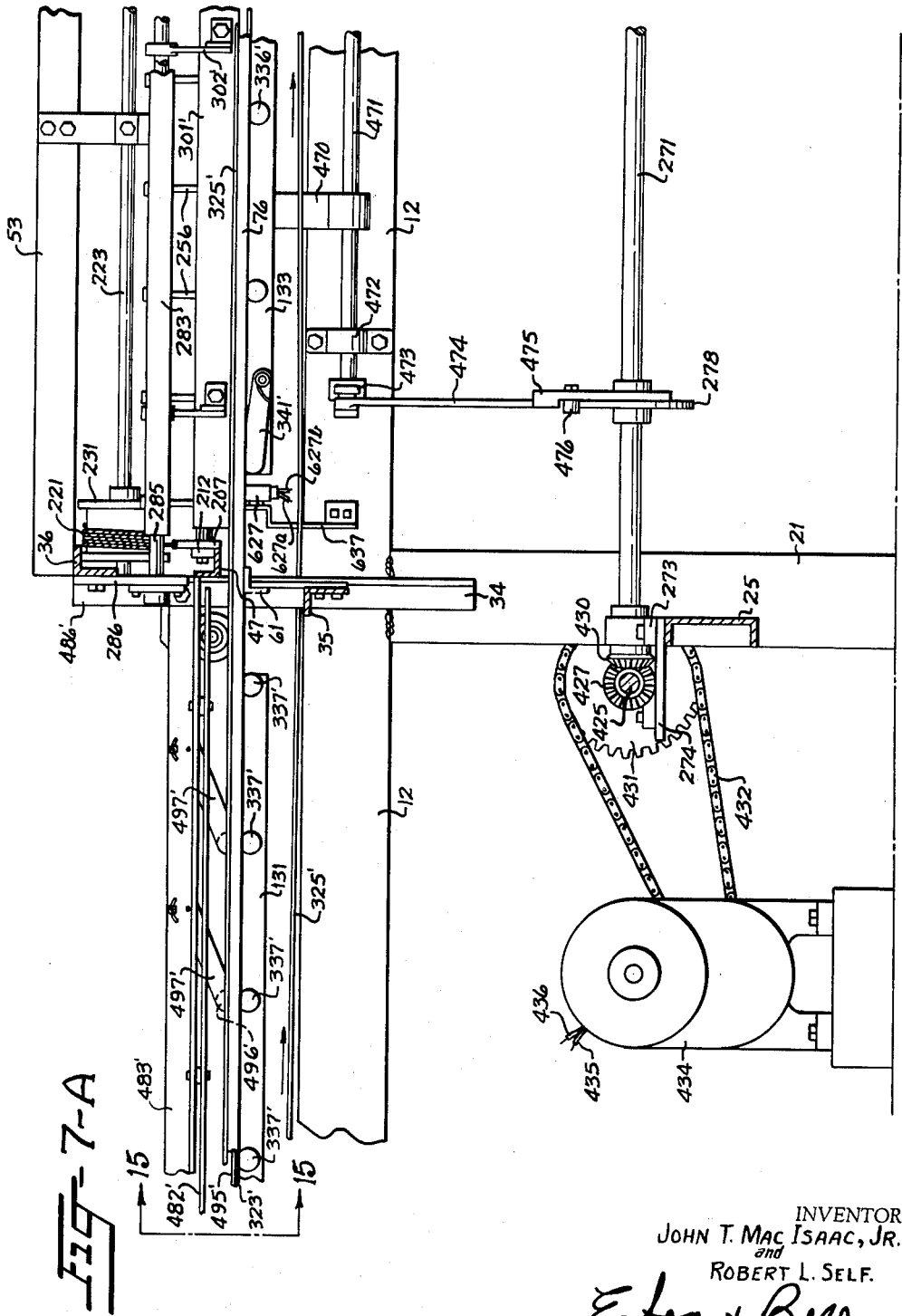
INVENTORS:
JOHN T. MAC ISAAC, JR.
and
ROBERT L. SELF.
BY Eaton + Bell
ATTORNEYS.

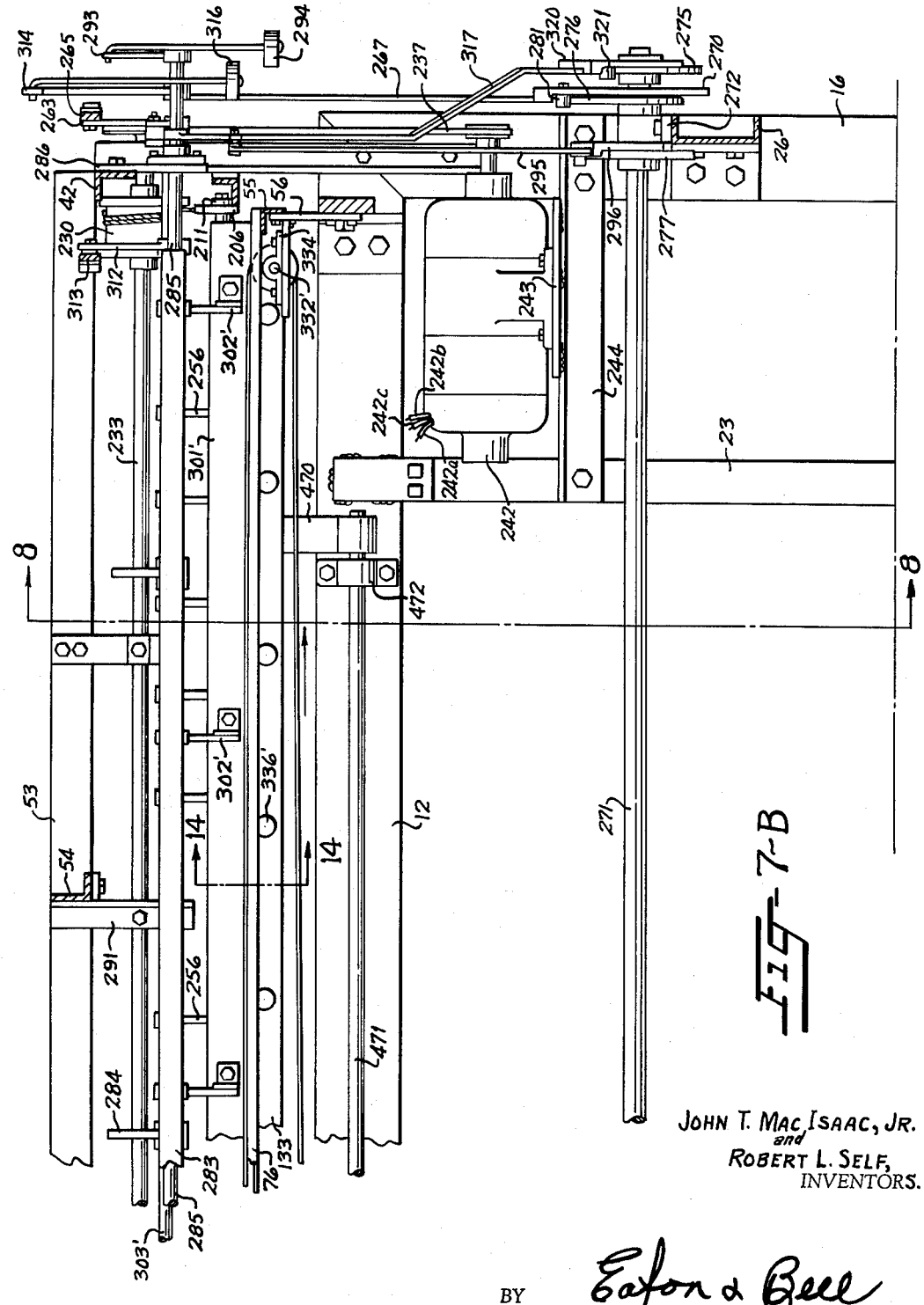

March 20, 1956  J. T. MacISAAC, JR., ET AL  2,738,746
APPARATUS FOR MAKING BED SHEETS AND THE LIKE
Filed June 4, 1952  30 Sheets-Sheet 20
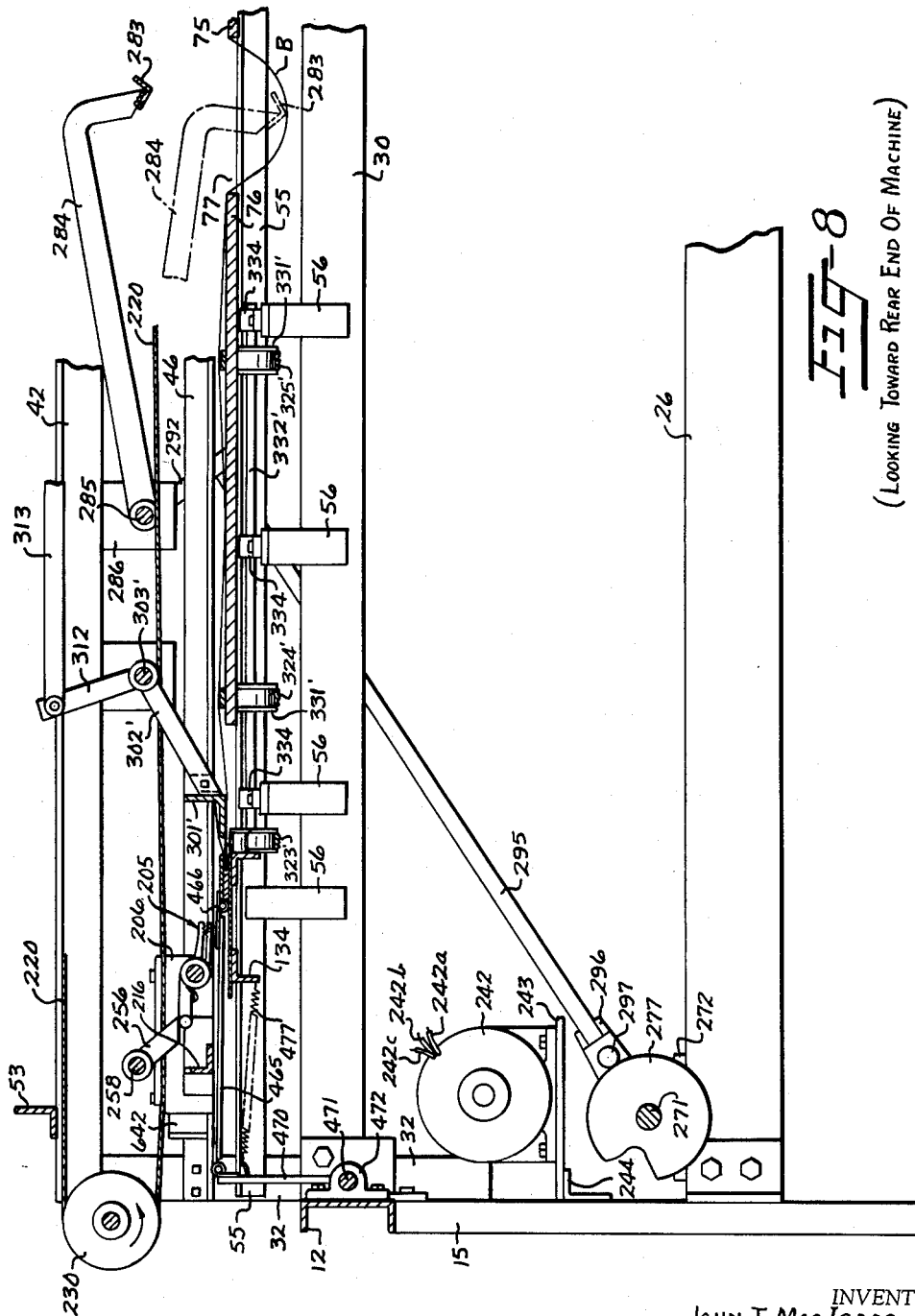
INVENTORS
JOHN T. MAC ISAAC, JR.
and
ROBERT L. SELF.
BY  Eaton + Bell
ATTORNEYS.

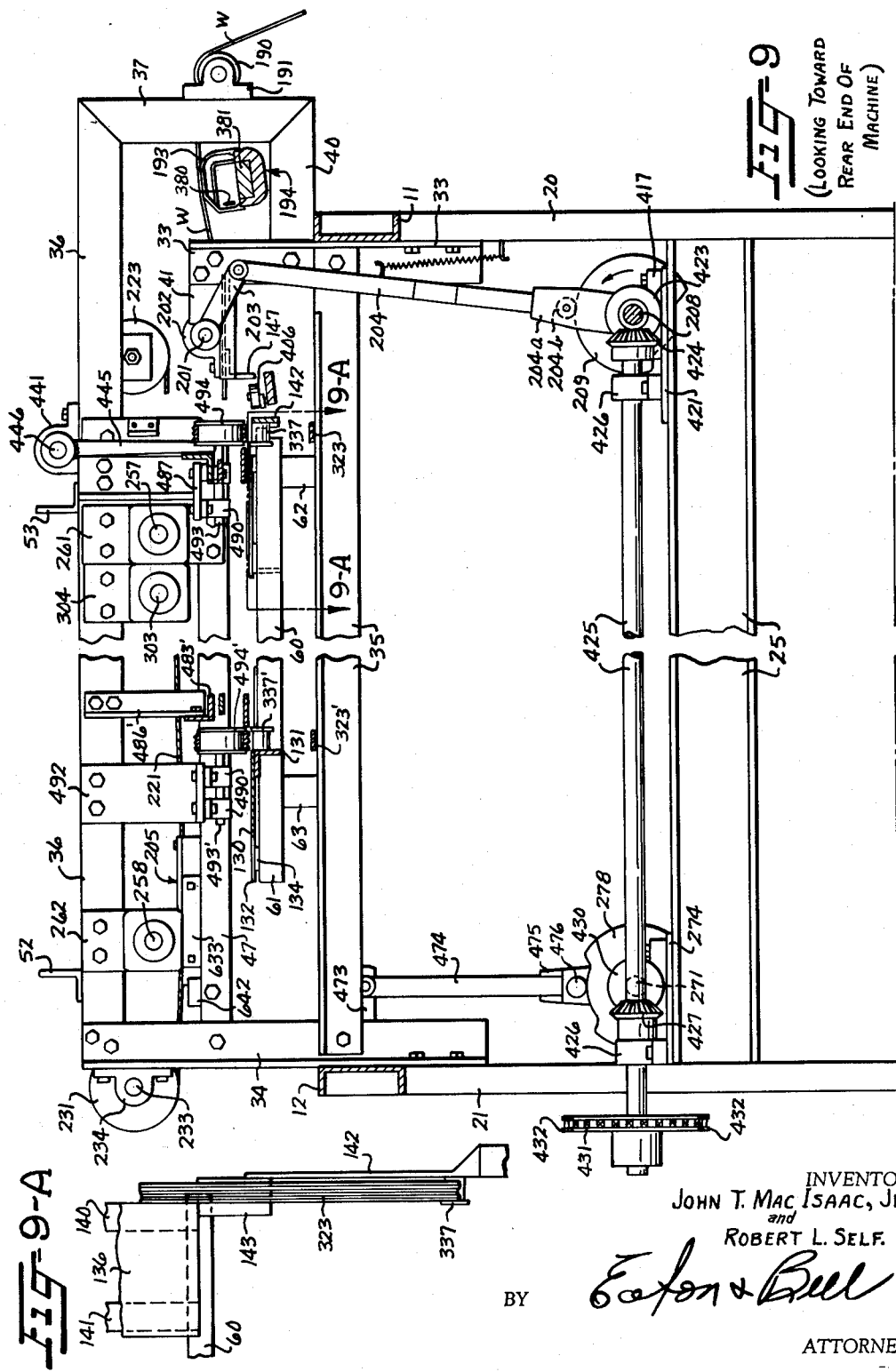

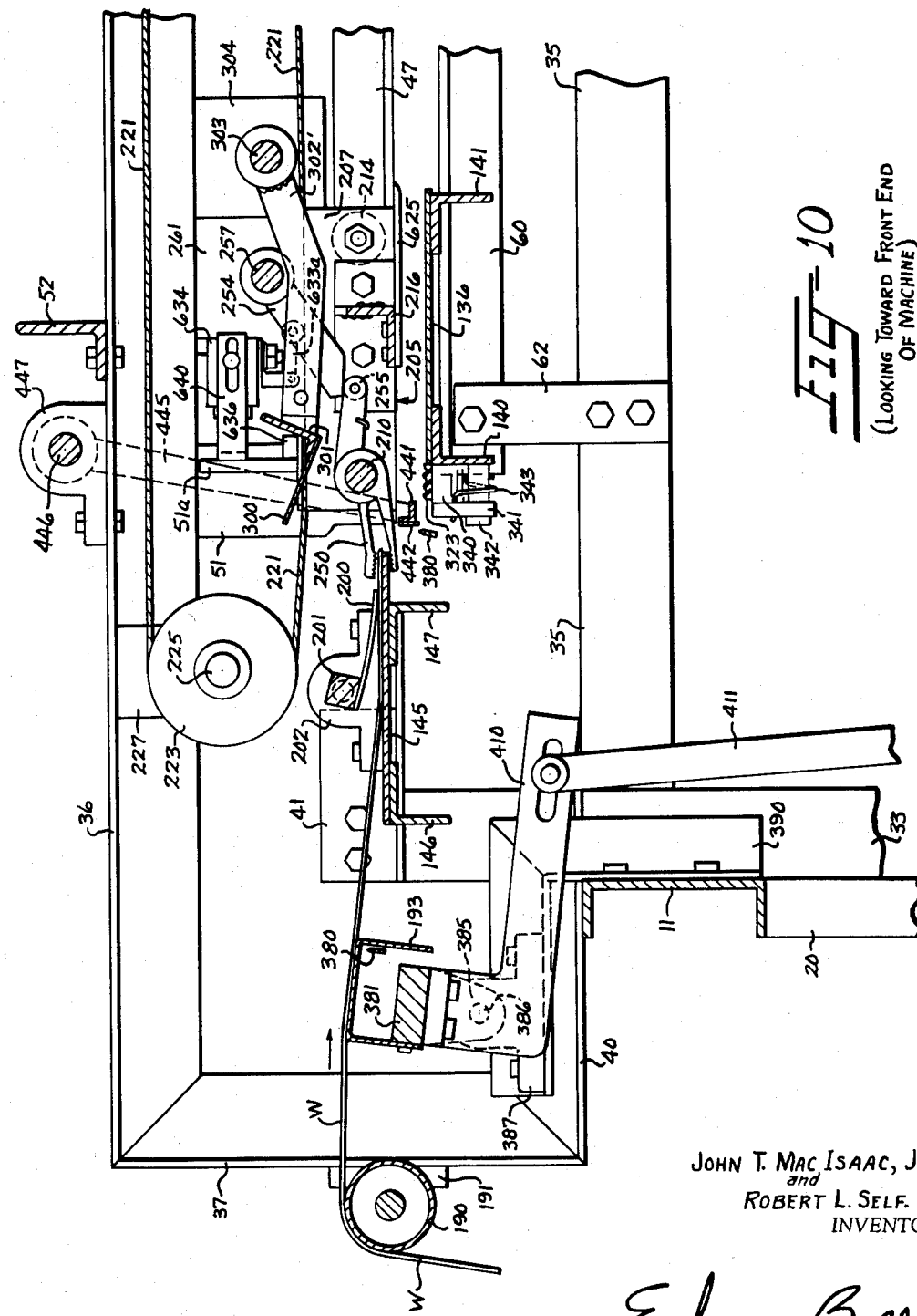

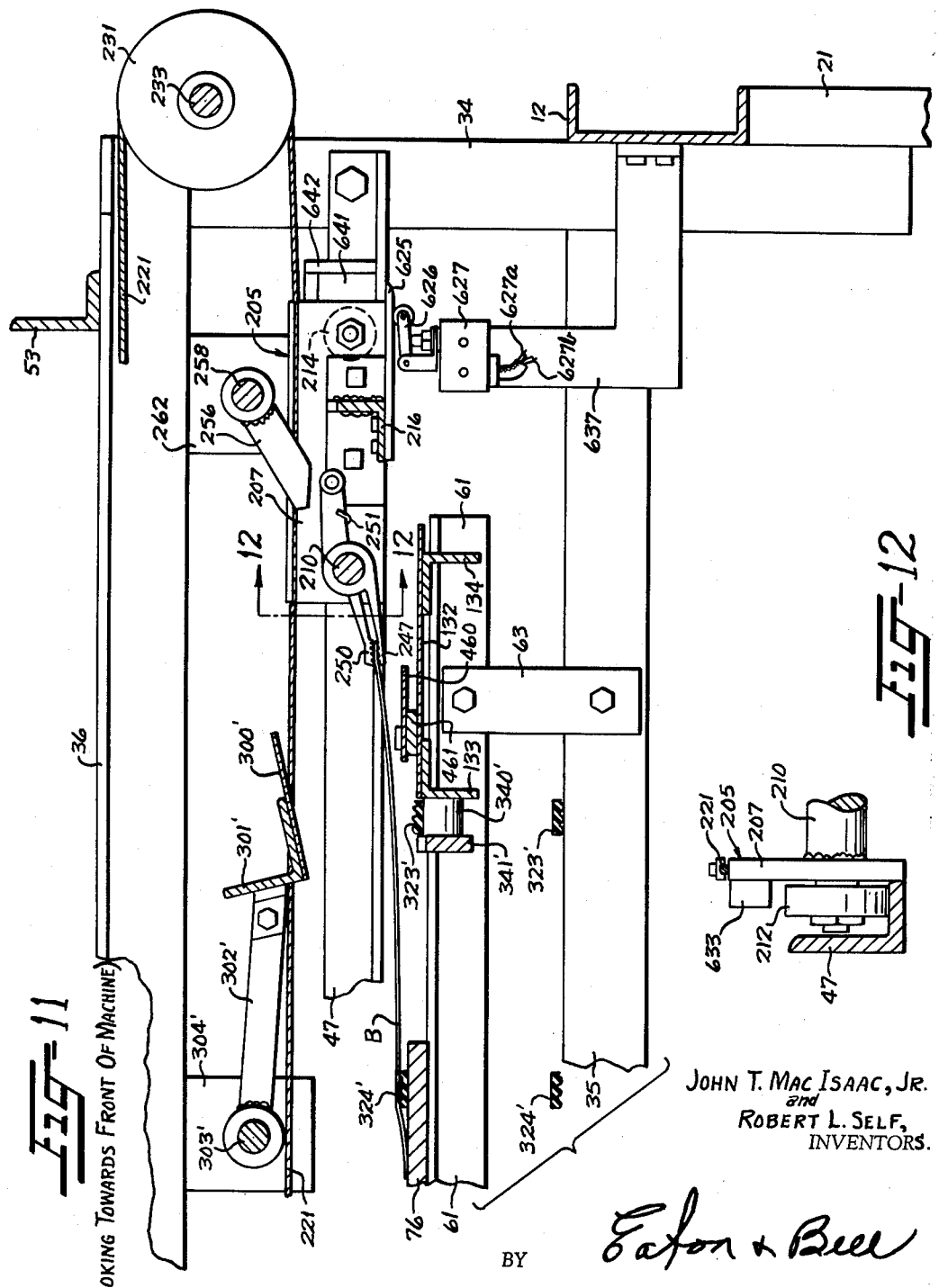

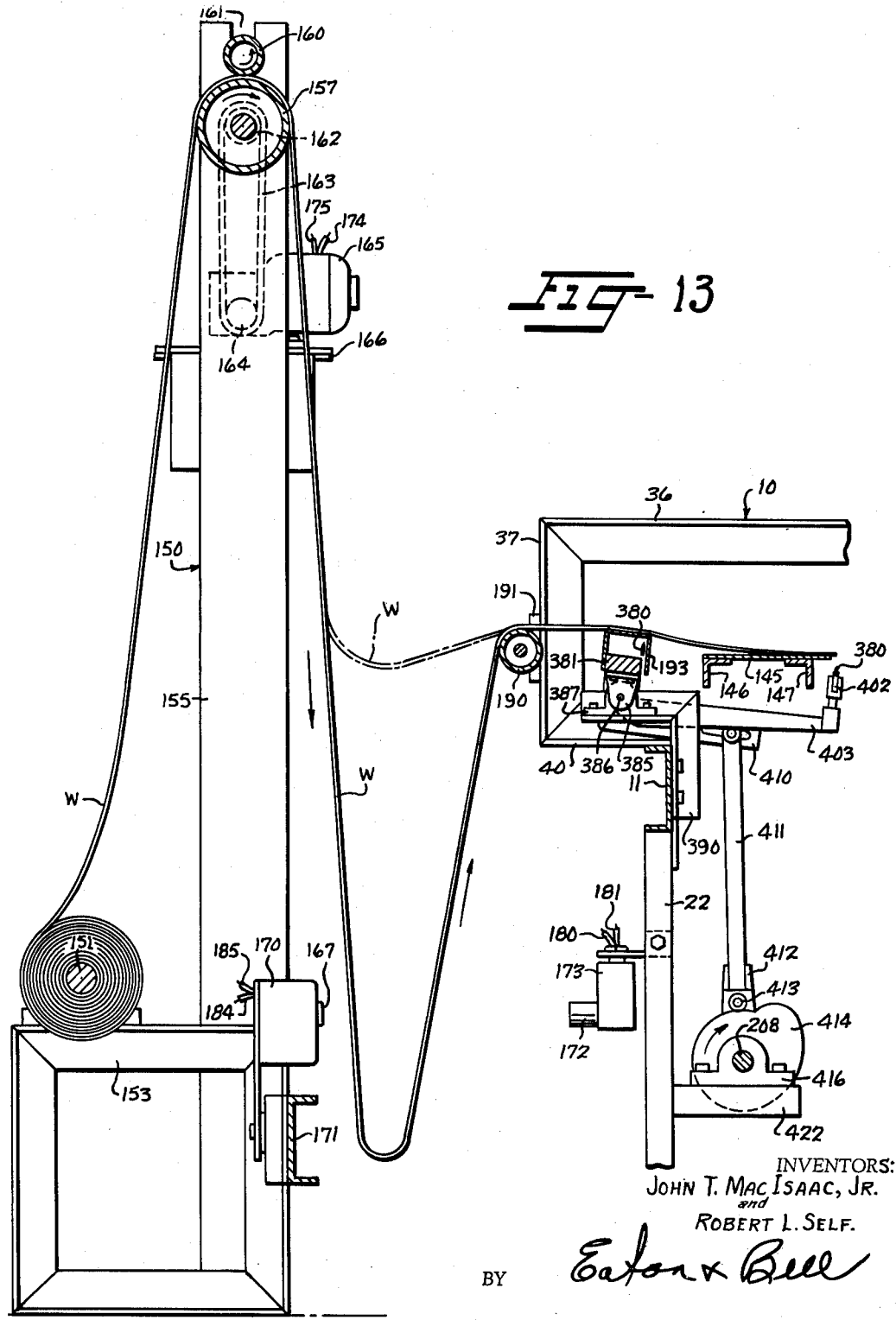

(Looking Towards Rear End Of Machine)

(Looking Towards Rear End Of Machine)

(Looking Towards Rear End Of Machine)

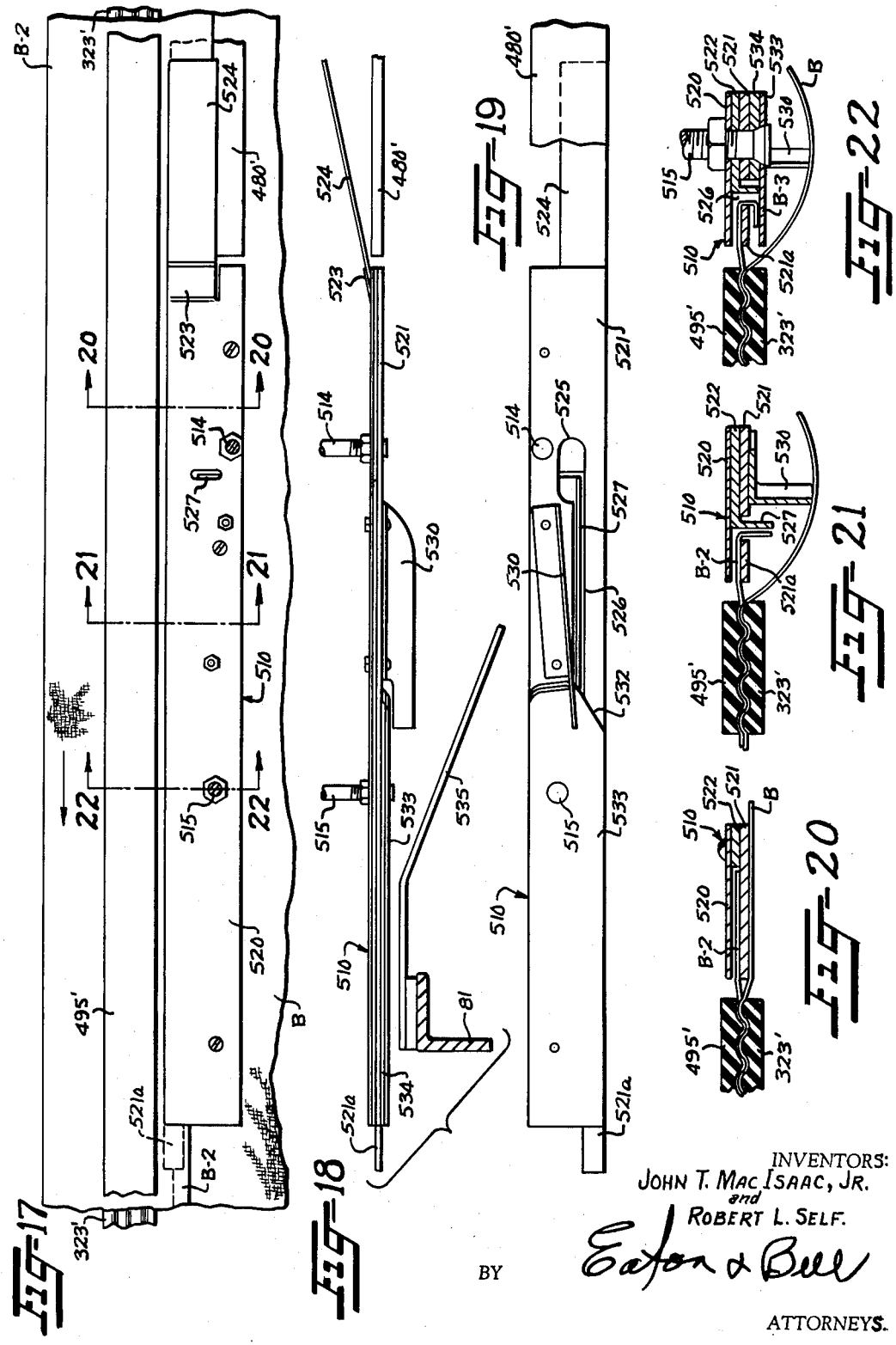

March 20, 1956  J. T. MacISAAC, JR., ET AL  2,738,746
APPARATUS FOR MAKING BED SHEETS AND THE LIKE
Filed June 4, 1952  30 Sheets-Sheet 27
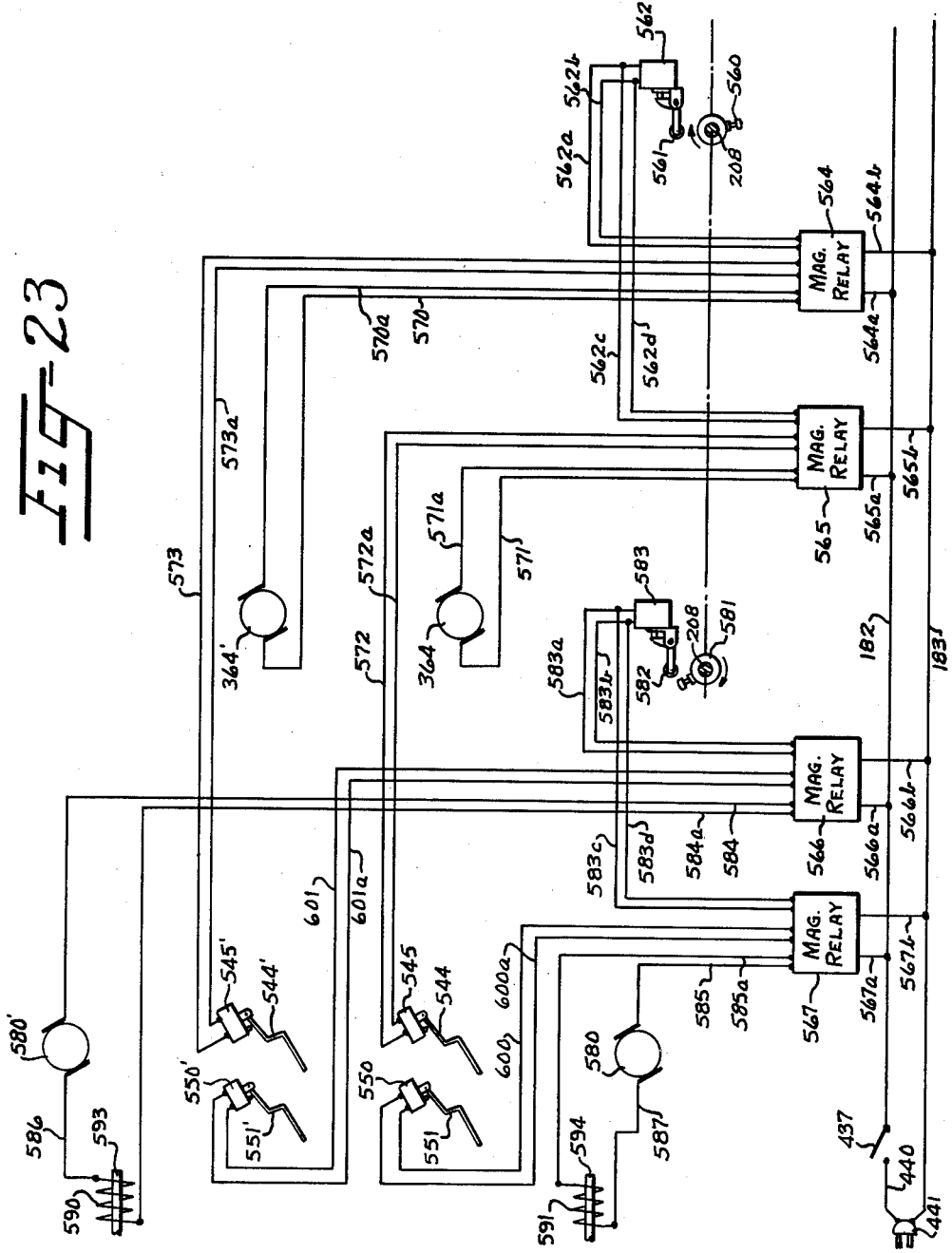
INVENTORS:
JOHN T. MAC ISAAC, JR.
and
ROBERT L. SELF
BY  Eaton & Bell
ATTORNEYS.

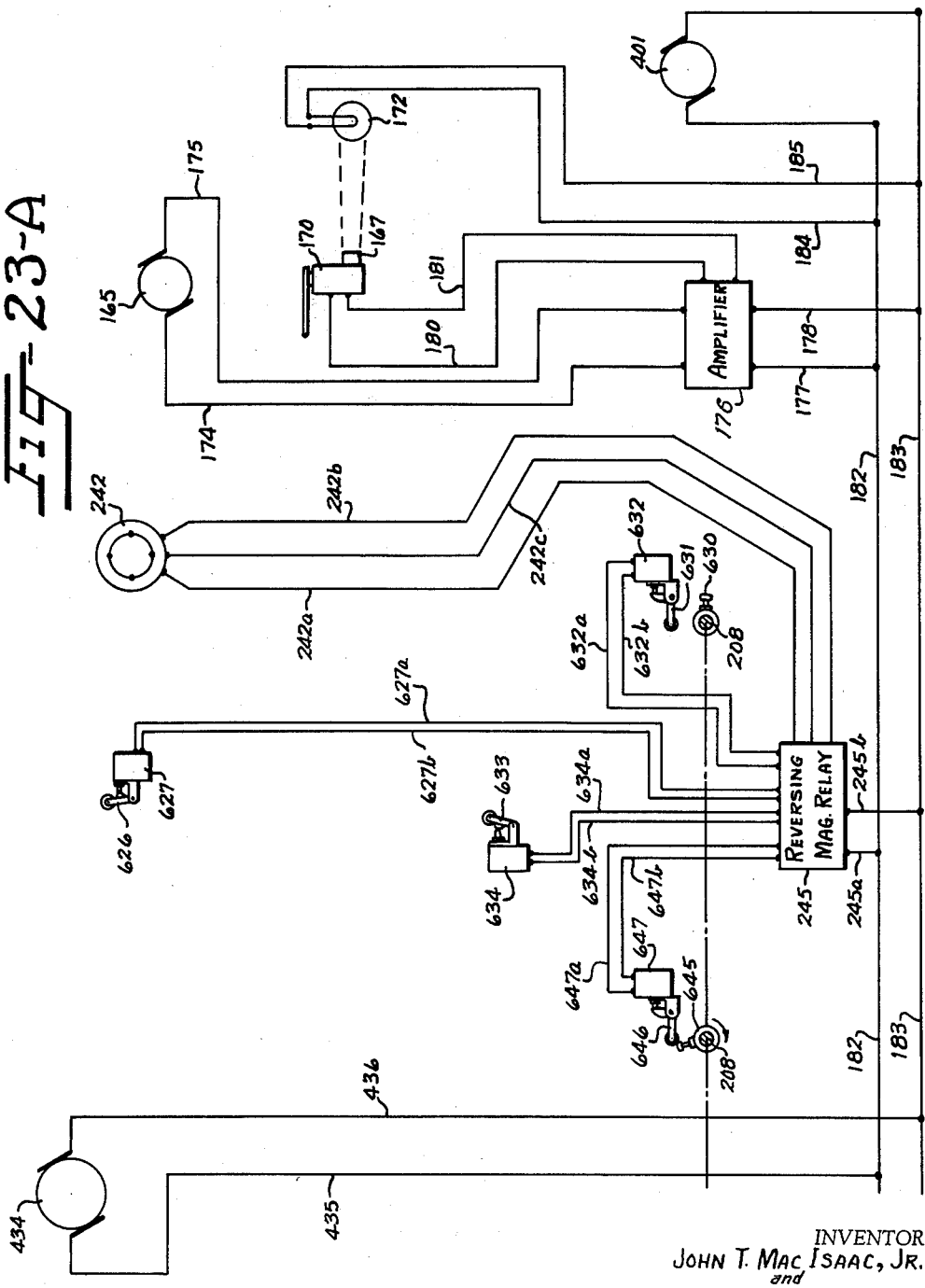

March 20, 1956  J. T. MacISAAC, JR., ET AL  2,738,746
APPARATUS FOR MAKING BED SHEETS AND THE LIKE
Filed June 4, 1952  30 Sheets-Sheet 29

Fig-24

JOHN T. MAC ISAAC, JR.
and
ROBERT L. SELF.
INVENTORS

BY  Eaton & Bell

ATTORNEYS.

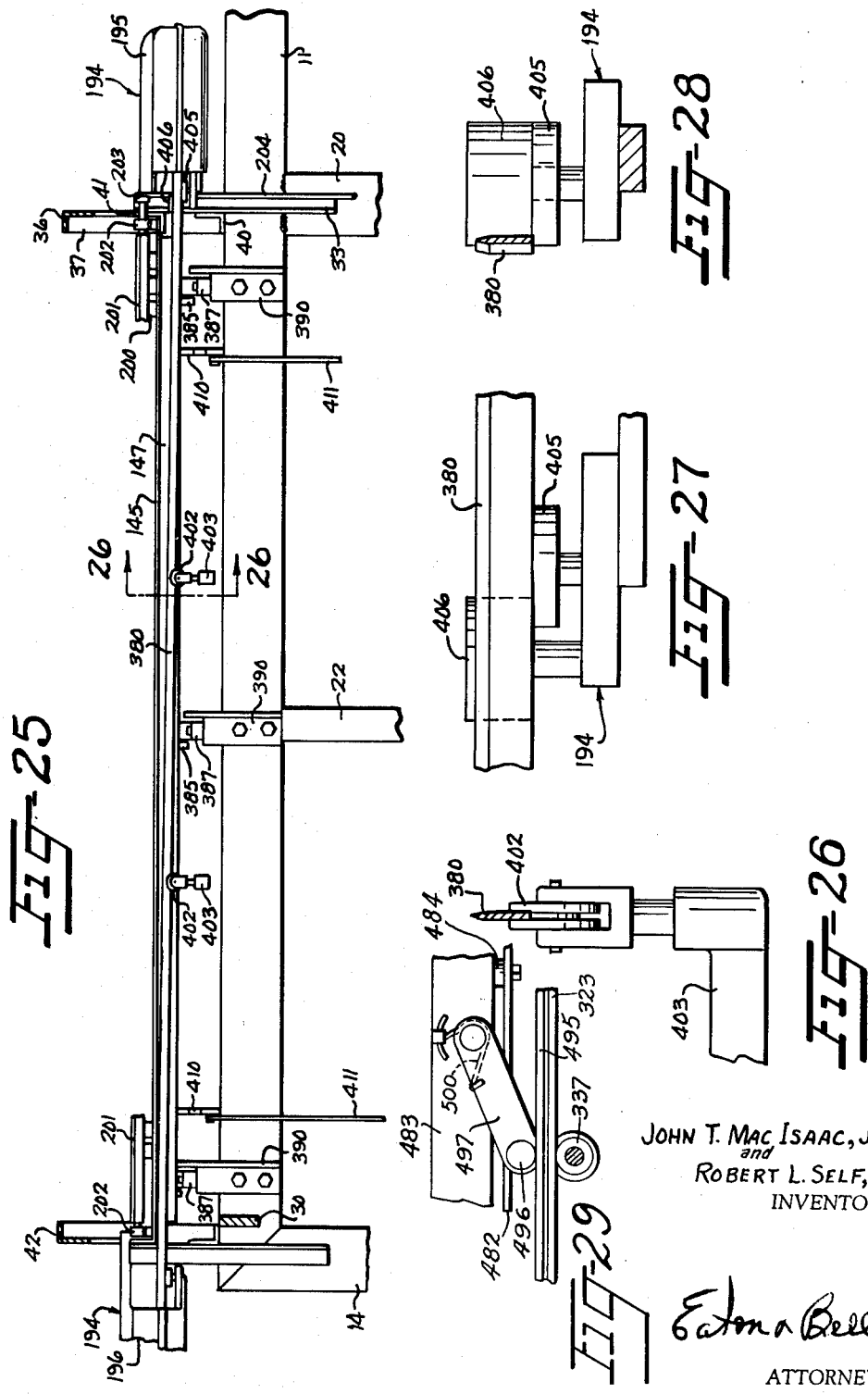

United States Patent Office 2,738,746
Patented Mar. 20, 1956

2,738,746

APPARATUS FOR MAKING BED SHEETS AND THE LIKE

John T. MacIsaac, Jr., and Robert L. Self, Spray, N. C., assignors, by mesne assignments, to Fieldcrest Mills, Inc., a corporation of Delaware Application June 4, 1952, Serial No. 291,659

67 Claims. (Cl. 112—2)

This invention relates generally to the art of cutting blanks from web material and stitching the same, and more especially to an improved machine for cutting, hemming and hem-stitching bed sheets, table cloths and other articles in the general category of linens.

The machine embodying the principles of the present invention is provided with means for cutting, hemming and hem-stitching any type of pliable web material, such as hemming, everedging or binding blankets and hemming bedspreads, towels, or table cloths, but will hereinafter be described as being used to manufacture bed sheets. The term "bed sheets" as used throughout the specification and claims is to be construed as generic to all of the above-mentioned articles and any other articles made from web material.

In the manufacture of bed sheets, the usual practice has been to form a selvage edge on the opposite longitudinal side edges of a web of material as it is woven, or to hem the opposite sides of the web material, tear or cut off sheet lengths from such web and then feed the lengths individually and by hand to suitable machines for forming hems on the two unhemmed or raw edges of the web material and to simultaneously or later sew the hems thus formed to produce a finished bed sheet or the like. It is evident that this requires skilled manual labor and is therefore, a relatively slow and costly process.

Applicant is familiar with the machine illustrated in Anderson Patent No. 2,053,257 and procured from the owners of said patent a complete machine built to a size for the manufacture of handkerchiefs. Thereafter, a machine of a size sufficient to make bed sheets was constructed according to the teachings of said patent and it was found to be unwieldy and not suitable for the manufacture of bed sheets and, hence, the present machine was developed, to overcome the difficulties inherent in the structure disclosed in said patent, for the manufacture of bed sheets.

It is the primary object of this invention to provide a machine for automatically producing relatively large linens, such as bed sheets and the like, in finished form from a web material which is preferably provided with a woven selvage along each of its longitudinal edges or which may be already hemmed along its longitudinal edges. The machine has means for automatically and successively drawing predetermined bed sheet lengths or blanks from a source of web material cutting the web into lengths, then folding the opposite raw edges of the blanks and sewing such folded edges to form the hem and wherein means are provided to fold a greater amount of material at one edge of the blank than at the other edge of the blank in order to form a wider hem at said one edge of the blank than at the other edge of the blank, it being well known that bed sheets and the like are usually provided with a wider hem at one end than at the other end thereof.

It is another object of this invention to provide a machine for producing bed sheets in finished form and wherein the machine is so designed as to operate upon substantially larger sheets of web material than any hem forming machines heretofore employed.

It is still another object of this invention to provide a machine of the character described having a pair of spaced stitching mechanisms thereon with means to successively feed the blanks through or past the stitching mechanisms at a speed independent of the speed at which the stitching mechanisms operate.

Another important object of the invention is to provide a machine of the character described with a novel means for cutting a web into blanks of varying size, the cutting means being embodied in an endless blade, somewhat of the general nature of a band saw, but preferably being provided with a sharp uninterrupted cutting edge and wherein means are provided to automatically tilt the cutting mechanism to move one of the reaches of the endless cutting blade through the web material upon a predetermined length of the web material being moved past the cutting blade and, as the cutting blade is moved through the web material, the cutting mechanism is so arranged that the corresponding reach of the cutting blade will progressively cut through the web material transversely from one selvage edge of the web material to the other.

It is still another object of this invention to provide novel means to advance each successive blank through the machine following the cutting of the blank from the web and the first folding of the hems at the opposite raw edges of the blank, one form of the blank advancing means including a plurality of transversely spaced endless belts which the web portion overlies when it is drawn across the machine by the web feeding mechanism and wherein means are provided to normally maintain the carrier belts stationary while the blank is being severed from the web material and while the first fold is being formed at each opposite edge of the blank, and to, immediately thereafter, impart movement to the belts to feed the blank longitudinally through the machine, or in a direction transverse to the longitudinal edges of the web material.

As the belts advance the blank forwardly of the zone in which the web is initially drawn across the machine, pressure applying belts are positioned above at least some of the carrier belts to maintain the hems in the position previously folded and to also maintain the blank in engagement with the corresponding belts to insure that the blank is moved through the machine by the belts. An under-folding mechanism is provided adjacent the outermost of each of the endless carrier belts of the machine, which underfolding means is also positioned adjacent the pressure applying belts and functions to fold inner raw edges of the blank beneath the hems previously formed. The carrier belts also function to pass the underfolded portions of the hems through suitable stitching devices or sewing machines. Means are also provided to automatically cause the carrier belts to move at a relatively slower speed as the hems are stitched by the stitching mechanism as compared to the speed at which the belts are moved in advancing the blank from the zone at which the web is drawn across the machine to the underfolding mechanisms.

It is another object of this invention to provide a second or modified form of blank advancing mechanism which also includes a plurality of transversely spaced endless carrier belts, but wherein first and second series of carrier belts are provided and the second series of carrier belts are arranged in succession to the first series of carrier belts and means are provided to drive the front or second series of carrier belts at a relatively slow rate of speed while the rear series of carrier belts remain stationary and during which a blank is passed through the underfolding mechanisms and through the stitching mechanisms, while the web is being drawn across the first series of carrier belts and another blank is being severed therefrom and has opposite raw edges thereof folded over the body of the blank to form the first fold of the hems.

After the trailing edge of the preceding blank has passed through the stitching mechanisms or sewing machine, means are provided to effect movement of both series of belts at a uniform speed and at a higher speed relative to the speed at which the second series of belts is moved during the underfolding and hemstitching operations.

Some of the objects of the invention having been stated, other objects will appear as the description proceeds, when taken in connection with the accompanying drawings, in which—

Figure 1 is a top plan view of the complete machine omitting many details and showing a blank thereon wherein the stitching of the hems is substantially half completed and showing the web material prior to its being fed to the machine and before it is drawn across the machine in forming a succeeding blank and also showing one form of means to advance the blanks through the machine in association therewith;

Figure 1-A is a view similar to Figure 1, omitting the blank, but showing the preferred form of means to advance the blanks through the machine;

Figure 2 is a somewhat perspective view of the framework of the machine with the movable parts omitted therefrom for purposes of clarity;

Figures 3 to 3-G, inclusive, collectively represent an enlarged top plan view of the machine similar to Figure 1 and wherein Figures 3 and 3-A are enlarged views of the lower portion of Figure 1; Figures 3-B and 3-C are enlarged views of the lower intermediate portion of Figure 1 with the cover removed from the cutting mechanism; Figures 3-D and 3-E are enlarged views of the upper intermediate portion of Figure 1 and Figures 3-F and 3-G are enlarged views of the uppermost portion of Figure 1 also with the cover removed from the cutting mechanism;

Figure 4 is a schematic perspective view showing one form of means for moving each successive blank transversely to the length of the web after the web has been drawn across the machine and after the blank has been severed from the web for passing the unhemmed or raw edges of the blank through the folding and stitching means;

Figure 5 is a view of a portion of the discharge end of the machine looking at the lower end of Figure 3;

Figure 14:
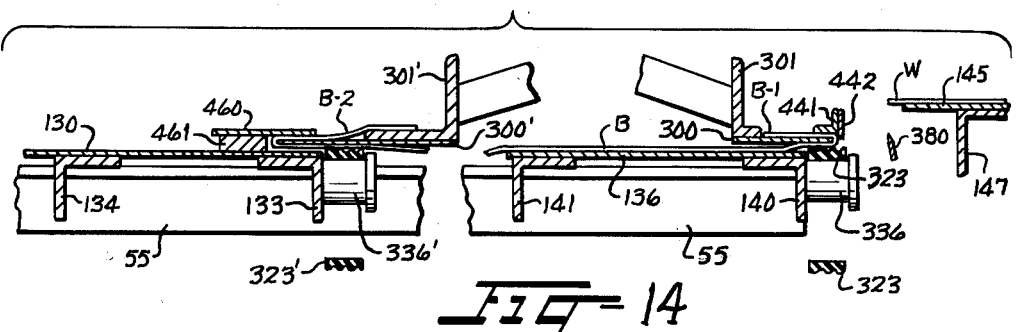
Figure 15:
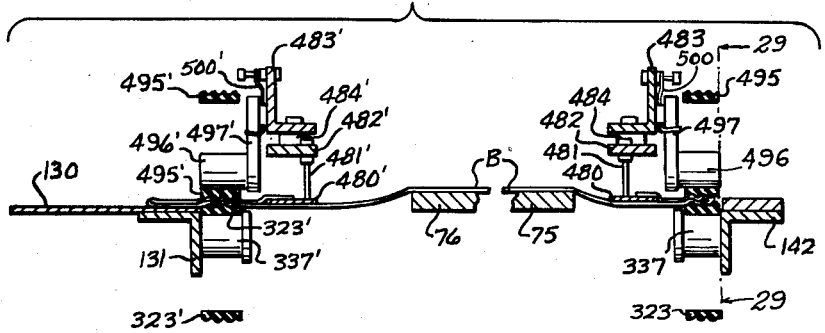
Figure 16:
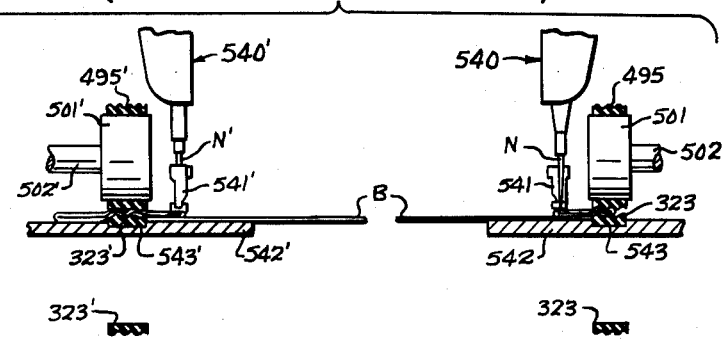

Figure 5-A is an extension to the right-hand end of Figure 5 looking at the lower end of Figure 3-A;

Figure 6 is a view of a portion of the opposite end of the machine from that shown in Figure 5, looking down at the upper end of Figure 3-F;

Figure 6-A is an extension to the left-hand end of Figure 6, looking at the opposite end of the machine from that shown in Figure 5-A and also looking down at the upper end of Figure 3-G;

Figures 7, 7-A and 7-B, collectively, represent a longitudinal vertical sectional view through the machine taken substantially along the line X—X in Figure 1 with parts broken away;

Figure 8 is a fragmentary vertical sectional view, mostly in elevation, taken substantially along the line 8—8 in Figure 7-B;

Figure 9 is an enlarged transverse vertical sectional view, mostly in elevation, taken substantially along the line 9—9 in Figure 1;

Figure 9-A is a fragmentary top plan view taken substantially along the line 9-A—9-A in Figure 9;

Figure 10 is an enlarged vertical sectional view taken substantially along the line 10—10 in Figure 1, but showing the web feeding mechanism for gripping and drawing the web material across the machine, although said mechanism is not shown in this portion of Figure 1;

Figure 11 is an enlarged vertical sectional view taken substantially along the line 11—11 in Figure 3-B and showing the means for gripping and drawing the web material across the machine in a different position from that shown in Figure 10 and immediately before the web material is released from the gripping means;

Figure 12 is an enlarged fragmentary vertical sectional view taken substantially along the line 12—12 in Figure 11;

Figure 13 is an enlarged vertical sectional view taken substantially along the line 13—13 in Figure 1, showing means for letting off the web material in slack form from the roll of web material, which means operates automatically in advance of each operative movement of the gripping means from the position shown in Figure 10 to the position shown in Figure 11 to insure that the web is pulled across the machine under low tension to thus prevent the web from bowing between adjacent gripping devices;

Figure 14 is a somewhat schematic fragmentary vertical sectional view showing the means for forming the first fold in opposite edges of the blank, looking toward the feed or rear end of the machine and being taken substantially along the line 14—14 in Figure 7-B, but omitting the central portion of the machine and many other parts being omitted for purposes of clarity;

Figure 15 is a somewhat schematic fragmentary vertical sectional view taken substantially along the line 15—15 in Figure 7-A and showing the manner in which the hems of the blank are clamped between the proximate reaches of upper and lower endless belts for feeding the blank through the machine;

Figure 16 is a schematic fragmentary vertical sectional view, mostly in elevation, taken substantially along the line 16—16 in Figure 7 and showing the relationship between the stitching mechanisms and the means for advancing the blank therethrough;

Figure 17 is an enlarged fragmentary top plan view, with parts in section, looking substantially along the line 17—17 in Figure 7, showing the means for folding under the free edge of one of the hems previously formed by the folding means shown in the left-hand portion of Figure 14 and also showing a portion of the web material as it passes therethrough;

Figure 18 is a fragmentary elevation looking at the lower side of Figure 17 but omitting the web material;

Figure 19 is an inverted plan view of the folding means at one side of the machine looking at the bottom of Figure 18;

Figure 20 is a fragmentary transverse vertical sectional view taken substantially along the line 20—20 in Figure 17, showing the corresponding partially folded hem as it enters the folding means shown in Figure 17;

Figure 21 is an enlarged fragmentary vertical sectional view taken substantially along the line 21—21 in Figure 17, showing how the web per se is moved away from the lower surfaces of the folding means and how the inner edge of the overlapping hem portion is permitted to depend downwardly;

Figure 22 is an enlarged fragmentary transverse vertical sectional view taken substantially along the line 22—22 in Figure 17, showing the underfolded portion at the inner edge of the corresponding hem as it is formed preparatory to the blank passing through the stitching mechanisms;

Figures 23 and 23-A illustrate, diagrammatically, the electrical circuit for the machine, the electrically controlled elements being shown schematically;

Figure 24 is a perspective view similar to Figure 4, but showing said preferred form of means for moving the blank transversely of its longitudinal edges through the machine;

Figure 25 is a somewhat schematic enlarged elevation of the web cutting mechanism, partially in cross-section taken substantially along the line 25—25 in Figure 1;

Figure 26 is an enlarged fragmentary elevation, showing the cutter blade in cross-section, taken substantially along the line 26—26 in Figure 25;

Figure 27 is an enlarged fragmentary elevation of the cutter blade guide rollers in the right-hand portion of Figure 25;

Figure 28 is a fragmentary vertical sectional view looking at the right-hand side of Figure 27;

Figure 29 is a fragmentary elevation of one of the pressure applying devices for the resilient clamping belts, partially in section, taken substantially along the line 29—29 in Figure 15.

*Brief synopsis of the machine.*

In order to provide a clear understanding of the co-operating relationship between the various operating parts of the machine, a brief synopsis of the operation of the machine will first be given. The machine has means for supporting a roll of web material, which web material is provided with woven selvages along its longitudinal edges and which material is also of the width of the usual bed sheet, table cloth or the like. In this instance, the machine is designed particularly for manufacturing bed sheets and the description shall be limited to bed sheets, although it is to be understood that any articles made from web material of relatively large widths, such as pillow case blanks, blankets or towels may be hemmed on the present machine.

The web material initially extends beneath a plurality of leaf spring members which lightly clamp the leading edge of the web material. The roll of web material is rotatably mounted on a novel let-off mechanism which automatically maintains considerable slack in the web material between the clamping means at the leading edge of the web material and the web roll to thereby insure that the web feeding mechanism, which subsequently draws the web material across the machine, is required to pull only the immediate web material and does not have to impart rotation to the roll about which the web material is wound. The web material does not have to be in the form of a roll but could be in any suitable form such as folded in super-posed layers.

The web feeding mechanism has a plurality of gripping devices thereon which initially move into position and grip the leading edge of the web material adjacent the above described clamping means and then draws or pulls approximately the required amount of web material across the machine to form a bed sheet.

As the web material is drawn across the machine, it is also drawn across and in contact with the upper reaches of a plurality of transversely extending endless blank advancing or carrier belts and, while said leading edge of the web material is held by the gripping means, the exact length of web material to form a bed sheet is then adjusted by producing a suitable amount of slack in the web portion at a point between the first-named clamping means and the grippers (Figures 1, 3–B, 3–D, 3–F, 6 and 8).

After the length of the web portion has been adjusted, and while the web material is still held in the jaws of the grippers, elongated pressure applying members or plates move downwardly against the upper surface of the web portion extending across the machine and press the same into engagement with the two outermost of said endless carrier belts which, at this time, are stationary. The blank is then severed from the web at a point adjacent the first-named clamping means by a novel cutting device in the form of an endless cutter blade wherein means are provided which operate automatically, upon the movement of the pressure applying members into operative positions relative to the endless belts, to move one of the reaches of the endless cutter blade upwardly in an angular attitude relative to the web so that the corresponding reach progressively cuts from one selvage edge to the other of the web material.

After the blank is severed, and while it is still held in the severed position by the pressure applying devices pressing the blank against said carrier belts and after the web has been released from the grippers, the first fold is given to the unhemmed or raw edges of the blank, after which a cam controlled means completes a circuit to an electric motor for driving said carrier belts to move the blank transversely to the length of the web, whereupon the blank is moved forwardly from beneath said pressure applying plates or members and the partially folded hems pass beneath a pair of endless pressure applying belts as shown in Figure 15, these pressure applying belts being disposed immediately above and, normally bearing resiliently, against the upper reaches of the corresponding outermost carrier belts.

The blank then continues to move transversely to the length of the web and, due to the pressure of the pressure applying endless belts, which press the hems of the blank against the outermost carrier belts, the raw edges of the blank pass through additional folding devices (Figures 17–22) to fold the raw edges of the blank beneath the hems previously formed and between said hems and the body of the blank. In one form of the advancing means for the blank (Figure 4) the endless carrier belts are then controlled automatically to move at a relatively slower speed while substantially simultaneously rendering a pair of sewing machines operative, whereupon the completely folded edges of the blank pass through the sewing machines which sew both edges simultaneously.

In another form of means for advancing the blank transversely to the length of the web (Figure 24) after the blank is cut off, after the first fold is given to the unhemmed or raw edges, and while the blank is still held against the upper surfaces of the upper reaches of the carrier belts by the elongated pressure applying members or plates, the conveyor belts are then driven to move the blank transversely to the length of the web onto a second series of carrier belts and beneath pressure applying endless belts identical to those heretofore described. The second series of belts then take over the operation of advancing the blank through the machine.

The first and second series of belts overlap each other in side-by-side relation at their juncture. The second series of belts are so controlled that, at times, they are driven at a relatively slower speed than the normal speed of both series of belts, but while the first series of belts is stationary. This facilitates the operation of the web feeding mechanism in drawing the web across the machine, the cutting mechanism and the means for forming the first fold in each successive blank while preceding blanks are passing through the subsequent folding operations and through the stitching mechanisms or sewing machines, to thereby greatly increase the productive capacity of the machine. After each successive blank has passed through the sewing machines, which sew both edges simultaneously, the bed sheet is then complete.

*Machine frame*

The frame 10 of the machine is most clearly shown in Figure 2, although parts of the frame are shown in substantially all of the views. The frame 10 comprises elongated side frame members of bars 11 and 12 which extend longitudinally of the machine and opposite ends of which rest upon legs 13, 14 and 15, 16 respectively.

The side frame members 11 and 12 are supported intermediate their ends on intermediate legs 20 and 21 and are also supported on vertical frame members or legs 22 and 23 disposed forwardly of and adjacent the frame members or legs 14 and 16.

Lower transverse frame members 24, 25 and 26 span the distance between, and are suitably secured to, intermediate portions of the respective legs 13, 15 and 20, 21 and 14, 16. An upper or intermediate rear transverse frame member 30 spans the distance between, and is suitably secured to, the rear portions of the longitudinally extending frame members 11 and 12 adjacent the upper ends of the legs 14 and 16. The frame members 11 and 12 also support upright frame members 31 to 34, inclusive, which are disposed inwardly of and, in substantially the same vertical planes as, the respective legs 14 to 21, inclusive.

The upright frame members 31 to 34, inclusive, are shown in the form of angle bars and a transverse frame member 35 is suitably secured at opposite ends thereof to the upright frame members 33 and 34. It will be observed, in Figures 2 and 9, that the upper end of the upright frame member 34 terminates at a substantially higher level than the upper end of the frame member 33 and has one end of a transverse frame member 36 fixed thereto which extends across the machine, beyond the vertical plane of leg 20, and is suitably secured to the upper end of a relatively short upright frame member 37.

The lower end of frame member 37 is secured to a relatively short horizontal frame member 40 which extends inwardly and is suitably secured to the upright frame member 33 and rests upon the longitudinally extending frame member 11. A relatively short angle bar 41 is suitably secured to, and projects inwardly from, the upper end of the upright frame member 33 (Figures 2, 9 and 10).

At the rear of the machine, frame members 42 to 45, inclusive, extend in spaced parallel relation to the respective frame members 36, 37, 40 and 41, one end of the frame member 42 being secured to the upper end of the upright frame member 32 and the other end thereof being suitably secured to the upper end of the vertically disposed frame member 43. Opposite ends of the frame member 44 are secured to the lower end of frame member 43 and an intermediate portion of the upright frame member 31. A frame member 45 is suitably secured to, and projects inwardly from, the upper end of the upright frame member 31.

Corresponding ends of spaced parallel track members 46 and 47 are suitably secured to the intermediate portions of the respective upright frame members 32 and 34 and the other ends of the track members 46 and 47 terminate short of the inner ends of the relatively short frame members 45 and 41 and are suitably secured to the lower ends of support members 50 and 51 which project upwardly and are suitably secured to the uppermost transverse frame members 42 and 36, respectively. Opposite ends of longitudinally extending transversely spaced angle bars or frame members 52 and 53 are suitably secured to the upper transverse frame members 36 and 42.

The longitudinally extending frame members 52 and 53 have opposite ends of a transverse frame member 54 suitably secured intermediate the ends thereof. A horizontally disposed frame member 55 extends in spaced parallel relation beneath the track member 46 and is supported along its length on a plurality of spaced upright support members 56 which extend downwardly and are suitably secured to the transverse frame member 30 (Figures 2, 6 and 6–A). Spaced beneath the track member 47, and extending in parallel relation thereto, is a pair of longitudinally aligned frame members 60 and 61 whose proximate ends are spaced from each other and the opposite ends of which are spaced substantially inwardly of the vertical planes of the longitudinally extending frame members 11 and 12.

The frame members 60 and 61 are fixed to the upper ends of respective pairs of support members 62 and 63, the lower ends of which are fixed to the transverse frame member 35 at the sewing end, front end or discharge end of the machine. Opposite ends of a transverse frame member 65 are suitably secured to the foremost ends of the longitudinally extending frame members 11 and 12 and, suitably secured adjacent opposite ends of the transverse frame members 65 and 24 (Figures 2, 5 and 5–A) is a pair of upright frame members 66 and 67.

The upper ends of the upright frame members 66 and 67 suitably support opposite ends of an upper transverse frame member 70 spaced rearwardly of the upper ends of the upright frame members 66 and 67 by suitable spacing blocks 71.

It will be most clearly observed in Figures 3 to 3–G, inclusive, 8 and 15 that the transverse frame members 55, 60 and 61 support the rearmost and intermediate portions of a pair of transversely spaced web or blank supporting platforms or tables 75 and 76 (Figure 5–A) which define an elongated slot or opening 77 therebetween. The outer or remote edges of the tables or platforms 75 and 76 are spaced substantially inwardly from the longitudinally extending side frame members 11 and 12.

The platforms 75 and 76 extend forwardly and substantially beyond the vertical plane of the upper transverse member 70, but are supported at a point beneath the transverse frame member 70 on respective transversely extending frame members 80 and 81 suitably secured at their outer or remote ends to the upright frame members 66 and 67. The proximate ends of the frame members 80 and 81 are spaced substantially from each other and are suitably secured to the upper ends of supports 82 and 83 which extended downwardly in Figure 2 and are suitably secured to the transverse frame member 65.

The platforms 75 and 76 are made from a relatively rigid material, such as wood, and the front portions thereof overlie a plurality of transversely spaced, relatively short, longitudinally extending frame members 84 to 88 and 92 to 95, respectively. The rear ends of the frame members 85 to 88 and 92 to 95 are suitably secured to the common transverse member 65 and the rear end of the frame member 84 is fixed to the leg 13. The front ends of frame members 84 to 88 are fixed to a common transverse frame member 96. The front ends of frame members 92 to 95 are suitably secured to a common transverse frame member 97.

Opposite ends of the transverse frame members 96, 97 are suitably secured to the upper ends of respective legs 100, 101 and 102, 103. Opposite ends of a frame member 104 are fixed intermediate the upper and lower ends of the legs 101 and 102 and the front ends of rearwardly extending frame members 106 and 107 are fixed to transverse frame member 104. The front ends of bars or frame members 110 and 111 are suitably secured to the legs 101 and 102. The rear ends of all of the frame members 106, 107, 110 and 111 are suitably secured to the lower transverse frame member 24.

The forwardly and rearwardly extending frame members 106, 110 have opposite ends of a pair of motor support bars 112 suitably secured thereto and opposite ends of a similar pair of motor support bars 113 are suitably secured to the forwardly and rearwardly extending frame members 107, 111 (Figure 2). A pair of transversely extending motor support bars or frame members 115 are suitably secured at opposite ends thereof to brackets 116 and 117 which extend rearwardly and are suitably secured to the upright frame member 66 and an additional upright frame member 118. Upper and lower ends of the upright frame member 118 are suitably secured to the respective transverse frame members 65 and 24 (Figure 5–A).

It will be observed in Figures 2 and 5 that a bracket 121, suitably secured to the upright frame member 67, also supports corresponding ends of a pair of transverse motor support bars or frame members 122, whose inner ends are suitably secured to a bracket 123. The bracket 123 is suitably secured to an upright frame member 124 suitably secured at its upper and lower ends to the respective transverse frame members 65 and 24. The opposite end portions of the transverse frame members 80 and 81 support respective substantially rectangularly-shaped sewing machine support brackets 125 and 126, each of which has a pair of forwardly and rearwardly extending bars 127 thereon for supporting the corresponding sewing machines to be later described (Figures 3 and 3-A).

It will be observed in Figures 3, 3-B and 9 that there is a hem support plate or platform 130 spaced outwardly of the outer edge of the platform 76, the rear and front ends of which are suitably secured to the respective transverse frame members 61 and 81. A longitudinally extending frame member 131, shown in the form of an angle bar, also supports the hem support plate or platform 130. The vertical flange of the angle bar 131 is disposed flush with the inner edge of the hem support plate or platform 130. Opposite ends of the angle bar 131 are suitably secured to the transverse frame members 61 and 81.

Referring to Figures 3-B, 3-D, 3-F and 9, there will be observed another horizontally disposed hem or web-edge support plate whose front end abuts the rear end of the hem support plate 130. This hem support plate 132 is somewhat wider than the front hem support plate or platform 130. The inner edge of the hem support plate 132 is aligned with the inner edge of the hem support plate 130 and is secured on a pair of angle bars 133 and 134 (Figure 11) suitably secured at their front ends to the transverse frame member 61 (Figure 11) and suitably secured at their rear ends to the transverse frame member 55 Figure 6.

Referring to the Figures 3-G, 3-E, 3-C, 9 and 10, there will be observed a horizontally disposed rear web-edge or hem support plate 136 suitably secured to a pair of transversely spaced longitudinally extending angle bars 140 and 141. The angle bar 140 is substantially flush with the inner edge of the web-edge or hem support plate 136. Corresponding rear ends of the angle bars 140 and 141 are suitably secured to the transverse frame member 55 (Figure 6-A) and the front ends thereof are suitably secured to the transverse frame member 60 (Figures 9 and 10).

It will be observed in Figure 9-A that the rear end of an angle bar 142 is suitably secured, in off-set relationship to the angle bar 140, to a support 143 carried by the transverse frame member 60.

It will be observed in Figures 3-D and 3-E that the inner edges of the rear web-edge or hem support plates 132 and 136 and the angle bar 142 are spaced substantially outwardly from the outer edges of the platforms 75 and 76. The front end of the angle bar 142 is suitably secured to the transverse frame member 80 (Figures 3-A and 15).

Referring to Figure 10, it will be observed that the inner edge of a web feed and clamp plate 145 is spaced outwardly from, and at a slightly higher elevation than, the outer edge of the web-edge support plate 136. This web feed and clamp plate 145 is somewhat greater in length than the width of the web material W and is suitably secured to the upper surfaces of longitudinally extending angle bars 146 and 147. The inner surface of the angle bar 147 is, necessarily, spaced substantially from the inner edge of the web feed and clamp plate 145 to accommodate the grippers of the web feed mechanism to be later described.

The opposite ends of the angle bars 146 and 147 are suitably secured to the relatively short transverse frame members 41 and 45 (Figures 3-G, 9, 10 and 2). This completes the description of the primary frame elements and the remaining elements of the frame 10 will be described in connection with their associated parts.

*Web roll support and let-off mechanism*

The web roll support and let-off mechanism, designated broadly at 150, is most clearly shown in Figures 1 and 13. A web or cloth roll 151 is journaled at opposite ends thereof in slotted bearing blocks 132 which are open-topped so the web roll 151 may be deposited on the bearing blocks 152. The cloth or web roll 151 has the web material W wound about the same. The bearing blocks 152 are suitably secured to substantially rectangularly shaped web roll support brackets 153 and 154 which are suitably secured to standards 155 and 156, shown in the form of channel bars in Figure 1.

An intermittently driven let-off or feed roll 157 is journaled at opposite ends thereof in the upper portions of the standards 155 and 156 and the web material passes upwardly from the web roll 151, over and substantially half way around the driven roll 157. A pressure roll 160 rests upon the web material W and maintains the web material W in frictional engagement with the feed roll 157. Each of the standards 155 and 156 is slotted, as at 161, at its upper end for receiving reduced opposite ends of the pressure roll 160 so the pressure roll 160 may rotate in the slots 161.

The feed roll 157 has a pulley 162 fixed thereon which is engaged by an endless belt 163 which also engages a pulley 164 (Figure 13). The pulley 164 is intermittently driven by reduction gear electric motor 165 suitably secured to a motor support bracket 166. The bracket 166 is suitably secured to the standard 155.

The web material W extends downwardly from the feed roll 157 and past a photo-electric cell 167 disposed in a suitable housing 170 secured to a transverse horizontally disposed frame member 171. Opposite ends of the frame member 171 are suitably secured to the standards 155 and 156. Spaced opposite the photo-electric cell 167 is a suitable light source 172, such as an incandescent lamp and which is disposed in a receptacle 173 carried by the leg 22.

Referring to Figure 23-A, it will be observed that the electric motor 165 has wires 174, 175 extending therefrom to a suitable amplifier 176. The amplifier has wires 177, 178, 180 and 181 extending therefrom, the ends of the wires 177 and 178 being connected to respective lead wires 182 and 183 to thereby normally direct current to the amplifier 176. The ends of the wires 180 and 181 remote from the amplifier are connected to opposite sides of the photo-electric cell 170. The incandescent lamp 172 is connected to the lead wires 182 and 183 by respective wires 184 and 185.

The light source 172 is so positioned in Figure 13 that the light rays therefrom are normally directed to the photo-electric cell 167 and the light rays are interrupted, at times, by the looped lower portion of the web material W. However, as the web material is fed into the machine, by means to be later described, the looped portion of the web material adjacent the photo-electric cell 167 moves upwardly substantially to the dotted line position shown in Figure 13.

Now, as the web material W moves away from between the light source 172 and photo-electric cell 167, the circuit in the amplifier is closed to complete the circuit from the wires 177 and 178 to the wires 174 and 175 to energize the electric motor 165. The feed roll 157 is then caused to rotate in a clock-wise direction in Figure 13 to feed the web material from the roll 151 until the looped portion thereof has again moved downwardly past the photo-electric cell 167, whereupon the circuit to the electric motor 165 is broken. It is evident that the motor 165 will idle momentarily after the circuit is broken, thus causing the looped portion to depend substantially below the horizontal plane of the photo-electric cell 167.

Thus, the let-off mechanism 150 operates automatically to insure that there is ample slack of web material in advance of the web feeding mechanism to insure that the web feeding mechanism is not encumbered by the resistance to rotation of the web material W wound about the web or cloth roll 151.

*Web guide*

The web material W is preferably provided with woven selvage edges along its longitudinal edges, or already hemmed along its longitudinal edges. It is led into the machine over an idler guide roll 190 journaled in bearing blocks 191 suitably secured to the upright frame members 37 and 43 (Figures 1, 3-C, 3-E, 3-G, 6-A, 10 and 13).

The web material W then extends inwardly over, and in sliding engagement, with a blade shield 193 of a novel web cutting mechanism designated broadly at 194. The shield 193 is a part of a housing for the web cutting mechanism 194, which housing also has enlarged opposite end wheel housings 195 and 196. The web cutting mechanism will be later described in detail.

The web material W extends inwardly and downwardly at a slight angle from the web cutter blade shield 193, as best shown in Figure 10, and the leading portion thereof normally rests upon the web feed and clamp plate 145 heretofore described. The web material W is resiliently clamped against the upper surface of the web feed and clamp plate 145, adjacent the inner edge thereof, by a transverse row of closely spaced leaf spring members 200 which extend upwardly and outwardly at an angle and are suitably secured to a shaft or bar 201 journaled at opposite ends thereof in bearing blocks 202 suitably secured to the longitudinally extending web clamp and feed plate 145.

It will be observed in Figure 9 that the front end of the shaft 201 has one end of a crank arm 203 fixed thereon which extends downwardly at an angle and has the upper end of a connecting rod 204 pivotally connected thereto. The lower end of the connecting rod 204 has a yoke member 204a suitably secured thereto which straddles a cam shaft 208 supported and driven in a manner to be later described. The yoke member 204a has a cam follower 204b which rides upon a cam wheel 209 fixed on the cam shaft 208. The cam wheel 209 is of such configuration that it causes oscillation of shaft 201 to cause the leaf spring members 200 to move upwardly out of clamping position immediately before a web feeding mechanism 205, to be presently described, commences its retracting movement for pulling the web material across the machine from the position shown in Figure 10 to that shown in Figure 11.

*Web feeding mechanism*

The feeding of the web material is caused by grippers which move transversely across the machine (Figures 3–D, 3–F, 8, 10 and 11). The web feeding mechanism 205 comprises a pair of longitudinally spaced vertically disposed carriage plates 206 and 207 (Figures 7–A and 7–B) in which opposite ends of a longitudinally extending gripper supporting shaft 210 is suitably secured. Rollers 211 and 212 are rotatably mounted on opposite ends of the shaft 210 and ride upon the tracks 46 and 47 for supporting the web feeding mechanism 205 (Figures 7–A, 7–B and 12).

The plates 206 and 207 also have respective rollers 213 and 214 rotatably mounted thereon which also ride upon the respective tracks 46 and 47 to assist in supporting the web feeding mechanism 205. The plates 206 and 207 are held in spaced relation to each other by a frame member 216 shown in the form of an angle bar (Figures 3–B, 3–D, 3–F and 10) which extends transversely of the path of travel of the web as it is fed to the machine and is suitably secured at opposite ends thereof to the carriage plates 206 and 207.

In order to move the web feeding mechanism 205 back and forth across the machine between the position shown in Figure 10 and the position shown in Figures 8 and 11, the lower reach of endless belts or cords or cables 220, 221 are suitably secured to the upper portions of the respective plates 206, 207 (Figures 6, 8, 10 and 11). It will be observed in Figures 6–A and 10 that the cables 220, 221 extend from the respective plates 206, 207 towards the idler roll 190 and then pass upwardly and substantially half around respective idler pulleys 222 and 223.

The pulleys 222, 223 are rotatably mounted on respective stub shafts 224, 225 which extend outwardly and are fixed to respective brackets or plates 226, 227 suitably secured to the respective transverse frame members 42, 36. The cables 220, 221 then extend across the machine in substantially parallel relation to and adjacent the respective transverse frame members 42 and 36 and are then wound about respective flanged drums 230 and 231. The medial convolution of each of the cables 220 and 221 is suitably secured to the respective drums 230 and 231, as at 232 (Figures 3–B and 3–F). The cables 220, 221 then extend inwardly from the respective drums 230, 231 to the respective plates 206, 207 of the web feeding mechanism 205.

The drums 230, 231 are driven by means to be presently described, and, therefore, since the cables 220, 221 are fixed to the drums 230, 231, this causes the cables to move with the drums 230, 231 to move the web feeding mechanism 205 across the machine. The drums 230, 231 are fixed on a common shaft 233 rotatably mounted in bearing blocks 234 (Figures 3–B, 3–F) suitably secured to the upright frame members 32, 34. The rearmost end of the shaft 233 has a V-pulley 236 fixed thereon (Figures 3–F and 6) which is driven by a V-belt 237 mounted on a V-pulley 240 fixed on a motor shaft 241. The motor shaft 241 extends from a reversing self-braking electric motor 242 suitably supported on a motor support plate 243 (Figures 2 and 6) fixed on a longitudinally extending angle bar 244. Opposite ends of the angle bar 244 are suitably secured to the legs 16, 23 of the frame 10.

It will be observed in Figure 23–A that the reversing motor 242 has wires 242a, 242b and 242c extending therefrom to a magnetically operated reversing switch or relay 245. The magnetic relay 245 is only shown schematically at 23–A since there are many different types of reversing magnetic relays which may be employed, such as the switches termed as Bulletin 705 across-the-line reversing switches manufactured by Allen-Bradley Company of 155 East 44th Street, New York 17, N. Y. and as illustrated in the 1946 issue of Sweet's File for Product Designers, Section 3b/1, pages 12 and 13. Since there are various means by which the direction of the reversing motor 242 may be controlled, a detailed description of the reversing magnetic relay 245 is deemed unnecessary. The magnetic relay 245 in Figure 23–A has wires 245a and 245b extending therefrom to the lead wires 182 and 183.

The motor 242 and all other electric motors herein described, with the exception of the main driving motor 434 and the cutting mechanism motor 401, should, necessarily, be provided with inherent self-braking means to thereby preclude the necessity of providing other braking means to accurately control the position of the web material W, or the blanks B severed therefrom, during the course of each successive series of operations.

These self-braking motors may be of a type manufactured by The Leland Electric Company, 11 West Monument Building, Dayton 1, Ohio, and which are termed as "Master Uni-brake" motors, as described in said Sweet's File, Section 3a/10, page 6.

*Gripper operating mechanism*

Now, referring to Figures 3–D, 3–F, 8, 10 and 11, it will be observed that lower fingers or jaws 247 of grippers are fixedly mounted on the fixed rod or shaft 210 and upper fingers 250 of the grippers are pivoted on the rod 210 and are constantly urged into closed or gripping position by springs 251. These grippers each includes a fixed jaw and a pivoted or movable jaw and are substantially the same structure as those shown in Figures 11 and 12 of said Anderson patent.

Cam controlled means are provided for opening and closing the grippers to grasp or release the web material and to move the web feeding mechanism 205 to and fro across the machine (Figures 3–B, 3–D, 3–F, 8, 10 and 11). Assuming the web feeding mechanism 205 to be moving across the machine towards the web let-off mechanism 150, or from the position shown in Figure 11 to the position shown in Figure 10, it will be observed in Figures 3-E and 3-G that the inner edge of the web clamp and feed plate 132 has a plurality of spaced slots 252 therein with which the jaws or fingers 247, 250 of the corresponding grippers register upon the web feeding mechanism 205 reaching the advanced position shown in Figure 10.

These slots 253 are also positioned between certain of the leaf spring clamping members 200. It will be most clearly observed in Figure 10 that a plurality of gripper control fingers 254 overlie rollers 255 on the ends of the movable gripping jaws or fingers 250 remote from the ends which are adapted to engage the web material when the grippers are in the advanced position shown in Figure 10. In the retracted position (Figures 8 and 11), fingers 256 overlie the rollers 255 on the corresponding jaws 250 of the grippers, there being one of each of the operating fingers 254, 256 for each of said grippers.

The gripper operating fingers 254, 256 are mounted on respective rocker shafts 257, 258. The rocker shafts 257, 258, extend longitudinally of the frame 10 and are oscillatably mounted in respective pairs of bearing blocks 261, 262 suitably secured to, and depending from the transverse frame members 36, 42 (Figures 3-B, 3-C, 3-F, 3-G, 6, 6-A and 9). Referring to Figures 6 and 6-A, it will be observed that the rear ends of the rocker shafts 257, 258 have respective upwardly extending arms 263, 264 fixed thereon, the upper ends of which are pivotally connected to opposite ends of a link 265.

It will be observed in Figures 3-F and 6 that the rocker shaft 258 also has a crank arm 266, fixed thereon and extending outwardly therefrom, to which the upper end of a connecting rod 267 is adjustably pivotally connected. The connecting rod 267 has a yoke member 270 fixed on the lower end thereof which straddles a main cam shaft 271 rotatably mounted in bearing blocks 272, 273 (Figures 3-B, 6, 7-A and 7-B). The bearing block 272 is suitably secured to the lower transverse frame member 26 and the bearing block 273 is suitably secured to a bearing support plate 274 suitably secured to the transverse frame member 25 (Figures 2 and 7-A). The driving means for the cam shaft 271 will be later described.

The cam shaft 271 has four irregularly-shaped cams or cam wheels fixed thereon indicated at 275, 276, 277 and 278 as is most clearly shown in Figures 6, 7-A and 7-B. The yoke 270 has a cam follower 281 thereon which engages the periphery of the cam wheel 276 to thereby cause the connecting rod 267 to reciprocate vertically and to, in turn, cause the gripper actuating fingers 254 and 256 (Figures 10 and 11) to move upwardly and downwardly in unison. It is to be understood, however, that only one of the groups of fingers 254 or 256 operates upon the grippers at a time.

The cam wheel 276 is so arranged that the fingers 254 and 256 are in the lowered or operative position, in which the fingers 254 are shown in Figure 10, as the gripper carriage or web feeding mechanism 205 advances to the position shown in Figure 10 from the position shown in Figure 11. Thus, as the jaws 247 and 250 of the grippers move into register with the slots 253 in the feed and clamp plate 145, the movable jaws 250 are moved to open position relative to the fixed jaws 247 to thereby straddle the leading raw edge of the web material W. The cam wheel 276 then causes the fingers 254 and 256 to move upwardly to thereby permit the grippers to grip the web material.

The web feeding mechanism 205 then moves across the machine, from the position shown in Figure 10 to that shown in Figure 11, to draw the web material therewith, and subsequently, the fingers 254 and 256 again move downwardly and the fingers 256 cause the grippers to release the web material W and the grippers then remain in opened position until the rollers 255 thereon again move into engagement with the fingers 254 in another cycle of the web feeding mechanism 205.

Measuring and slack-forming mechanism

After the web material W has been drawn across the machine, as shown in Figure 11 but before the fingers 256 have moved downwardly to move the movable jaws 250 of the grippers away from the fixed jaws 247, a web take-up or slack forming bar 283 moves downwardly from the solid line position shown in Figures 6 and 8, through the opening 77 between the proximate edges of the platforms 75 and 76, to move the central portion of the web material W extending across the machine into the opening 77 to thereby take up a predetermined additional amount of web material relative to the idler roll 190 (Figure 6-A) this forming slack in the web material. This slack-forming bar 283 extends transversely of the web material or longitudinally of the machine and is of substantially the same length as the width of the web material W.

The slack-forming bar 283 is fixed on the free ends of substantially L-shaped arms 284, there being two of these arms 284 shown in Figures 1 and 3-D. The arms 284 are fixed on a shaft 285 which extends longitudinally of the machine and is journaled in bearing blocks 286 suitably secured to the uppermost transverse frame members 36 and 42 (Figures 3-B, 3-F, 6, 7-A, 7-B and 8).

The central portion of the shaft 285 is journaled in a bearing block 290 suitably secured to a bracket 291 depending from the transverse frame member 54 (Figures 3-D and 7-B). It will be observed in Figures 3-F, 6 and 7-B, that the rear end of the shaft 285 has a pair of crank arms 292 and 293 fixed thereon, the arm 293 extending radially from the shaft 285 in substantially diametrically opposed relation to the arm 284 and having a counterbalancing weight member 294 swingably depending from the free end thereof to substantially counterbalance the combined weight of the arms 284 and the web take-up or slack-forming bar 283.

The arm 292 extends downwardly, at an angle in Figure 6, and has the upper end of an angularly disposed connecting rod 295 adjustably pivotally connected thereto, to the lower end of which a yoke member 296 is suitably secured. The yoke member 206 straddles, and is guided on, the crankshaft 271 and has a cam follower 297 thereon which engages the periphery of the cam wheel 277 (Figures 6 and 7-B). Thus, the cam wheel 277 controls the swinging movement of the slack-forming bar 283 in timed relation to movement of the web feeding mechanism 205 and the opening and closing of the grippers associated therewith.

Blank advancing or carrier means and web clamping means

A pair of blank clamping or hold-down means function to clamp the web material W against the upper surfaces of conveyor or carrier belts to insure that the subsequently formed blank B is subsequently propelled forwardly in the machine, that is, transversely of the longitudinal edges of the blank. These hold-down plates also co-act with the first folding means to form the first folds on the opposite raw edges of the blank. Although one form of carrier means is shown in substantially all of the drawings, and will first be described, the preferred form of blank advancing or carrier means is shown in Figures 1-A and 24, and will be later described. The left-hand and right-hand hold-down plates are indicated at 300 and 300' in Figures 3-B, 3-D, 3-F, 3-C, 3-E, 3-G, 8, 10 and 12.

The hold-down or clamping plates 300, 300' are shown in elevated positions in Figures 10 and 11, which positions they occupy simultaneously, and they are shown in lowered or operative positions in Figures 7-A, 7-B, 8 and 14. The hold-down or clamping plates 300, 300' are operated to move downwardly from the positions shown in Figures 10 and 11 to that shown in Figure 14 before the fingers 256 move the movable gripper jaws 250 away from the fixed gripper jaws 247 and, also, before the blank is cut from the web by the cutting means 194.

The inner portions of the hold-down or clamping plates 300, 300′ are suitably secured to the lower surfaces of horizontally disposed frame members 301, 301′, which frame members are shown in the form of angle bars and are substantially the same length as the width of the web material W. The clamping plates 300, 300′ and the corresponding angle bars or frame members 301, 301′ extend transversely to the web material or longitudinally of the machine.

The frame members 301, 301′ have the outer ends of respective groups of longitudinally spaced arms 302, 302′ suitably secured thereto, there being four of each of the arms 302, 302′ shown in Figures 1 and 3–B to 3–G, inclusive. The arms 302, 302′ extend inwardly and upwardly and are fixed upon longitudinally extending rocker shafts 303, 303′ journaled in respective pairs of bearing blocks 304, 304′ suitably secured to, and depending from, the uppermost transverse frame members 36, 42.

The rear end of the shaft 303 (Figures 3–F, 3–G and 6–A) has a gear 306 fixed thereon which meshes with a gear 307 fixed on a stub shaft 310. The shaft 310 is oscillatably mounted in a bearing block 311 suitably secured to, and depending from the transverse frame member 42. The shaft 310 extends inwardly a relatively short distance and has an arm 312 fixed thereon which extends upwardly, or towards the observer in Figure 3–G, and has one end of a link 313 pivotally connected thereto.

The link 313 extends substantially across the machine, as shown in Figures 3–G and 8, and is pivotally connected to one end of a crank arm 312 which extends downwardly and is suitably secured to the rocker shaft 303′. It will be observed in Figures 3–F and 6 that the rear end of the shaft 303′ has a pair of oppositely extending arms 314 and 315 fixed thereon, the free end of the arm 314 having a suitable counterbalancing weight member 316 pivotally connected thereto and depending therefrom. The upper end of a connecting rod 317 is adjustably pivotally connected to the arm 315 and extends downwardly and outwardly at an angle, in Figure 6, and has a yoke member 320 fixed thereon which straddles the cam shaft 271.

It will be observed in Figure 7–B that the connecting rod 317 is also bent outwardly so the lower end thereon is disposed outwardly of the cams 276, 277 on the cam shaft 271. The yoke member 320 has a cam follower 321 thereon which rides against the periphery of the cam wheel 275. The cam wheel 275 is of such configuration that the gears 306, 307, in Figure 6–A, will cause the clamping plates 300 and 300′ to move upwardly and downwardly in unison. Now, as the clamping plates 300 and 300′ move downwardly to the position shown in Figure 14, they clamp or hold the web material W against the upper reaches of corresponding endless conveyor or carrier belts 323 and 323′, which extend longitudinally of the machine, and the outer surfaces of which are severally grooved for purposes to be later described.

As the web material W is drawn across the machine by the web feeding mechanism 205 as shown in Figure 11, the web material also rests upon the upper reaches of intermediate carrier belts 324, 325, 324′ and 325′. The upper reaches of the intermediate carrier belts 324, 325 rest upon, and are adapted to move in sliding engagement with, the upper surface of the platform 75. The upper reaches of the intermediate carrier belts 324′, 325′ rest upon, and are adapted to move in sliding engagement with, the upper surfaces of the platform 76. It is evident that the platforms 75 and 76 serve to support the portions of the web or blank disposed between the intermediate carrier belts 324, 325, 324′, 325′.

The rear portions of the outermost or hem supporting endless carrier belts 323, 323′ are mounted on respective flanged rollers or wheels 327, 327′ (Figures 3–F, 3–G, 6–A and 6). The rear portions of the platforms 75 and 76 are provided with openings 330 through which the rear portions of the intermediate carrier belts 324, 325, 324′, 325′ extend and the rear portions of the intermediate carrier belts 324, 325 are mounted on flanged pulleys or wheels 331, the rear portions of the intermediate carrier belts 324′ and 325′ being mounted on flanged pulleys or wheels 331′. The flanged pulleys or wheels 327, 331 are fixed on a transversely extending idler shaft 332 and the pulleys or wheels 327′, 331′ are fixed on a shaft 332′ disposed in axial alinement with the shaft 332.

Certain of the spaced upright support members 56 each has a bearing member 334 suitably secured thereto, only one of which is shown in Figure 7–B, and in which the shafts 332 and 332′ are rotatably mounted. A plurality of longitudinally spaced parallel rollers 336 are rotatably mounted upon and extend outwardly from the frame member 140 for supporting the rear intermediate portion of the upper reach of the outer carrier belt 323 (Figures 9–A and 14) and the forward intermediate portion of the upper reach of the carrier belt 323 is supported by a plurality of rollers 337 carried by, and extending inwardly from, the longitudinally extending frame member 142 (Figures 9 and 15).

It will be observed in Figures 9–A and 10 that the upper reach of the outer carrier belt 323 is urged upwardly and forwardly adjacent the front edge of the hold-down or the clamping plate 300 by a spring-pressed roller 340 rotatably mounted on one end of an arm 341 which extends downwardy at an angle and is pivotally mounted, as at 342, on the longitudinally extending frame member 140. The arm 341 and the roller 340 are normally urged upwardly by a spring 343. The purpose of the spring-pressed roller 340 is to cause the belt 323 to be pressed against the lower edge of the blank to provide sufficient bite to start movement of the blank towards the sewing apparatus.

It will be observed in Figures 7, 7–A, 7–B, 11 and 15 that the longitudinally extending frame members 131 are provided with respective groups of spaced rollers 336′, 337′ for supporting the intermediate portion of the upper reach of the outer carrier belt 323′ in the same manner in which the rollers 336, 337 support the upper reach of the carrier belt 323. The frame member 133 also carries a spring-pressed roller 340′ adjacent the front end thereof. The roller 340′ is carried by the angle bar 133 in the same manner as, and for the same purpose as, the roller 340, carried by the angle bar 140, and a further description thereof is deemed unnecessary.

Referring to Figures 3, 3–A, 4, 5 and 5–A it will be observed that the front end portion of the platform 75 is provided with openings 344 through which the belts 324, 325 extend and engage grooved or flanged pulleys or wheels 345. The front portion of the outer endless belt 323 engages a flanged pulley or wheel 346, the outer front corner of the platform 75 being cut away to accommodate the stitching or sewing mechanism and the adjacent mechanism.

The front end portion of the platform 76 is also provided with openings 347 therein through which the front portions of the endless belts 323, 324′ and 325′ extend and which are mounted on respective flanged pulleys. The front portions of the conveyor belts 324′, 325′ are mounted on flanged pulleys 345′ and the front portion of the carrier belt 323′ is mounted on a flanged pulley 346′.

The transverse shaft 350 is rotatably mounted in bearing blocks 351 suitably secured to the frame members 85, 86 and 87. Opposite ends of the transverse shaft 350 are connected to shafts 352, 353 by means of suitable overriding clutch mechanism 354, 355.

Any suitable overriding clutch mechanism may be employed, similar to that shown in the patent to McKeown, No. 2,509,443 of May 30, 1950, and, therefore, a detailed illustration and description thereof is deemed unnecessary. It might be stated, however, that the overriding clutch mechanisms 354, 355 are provided so the shaft 350 may be driven either by the shaft 352 or the shaft 353, whichever of the shafts 352 or 353 rotates at the greater speed.

The shaft 353 is relatively short and is rotatably mounted in a bearing block 356 suitably secured to the frame member 88. The pulleys 345″, 346′ are fixed on a common transverse shaft 350′ disposed in spaced substantially axial alignment with the shaft 350′. Shaft 350 is rotatably mounted in bearing blocks 351′ suitably secured to the frame members 93 and 94. Opposite ends of the shaft 350′ are connected to stub shafts 352, 353′ by means of overriding clutch mechanisms 354′, 355″ which function in the same manner as the clutch mechanisms 354, 355 heretofore described.

The distal ends of the shafts 352, 352′ project from suitable gear reduction units 360, 360′ suitably secured to the upper surfaces of the respective frame members 84, 95. The purpose of these gear reduction units, which contain suitable gearing therein, will be later described.

The shafts 353, 353′ have respective sprocket wheels 361, 361′ fixed thereon which are engaged by respective sprocket chains 362, 362′ which extend downwardly in Figures 5 and 5-A and engage sprocket wheels 363, 363′. The sprocket wheels 363, 363′ are driven by electric gear reduction motors 364, 364′ suitably secured to the motor support bars 112, 113, respectively, heretofore described (Figures 2, 5 and 5-A). The motors 364, 364′ are preferably of the self-braking type heretofore described.

It will be noted, in Figures 3 and 3-A, that a discharge endless carrier belt 366 is disposed adjacent the foremost portion of each of the main carrier belts 324, 325 and a discharge carrier belt 366′ is disposed adjacent each of the main carrier belts 324′ and 325′. The front portions of he carrier belts 366, 366′ are disposed forwardly of the front portions of the adjacent carrier belts 324, 325, 324′ and 325′ in order to carry the blank off of the front ends of the platforms 75, 76. Of course, the main carrier belts 324, 324′ and 325′ may extend forwardly to the point at which the foremost portions of carrier belts 366, 366′ are disposed, if desired. In this event, the discharge carrier belts 366, 366′ could be omitted.

Each of the carrier belts 366 is mounted on a pair of flanged pulleys or wheels 367, 368, and each of the carrier belts 366′ is mounted on a pair of flanged pulleys or wheels 367′, 368′. The pulleys 366, 367′ are fixed on respective shafts 370, 370′ rotatably mounted in respective series of bearing blocks 371, 371′.

The bearing blocks 371 are fixed on the frame members 85, 86, 87 and 88 and the bearing blocks 371′ are fixed on the frame members 92, 93 and 94. The pulleys 368, 368′ are fixed on respective shafts 372, 372′ rotatably mounted in respective series of bearing blocks 373, 373′. The bearing blocks 373 are fixed on the frame members 86, 87 and 88 and the bearing blocks 373′ are fixed on the frame members 92 and 93.

The shafts 352, 352′ extending from the respective gear reduction units or gear boxes 360, 360′ have respective sprocket wheels 374, 374′ fixed thereon which are engaged by respective sprocket chains 375, 375′ which are also mounted on respective sprocket wheels 376, 376′ fixed on the distal ends of the shafts 370, 370′. Thus, the discharge carrier belts 366, 366′ are driven at the same speed as the adjacent main carrier belts 324, 325, 324′ and 325′.

The electric gear reduction motors 364 and 364′ (Figures 5 and 5-A) may be termed as high speed motors, since the gear reduction units 360, 360′ are instrumental in moving the belts 324, 325, 324′ and 325′, 366, 366′ at a relatively slow speed as the blank passes through the stitching mechanism and as will be later described.

Cutter mechanism

While the web material W is clamped against the outside endless carrier belts 323, 323′ by the clamping plates 300, 300′, and at substantially the same time that the fingers 256 (Figure 11) move downwardly to release the web material W from the grippers, the blank B is cut from the web material by an endless ribbon-like cutting blade 380, one of the reaches of which moves upwardly between the clamping plate 300 and the inner edge of the web feed and clamp plate 145. The cutting blade 380 is a part of the improved cutting mechanism 194 and is substantially enclosed within the casing or housing including the inverted U-shaped intermediate shield and the enlarged wheel housings 195, 196.

It will be observed that the blade shield 193 is held in fixed relation to the end housings or wheel housings 195, 196 by a cutter mechanism frame member or bar 381 to which the blade housing 193 is suitably secured, as best shown in Figure 10. Opposite ends of the bar 381 are suitably secured to the housings 195 and 196, as by bolts 383 (Figures 3-B and 3-G). The removable covers for the wheel housings 195, 196 are omitted in Figures 3-C and 3-G for purposes of clarity. The bar 381 has three downwardly extending projections 385 thereon, only one of which is shown in Figure 10, and each of which is pivotally connected, as at 386, to a corresponding bearing block 387. Each of the bearing blocks 387 is suitably secured to the horizontal leg of an inverted substantially L-shaped bracket 390 suitably secured to the longitudinally extending frame member 11 (Figures 3-C, 3-E, 3-G and 10).

In order that the inner reach of the cutting blade 380 moves upwardly at an angle to cut the web material W progressively from one selvage edge to the other thereof, the bearing block 387 adjacent the rear end of the bar 381 is disposed at a slightly higher level than the corresponding bearing block adjacent the opposite end of the bar 381 Figure 25. It is evident that this positions the rear portion of the blade 380 at a higher elevation than the front portion thereof.

The blade 380 is mounted on wheels 391, 392 (Figures 3-C and 3-G). The wheel 392 is rotatably mounted on a stub shaft 394 which extends downwardly and is suitably secured to the lower wall of the front end housing 195. The rear wheel 391 is fixed on a substantially vertically disposed shaft 395 journaled in the lower wall of the wheel housing 196 and which extends downwardly below the housing 196 and has a grooved pulley 396 fixed thereon. The grooved pulley 396 is engaged by a belt 397 (Figure 6-A) which also engages a grooved pulley 400 driven by an electric motor 401. The electric motor 401 has corresponding ends of the lead wires 182 and 183 connected thereto for energization thereof.

In order to maintain the intermediate portion of the inner reach of the cutting blade 380 in a substantially straight line between the wheels 391, 392, the blade 380 rides upon a pair of spaced grooved guide wheels or rollers 402 rotatably mounted in the free inner ends of corresponding arms 403 which extend outwardly beneath the frame members 146 and 147 (Figures 3-E and 13) and are suitably secured to the lower surface of the bar 381. It is evident, in Figure 10, that the lower edge of the cutting blade 380 is flat and the upper edge thereof is preferably razor sharp.

The lower edge of the blade 380 is also supported adjacent the wheels 391, 392 on suitable rollers 404, 405 carried by the respective wheel housings 195, 196. A roller 406 is also provided adjacent the roller 405 which engages the inner surface of the blade 380 to insure that the inner reach thereof is properly aligned transversely of the longitudinal edges of the web material W.

Cam controlled means are provided to oscillate the cutting mechanism 194 in timed relation to the operation of the web feeding mechanism 205 and the clamping plates 300, 300′. Referring to Figures 3-E, 3-G and 10, it will be observed that the bar 381 has a pair of arms 10 suitably secured thereto and projecting inwardly therefrom, to the inner ends of which the upper ends of corresponding connecting rods 411 are adjustably pivotally connected, only one of which is shown in Figures 10 and 13. It will be observed in Figure 13 that each of the connecting rods 411 has a yoke member 412 fixed to the lower end thereof which straddles the cam shaft 208 and is provided with a cam follower 413. The cam followers 413 engage the periphery of a cam wheel 414 fixed on the cam shaft 208 heretofore described.

The cam wheels 414 are of such configuration that they will rock the cutting mechanism 194 to cause the inner each of the cutter blade 380 to sever the blank B from the web material W preparatory to the first folding operation.

Cam shafts and drive means therefor

It will be observed in Figures 6 and 6–A that the cam shaft 208 extends in spaced parallel relation to the cam shaft 271, these shafts being adjacent the sides of the machine. The cam shaft 208 is rotatably mounted in bearing blocks 415 to 418 inclusive (Figures 6–A, 5–A, 9 and 13). The bearing blocks 415, 418 are suitably secured to the respective transverse frame members 26, 24. The bearing block 417 is suitably secured to a plate 421 fixed to the transverse frame member 25 (Figures 2 and 9) and the bearing block 416 is suitably secured to a support 422 projecting inwardly from the frame leg 22 (Figure 13).

The shaft 208 has a bevel gear 423 fixed intermediate the ends thereof which meshes with a bevel gear 424 (Figure 9) fixed on one end of a transverse shaft 425. The transverse shaft 425 is rotatably mounted in bearing blocks 426 suitably secured to the plates 274, 421 and has a bevel gear 427 fixed thereon which meshes with a bevel gear 430 fixed on the front end of the cam shaft 271. The transverse shaft 425 is driven in order to drive the shafts 271 and 208, by a sprocket wheel 431 fixed on the left-hand end of the shaft 425 in Figure 9. The sprocket wheel 431 is driven by a sprocket chain 432 which is also mounted on a sprocket wheel 433 driven by an electric motor 434 (Figures 3–B, 7–A, 9 and 23–A).

The electric motor 434 has wires 435, 436 connected to opposite sides thereof which are connected at their other ends to the respective lead wires 182 and 183 in Figure 23–A. These lead wires extend to Figure 23 and the lead wire 182 is connected to one side of a master switch 437, to the other of which a wire 440 is connected. The other end of the wire 440 and the corresponding end of the lead wire 183 are connected to opposite sides of a plug 441 adapted to be plugged into a suitable source of electrical energy, not shown.

First fold mechanism for narrow hem

As heretofore stated, as the pressure applying plates 300, 300' move downwardly, the web material W is pressed against the outermost belts 323, 323' and remain in this position during the cutting and first folding of the web W. After the blank B is cut from the web material W, a pair of first fold devices move inwardly to fold the raw edges of the blank over the pressure applying plates 300 and 300'.

It will be observed in Figure 10 that there is spaced above and outwardly of the outermost endless belt 323 a narrow hem folding bar 441 which extends transversely of the longitudinal edges of the web material W and upon which the web material rests as it is drawn across the machine by the web feeding mechanism 205. The outer edge of the narrow hem forming member 441 has a longitudinally extending guide element 442 on the outer edge thereof and projecting downwardly therefrom below the lower surface of the bar 441. As shown in Figure 14 the guide element assists in sliding the overlapping narrow hem portion B-1 of the blank B over the pressure applying plate 300 as the narrow hem folding bar moves inwardly from the position shown in Figure 10 to that shown in Figure 14.

Opposite ends of the bar 441 extend beyond the tracks 46, 47 and are suitably secured to the lower ends of arms 444, 445 (Figures 3–G, 6–A, 9 and 10). The upper ends of the arms 444, 445 are fixed to opposite ends of a rocker shaft 446 which extends longitudinally of the machine and is oscillatably mounted in bearing blocks 447 suitably secured to the transverse frame members 36, 42. The rear end of the shaft 446 (Figure 6–A) also has a crank arm 450 fixed thereon to which the upper end of a connecting rod 451 is adjustably pivotally connected.

It will be observed that in Figures 3–G and 6–A this connecting rod 451 extends downwardly between the frame 10 and the wheel housing 196 of the cutting mechanism 194. The lower end of the connecting rod 451 has a yoke member 452 fixed thereon which is provided with a cam follower 453 which rides upon the periphery of a cam wheel 454. The cam wheel 454 is fixed on the cam shaft 208 and is of such configuration as to cause the narrow hem folding bar 441 to move inwardly, from the position shown in Figure 10 to that shown in Figure 14, immediately following the cutting of the blank B from the web material W. The folding bar 441 also remains in the position shown in Figure 14 until the corresponding blank has been moved forwardly by the carrier belts beyond the front end of the folding bar 441.

First fold mechanism for wide hem

It will be observed in Figure 11 that the leading raw edge of the web material W lies across a wide hem folding element, shown in the form of a plate 460, when the web feeding mechanism 205 is retracted to the position shown and when the jaws 247, 250 of the grippers are opened. The web material W then rests upon the wide hem folding plate 460 and is held against the belt 323' by the pressure applying plate 300'.

The plate 460 is slightly longer than the width of the blank and is held for sliding movement longitudinally of the blank and transversely of the machine on a spacing bar or block 461 by a plurality of shoulder screws 462 (Figures 3–B and 3–F), the plate 460 being slotted, as at 463, for reception of the shoulder screws 462. It is evident that the wide hem folding plate 460 occupies the position shown in Figure 11 as the pressure applying plate 300' moves to operative position and, following the cutting of each blank B from the web material, the wide hem folding plate 460 is moved from the position shown in Figure 11 to that shown in Figure 14 by means to be presently described.

Referring particularly to Figures 3–B, 3–F and 8, it will be observed that the wide hem folding plate or element 460 is pivotally connected to a pair of longitudinally spaced arms 465, as by hinges 466. The bars 465 are substantially horizontally disposed and extend outwardly and are pivotally connected, as by hinges 467, to the upper ends of substantially vertically disposed rocker arms 470 (Figure 8). The rocker arms extend downwardly and are fixed on a longitudinally extending shaft 471 oscillatably mounted in a pair of bearing blocks 472 suitably secured to the inner surface of the longitudinally extending frame member 12 (Figures 7–A, 7–B, 8 and 9).

The front end of the shaft 471 has a crank arm 473 fixed thereon which extends inwardly and has the upper end of a connecting rod 474 pivotally connected thereto, the lower end of which has a yoke member 475 fixed thereon. The yoke member 475 has a cam follower 476 thereon which resiliently engages the periphery of the cam wheel 278 (Figures 7–A and 9) under the influence of springs 477 (Figure 8). It is evident that the cam wheel 278 is of such configuration as to cause the folding plate 460 to move to the position shown in Figure 14 and to remain in this position until the blank B has been moved beyond the front edge of the wide hem folding element 460. As the wide hem folding element 460 moves inwardly, it forms a wide hem portion B-2 which overlaps the corresponding edge portion of the blank B and rests upon the pressure applying plate 300'.

*Underfold or double hem fold mechanism*

When a blank B has been cut and the first folds made to form the narrow and wide hems B-1, B-2, the electric motors 364, 364' (Figures 5 and 5-A) are energized, by means to be later described, to effect forward movement to the upper reaches of the main carrier belts 323, 324, 325, 323', 324' and 325'. The pressure applying plates 300, 300' cause sufficient traction between the blank B and the belts to cause the blank to advance forwardly therewith, or transversely to the longitudinal edges of the web material W.

The underfolding mechanism, to be presently described, is substantially the same as, and may be identical to, that shown in Figures 23 to 34, inclusive, of said Anderson Patent No. 2,053,257. However, a description thereof is provided, in order that the present invention may be clearly understood. As the front edge of the blank B moves forwardly, the proximal portions of the overlapping narrow and wide hems B-1, B-2 ride onto respective folder guide plates 480, 480'.

It is to be noted that, since the underfolding mechanism, to be presently described, at the left-hand side of the machine is shown more in detail than that at the right-hand side of the machine, the folding mechanism at the right-hand side of the machine shall bear the same reference characters as the folding mechanism at the left-hand side of the machine, but shall have the prime notation added and the left-hand folding mechanism will be described in detail.

It will be observed in Figures 7 and 15 that the hem guide plates 480, 480' are suitably secured to the lower ends of a plurality of vertically disposed longitudinally spaced threaded rods 481, 481', the upper ends of which penetrate longitudinally extending auxiliary support bars 482, 482' which are, in turn, suitably secured to longitudinally extending frame members 483, 483', shown in the form of angle bars in Figures 7, 7-B and 15. The auxiliary support bars 482, 482' are spaced below the respective angle bars 483, 483' by suitable spacing collars 484.

The front and rear ends of the angle bars 483, 483' are suitably secured to the lower ends of vertically disposed frame members or supports 485, 486 and 485' and 486', the upper ends of the frame members 485, 485' being suitably secured to the transverse frame member 70 and the upper ends of the frame members 486, 486' being suitably secured to the transverse frame members 36 (Figures 5, 5-A, 7, 7-A and 9). It will be noted, however, that the rear end of the angle bar 483 is secured to the lower end of the frame member 486 by means of a plate 487 to which the rear end of the angle bar 483 is secured (Figure 3-C) and this plate 487 being fixed to the lower end of the frame member 486. The plate 487 is provided for supporting bearing blocks 490. Bearing blocks 490' are suitably secured to an angle bracket 492 at the opposite side of the machine (Figure 9).

The angle bracket 492 is suitably secured to the transverse frame member 36. The bearing blocks 490, 490' rotatably support stub shafts 493, 493' on the right-hand ends of which flanged pulleys or rollers 494, 494' are fixedly mounted. The rollers 494, 494' carry respective endless pressure applying or resilient clamping belts 495, 495', the lower reaches of which are held in engagement with the upper reaches of the respective outside carrier belts 323, 323' by means of a plurality of respective spring-pressed rollers 496, 496' (Figures 7, 7-A and 15). The rollers 496, 496' are carried by arms 497, 497' pivoted on the longitudinally extending frame members 483, 483' and are normally urged downwardly by respective springs 500 and 500' (Figures 15 and 29).

It will be noted that the rollers 496, 496' are disposed above corresponding rollers 337, 337' to urge the lower reaches of the pressure applying carrier belts 495, 495' downwardly to clamp the hems B-1 and B-2 of the blank B against the upper reaches of the outside carrier belts 323, 323'.

The carrier belts 323, 323' are grooved longitudinally thereof and the pressure applying belts are also provided with longitudinally extending grooves forming projections which register with the grooves in the carrier belts 323, 323' to insure that the hems B-1 and B-2 are maintained in parallel relation to each other as the blank B is advanced through the machine. This also serves to provide traction between the carrier belts 323, 323' and the pressure applying belts 495, 495'.

The front portions of the endless pressure applying or clamping belts 495, 495' are mounted on respective pulleys 501, 501' (Figures 5, 5-A and 16) rotatably mounted on the proximate ends of relatively short shafts 502, 502'. The shafts 502, 502' are fixed in the rear ends of horizontally disposed bars 503, 503' (Figures 3, 3-A and 5-A). These bars extend forwardly and are fixed to the upper ends of vertically disposed bars or support members 504, 504', the lower ends of which are suitably secured to the front edges of the respective sewing machine support brackets 125, 126. It will be noted that these pressure applying or clamping belts 495, 495' are idler belts and are driven through engagement with either the corresponding carrier belts 323, 323' or the blank B passing therebetween.

In order to turn the raw edge of the hem inwardly between the blank and the hem the following means are provided:

Referring particularly to Figures 17 to 22, inclusive, there is shown an under-folding or double hem folding mechanism broadly designated at 510, this being the folding mechanism disposed at the left-hand side of the machine in Figure 3 and as shown in Figure 7. A folding mechanism 511 is disposed at the right-hand side of the machine in Figure 3-A which is identical to the folding mechanism 510 except being opposite hand. Therefore, only the folding mechanism 510 will be described in detail and those parts of the folding mechanism 511 shown in the drawings shall bear the same reference characters. It is to be noted that the underfolding devices 510 and 511 are disposed inwardly of, and closely adjacent, the respective carrier belts 323, 323' and the respective pressure applying belts 495, 495'.

It will be observed in Figure 7 that the front end of the auxiliary support member 482' terminates substantially short of the front end of the longitudinally extending frame member 483 and adjacent the rear end of a bar 512 which is also suitably secured to the lower surface of the frame member 483' and held in spaced relation thereto by suitable spacing members 513. The folding mechanism 510 is supported in spaced relation below the auxiliary frame member 512 by a pair of threaded rods or bolts 514 and 515. The lower end of the bolt or threaded rod 514, in Figure 18, supports the rear portions of a top hem guide plate 520, a hem-folder plate 521 and a hem-turning plate 522, the latter serving as a spacer between the plates 520 and 521 at the rear portions thereof.

It will be noted, in Figure 18, that the upper surface of the hem guide bar or plate 480' is disposed at the same level as the upper surface of the top hem guide plate 520 and terminates in closely spaced relation thereto. In order to guide the corresponding hem B-2 downwardly between the top hem guide plate 520 and the hem-folder plate 521, the rear edge portion of the top hem guide plate 520 is cut away and bent upwardly, as at 523, and has a lead-in plate 524 suitably secured thereto which extends rearwardly and upwardly at an angle above the hem guide plate 480'. Thus, the lead-in plate 524 leads the hem B-2 downwardly from atop the hem guide plate 480' and between the plates 520 and 521, as shown in Figure 20.

As the blank B advances forwardly, the raw inner edge of the hem B-2 passes over an opening 525 in the hem folding plate 521. The hem folding plate 521 also has an elongated passageway 526 communicating with the opening 525 and extending rearwardly therefrom. The hem turning plate 522 has a down-turned flange portion 527 integral therewith which, at the rear end thereof, is of zero thickness or vertical height and gradually tapers downwardly and forwardly at the lower edge thereof and extends through the slot or passageway 526.

Thus, as the hem B-2 moves forwardly, the raw edge thereof passes beneath the portion of the hem-folder plate 521 which extends over the opening 525 and is then directed downwardly by the down-turned flange 527 and thus depends through the opening 526.

In order to insure that the body portion of the blank B is spaced from the lower surface of the hem-folder plate 521 sufficiently to permit the raw edge of the hem B-2 to depend from the plate 521 through the passageway 526, there is provided a hem spreader element or plate 530 which, as shown in Figure 18, is provided with a downwardly and rearwardly curving lower rear edge which is disposed immediately forwardly of the opening 525 and engages the main body portion of the blank, causing the same to move downwardly away from the corresponding hem B-2 as is clearly shown in Figures 21 and 22.

After the raw edge of the hem B-2 has been turned downwardly through the passageway 526 by the flange 527 of the hem-turning plate 522, the portion of the raw edge of the hem B-2 extending through the passageway 526 engages a forwardly and outwardly inclined or beveled edge 532 of a bottom hem guide plate 533. The hem guide plate 533 is suitably secured to the lower surface of a spacing bar 534 which is flush with the inner edge of the bottom hem guide plate 533 and is of substantially less width than the plate 533. As a matter of fact, the outer edge of the spacer bar or plate 534 terminates at the corresponding inner wall of the passageway 526.

The plate 534 is suitably secured to the hem-folder plate 521. The bolt or threaded rod 515 serves to support the front portions of all of the plates 520, 521, 522, 533 and 534 as is clearly shown in Figure 22.

It will be noted that the slot or passageway 526 in the hem-folder plate 521 forms a relatively narrow hem shaping portion 521a on the plate 521 about which an under-fold B-3 is formed on the hem B-2. This underfold B-3 is ultimately formed as the depending raw edge of the hem B-2 shown in Figure 21 moves forwardly and engages the beveled edge 532 of the bottom hem guide plate 533 to thus be folded inwardly as shown in Figure 22.

It will be noted that the portion 521a of the plate 521 extends forwardly beyond the front edges of all the other plates of the folding mechanism 510 to thereby maintain the underfold B-3 in substantially the position shown in Figure 22 relative to the hem B-2 per se as the body portion of the blank B is moved upwardly against the underfold B-3 by an upwardly and forwardly inclined blank elevating plate 535 (Figures 3, 3-A, 7 and 18). The front edges of the front portions of the plates 535 are suitably secured to the transverse frame members 80 and 81.

*Stitching devices and control means therefor*

The front ends of the portions 521a of the corresponding underfolding mechanisms 510 and 511 terminate closely adjacent and rearwardly of the sewing machines generally designated at 540 and 540' (Figures 3, 3-A, 5, 5-A and 16). The sewing machines are entirely conventional and need not be described, except that, of course, right and left-hand machines will be used, and the machines are preferably of the type shown in Singer catalogue Form 29664(148) or Model No. 400W21.

The sewing machines 540, 540' are controlled automatically to start operating when the folded hems B-1 and B-2 of each successive blank B is at the stitch forming instrumentalities and to stop the sewing machines immediately after each successive blank is completed as a bed sheet or the like. Also, as the leading ends of the hems approach the front ends of the underfolding mechanisms 510, 511, the carrier belts 323, 323', 324, 324', 325, 325' are stopped momentarily while the presser feet 541, 541' (Figure 16) associated with the sewing machines 540, 540' are moved downwardly to operative position by electrically operated means and while the electrically controlled shifting mechanism operates to subsequently cause said carrier belts to move at a relatively slower speed, as is necessary in the sewing of the hems.

The sewing machines 540, 540' are provided with base plates 542, 542' which are conventional in all respects with the exception that they are provided with respective grooves 543, 543' (Figure 16) in which the upper reaches of the outermost carrier belts 323, 323' have sliding movement. These grooves 543, 543' are provided to insure that the opposite edge portions of the blank B will lie upon and slide in engagement with the upper surfaces of the sewing machine base plates 542, 542', as shown in Figure 16, during the sewing operations.

It might be stated that the present sewing machines 540, 540' are preferably devoid of any feed dogs or any auxiliary feeding means or the like for feeding the blank B through the sewing machines 540, 540', the speed at which the blank B passes through the sewing machines being determined entirely by the speed of the carrier belts, thus providing means whereby the speed of the blank B through the sewing machines 540, 540' may be regulated independently of the speed of the sewing machines 540, 540' and thereby providing means whereby the length of the stitches formed by needles N and N' (Figure 16) of the respective sewing machines 540, 540' may be varied as desired.

The base plates 542, 542' of the respective sewing machines 540, 540' are suitably secured to the respective sewing machine brackets 125, 126 and to the frame members 80, 81. Referring to Figures 3, 3-A, 5, 5-A and 7, it will be observed that, as the front edge of each successive blank B approaches the front ends of the underfolding mechanisms 510, 511, the front edge thereof engages and raises a pair of switch operating feeler fingers 544, 544' which depend from, and are pivotally connected to, respective normally closed stop switches 545, 545'. These switches are of the type that, upon upward movement of the fingers 544, 544', they open and remain open until the blank moves therebeyond.

The switches 545, 545' are adjustably secured, for forward and rear adjustment, on arms 546, 546' suitably secured to, or integral with, respective brackets 547, 547' which extend upwardly in Figures 5, 5-A and 7 and are suitably secured to the transverse frame member 70. The arms 546, 546' also have normally open stop switches 550, 550' adjustably secured thereto for forward and rearward adjustment thereon.

The switches 550, 550' are also provided with pivoted switch operating feeler fingers 551, 551' which are adapted to be engaged by the leading edge of each successive blank B and moved upwardly. The switches 550, 550' operate opposite to the switches 545, 545' in that they close and subsequently open as the fingers 551, 551' move downwardly and as the trailing edge of the blank moves therebeyond. It will be observed in Figures 3 and 3-A that the platforms 75, 76 are provided with respective slots 552, 552' through which the lower ends of the corresponding switch operating fingers 544, 544', 551 and 551' normally extend at an angle, substantially as shown in Figures 7 and 23, in order to insure that these fingers are engaged and elevated by the blank B passing therebeneath.

As heretofore stated, after the web feeding mechanism 205 has moved to the retracted position, as shown in Figure 12, and the first fold has been completed, the high speed electric motors 364 and 364' (Figures 5 and 5-A) are energized to cause the carrier belts 323, 323', 324, 324', 325 and 325' to advance the blank B through the machine until the front or leading edge of the blank engages the switch operating feeler fingers 544, 544'. To this end, it will be observed in Figures 3–C and 23 that the cam shaft 208 has a cam wheel 560 fixed thereon which is shown in the form of a collar having an adjustment screw thereon adapted to engage a switch actuating arm 561 of a normally open momentary contact start switch 562. The switch 562 is suitably secured to a vertically disposed plate 563 suitably secured to, and depending from, the longitudinally extending frame member 11.

The switch 562 has wires 562a, 562b extending therefrom to a magnetic relay 564 which, in turn, has wires 564a, 564b extending therefrom to the respective wires 182, 183 (Figure 23). The magnetic relay 564 is one of four identical magnetic relays, the other three of which are indicated at 565, 566 and 567 in Figure 23.

All of these magnetic relays 564 to 567 may be identical and of a type such as is manufactured by said Allen-Bradley Company and which is shown in said Sweet's File For Product Designers, section 3b/1, page 8 and which is termed as a Form 2, Bulletin 709 solenoid across-the-line switch. Since there are many other types of conventional magnetic relays which may serve as the relays 564 to 567, inclusive, no attempt will be made herein to describe the magnetic relays in detail and only the function of the magnetic relays will be described.

Wires 562c, 562d are connected at corresponding ends to the respective wires 562a, 562b, the other ends of these wires being connected to the magnetic relay 565. The magnetic relay 565 has wires 565a, 565b extending therefrom to the respective lead wires 182, 183. Upon switch 562 being momentarily closed, by cam 560 engaging and moving the switch actuating arm 561, a circuit is completed to each of the electric motors 364, 364' since the magnetic relays 564, 565 are energized, causing current to flow through respective pairs of wires 570, 570a and 571, 571a which extend from the magnetic relays 564, 565 to opposite sides of the respective motors 364, 364'.

The magnetic relays 564 to 567, inclusive, are each of the type which remains closed upon the corresponding start switch being momentarily closed and then opened and until the corresponding stop switch is closed and then opened, because the operating coil, not shown, of each of the magnetic relays 564 to 567 is continuously energized through a conventional hold-in contact, until the corresponding stop switch is closed and then opened, as is well known to those familiar with solenoid across-the-line switches.

Now the stop switches 545, 545' have respective pairs of wires 572, 572a and 573, 573a connected to opposite sides thereof and which extend therefrom to the respective magnetic relays 565 and 564.

These normally closed switches 545, 545', upon being opened, through engagement of the leading edge of each successive blank B with the feeler fingers 544, 544', will de-energize the magnetic relays 564 and 565 thereby opening the circuits to the respective motors 364 and 364' to thus stop the carrier belts.

It is to be noted that the stop switches 545, 545' control the stopping of the electric motors 364, 364' independently. This insures that the carrier belts at one half of the machine are driven independently of the carrier belts at the other half of the machine in the event the leading edge of the blank becomes skewed and engages first one of the switches 545 or 545' and then the other. Thus, one of the switches 545, 545' will stop one of the electric motors 364, 364' and then the other of the electric motors will stop, thereby insuring that the leading ends of the hems B-1 and B-2 are positioned in alinement with each other or a uniform distance rearwardly of the needles N and N' of the sewing machines 540 and 540'.

The correcting of the skew in the blank B is the primary reason why the two switches 545 and 545' are provided, since it is evident that these switches could be omitted and a single switch could be provided to control the stopping of the motors 364 and 364' and to simultaneously start the sewing machine motors 580 and 580'.

The sewing machine motors 580 and 580' may also be termed as slow speed motors for the carrier belts which advance the blank B through the machine, since they are instrumental in driving the sewing machines and driving shafts 350, 350' at a relatively slow speed.

At the proper time, after the leading edge of the blank has raised both of the switch operating fingers 544, 544' to open the switches 545, 545', a cam member 581 fixed on the shaft 208 engages a switch actuating arm 582 to momentarily close a momentary contact start switch 583.

The cam member 581 is shown as being identical to the cam member 560 and is also fixed on a shaft 208. The switch 583 is suitably secured to the plate 563 (Figures 3–C and 23). The start switch 583 has a pair of wires 583a, 583b extending therefrom to the magnetic relay 566, which relay has wires 566a, 566b extending therefrom to the respective lead wires 182 and 183.

Corresponding ends of wires 583c, 583d are connected to the respective wires 583a, 583b, the other ends of the wires 583c, 583d being connected to the magnetic relay 567. The magnetic relay 567 also has wires 567a, 567b extending therefrom and connected to the respective lead wires 182 and 183. The relays 566, 567 have respective pairs of wires 584, 584a and 585, 585a extending therefrom. The ends of wires 584, 585 remote from the magnetic relays 566, 567 are connected to one side of the respective motors 580, 580'.

The opposite sides of the motors 580, 580' have respective wires 586, 587 extending therefrom which are connected to one side of respective solenoid coils 590, 591 suitably supported beneath the respective sewing machines 540', 540 as shown in Figures 5, 5–A and 7. In this instance, each of the solenoid coils 590, 591 is disposed in a suitable housing suitably secured to the transverse frame member 65 by means of rigid strap members 592. The sides of the solenoid coils 590, 591 (Figure 23), remote from the ends to which the respective wires 586, 587 are connected, have the respective wires 584a, 585a connected thereto.

Referring to Figures 5 and 5–A, it will be observed that the solenoid coils 590 and 591 surround solenoid plungers 593, 594, each of which has suitable connections thereon for controlling the positions of the corresponding presser feet 541, 541' (Figure 16).

To this end, each of the solenoid plungers 593, 594 has a link 595 connected thereto which extends upwardly and is pivotally connected to one end of a lever 596 disposed within the housing of the corresponding sewing machines 540, 540'. Each of the levers 596 is pivoted intermediate its ends in said housing and is connected, at its end remote from the end to which the link 595 is connected, to the upper end of a vertically movable presser foot shaft 597. The lower ends of the shafts 597 support the presser feet 541 and 541'. The presser foot lifting mechanism is similar in all respects to the presser foot lifting mechanism in said Anderson patent, except, in the present instance, the same are operated by electrical solenoid means whereas in the Anderson patent they are operated by cam 310.

Referring again to Figure 23, it will be observed that the magnetic relays 567, 566 have respective pairs of wires 600, 600a and 601, 601a extending therefrom which are connected at their other ends to opposite sides of the respective stop switches 550, 550'. Now, as the start switch 583 is closed by the cam 581, this energizes the slow speed or sewing machine motors 580, 580'. Referring to Figures 3, 3–A, 5, 5–A and 7, it will be observed that the electric motors 580, 580' are suitably secured to the respective pairs of motor support bars 115, 122. The motors 580, 580' have respective pairs of V-pulleys 605, 606 and 605', 606', the pulleys 606, 606' preferably being of the adjustable type for varying the effective pitch diameter thereof.

The pulleys 605, 606, 605' and 606' are engaged by respective belts 610, 611, 610' and 611'. The belts 610, 610' are preferably circular in cross-section and are mounted on respective pulleys 612, 612' for driving the respective sewing machines 540, 540'. The belts 611, 611' are preferably V-belts and are mounted on variable-pitch or expanding pulleys 613, 613' which are mounted on the outer ends of respective stub shafts 614, 614' extending from the respective gear reducing units 360, 360' to thus drive the respective shafts 352, 352'.

The expanding pulleys 613, 613' may be of any desired construction, such as the pulley shown in the patent to D. J. Abbott, No. 1,662,654 of March 13, 1928, and, therefore, a detailed description thereof is deemed unnecessary. As shown in said Abbott patent, the outer portions of each of the expanding pulleys 613 and 613' may be moved relative to the inner portions thereof and the inner and outer portions are keyed relative to the shafts 614, 614'. In order to provide means for adjusting the speed at which the shafts 614, 614' are driven, the outer ends of the hubs of the expanding pulleys 613, 613' are engaged by respective adjustment screws 615, 615' which threadably penetrate substantially L-shaped arms 616, 616'. These arms extend inwardly and are suitably secured to brackets 617, 617' which extend downwardly and are suitably secured to the respective frame members 84, 95.

It is thus seen that, upon de-energization of the electric motors 364, 364', which causes the shafts 350, 350' to cease rotation, the electric motors 580, 580' are subsequently energized to drive the shafts 350, 350', 370 and 370' at a relatively slower speed, by virtue of the overriding clutch mechanisms 354, 354'. It is evident that, upon the start switch 583 being momentarily closed, the magnetic relay 567, in turn, simultaneously energizes the electric motors 580, 580' and the solenoid coils 590, 591 with the result that the carrier belts will then again advance the blank and the presser feet 541, 541' will be moved to operative position, as shown in Figure 16, to sew the hems.

Before the leading edge of the blank has reached the stitching instrumentalities of the sewing machines 540, 540', it will engage and raise the switch actuating fingers 551, 551' to close the switches 550, 550' but the switches 550, 550' will have no effect at this time. However, the switches 550, 550' will serve to de-energize the respective magnetic relays 566, 567 upon the trailing edge of each successive blank moving beyond the switch actuating fingers 551, 551'. This permits the fingers 551, 551' to move downwardly to open the switches 550, 550' to thereby automatically stop the corresponding electric motors 580, 580' upon each successive blank passing through the sewing machines and to also de-energize the solenoids 590 and 591 to raise the sewing machine presser feet.

The switches 550, 550' also function similar to switches 545, 545' in that they will insure that the entire length of each of the hems B–1 and B–2 is stitched before the corresponding electric motor 580 or 580' is stopped.

*Electric control for web feeding mechanism and cutting mechanism*

During the period that each successive blank is being advanced by the carrier belts, folded and passed through the sewing machines 540, 540', the web feeding mechanism 205 occupies substantially the position shown in Figure 11, with the exception that the fingers 256 are in a lowered or operative position and the jaws 250 are in opened position and, of course, there will be no blank or web material extending across the machine. It will be observed in Figure 11 that the frame member 216 of the web feeding mechanism 205 has a switch control plate or abutment 625 thereon which engages a switch actuating arm 626 of a momentary contact stop switch 627 while the web feeding mechanism 205 is in the retracted position shown in Figure 11.

The switch 627 operates to momentarily close and then open for momentarily de-energizing one side of the reversing magnetic relay 245 shown in Figure 23–A. The switch 627 has wires 627a, 627b extending to one side of the reversing magnetic relay 245. This de-energizes the electric motor 242 (Figures 6 and 7–B) to stop the web feeding mechanism 205 in substantially the position shown in Figure 11.

Referring to Figures 3–C and 23–A it will be observed that the cam shaft 208 has a cam 630 fixed thereon which is shown in the form of a collar having an adjustment screw thereon, and which cam is adapted to engage a switch actuating arm 631 of an advancing start switch 632 suitably secured to the plate 563. The cam 630 is so arranged that it will close the switch 632 immediately following the de-energization of the slow speed or the sewing machine motors 580 and 580' to again energize the electric motor 242 to drive the cable 221 in a clockwise direction in Figures 10 and 11 and to thus advance the web feeding mechanism 205 from the position shown in Figure 11 to that shown in Figure 10.

The switch 632 has wires 632a, 632b extending therefrom to one side of the reversing magnetic relay 245 to cause energization of the electric motor 242 in one direction.

It has already been described how the fingers 254, 256 operate to open and close the grippers on the web feeding mechanism 205 at the proper time and, as the web feeding mechanism 205 approaches the advanced position shown in Figure 10, a horizontal bar 633 suitably secured to the outer surface thereof (Figures 9 and 12) engages a switch actuating arm 633a to momentarily close a stop switch 634. The stop switch 634 has wires 634a, 634b extending therefrom to the reversing magnetic relay 245, which is so arranged as to again stop the electric motor 242.

The motor 242 will then stop almost instantly, due to its self-braking feature, and the web feeding mechanism 205 will then have advanced to the position shown in Figure 10, in which position it is accurately located by a suitable bumper 636 which is engaged by the bar 633. This bumper 636 is suitably secured to a rib portion projecting from the plate 51. The switch 627 is suitably secured to an angle bracket 637 which is suitably secured to the longitudinally extending frame member 12.

The switch 634 is adjustably secured to a bracket or slotted bar 640 suitably secured to the rib portion 51a of the support or plate 51 (Figure 10). It is to be noted that, as the carriage plate 207 of the web feeding mechanism 205 moves to the position in Figure 11, the rear edge of the plate 207 engages a resilient bumper 641 suitably secured to an angle bracket 642 secured to the track 47. The bumper 641 insures that the grippers are accurately positioned relative to the wide hem first folding means.

While the motor 242 is stopped, the leading raw edge of the web material W is gripped by the grippers in the manner heretofore described, and then a cam 645 (Figures 3–C and 23–A) fixed on the cam shaft 208 engages and moves a switch actuating arm 646 to momentarily close a momentary contact retracting start switch 647 suitably secured to the plate 563 heretofore described. The switch 647 has wires 647a, 647b extending therefrom to the opposite side of the reversing magnetic relay 245 from that to which the wires 632a, 632b are connected to thus energize the electric motor 242, but to cause the same to rotate in the opposite direction from that heretofore described and to cause the lower reach of the endless cable 221 to move the web feeding mechanism 205 from advanced to retracted position.

The clamping, cutting and first fold operations are then again repeated in the manner heretofore described to complete a cycle in the operation of the web feeding mechanism 205. The cutting mechanism 150 is driven continuously, since the wires 435, 436 extending from the motor 434 are connected to the respective lead wires 182, 183 and, of course, the cam 427 (Figure 9) controls the movement of the inner reach of the cutting blade 380 to cut the blank from the web material at the proper time.

*Modified form of blank advancing means*

The machine as heretofore described is so arranged that each successive bed sheet or blank B is completed before the web is again drawn across the machine preparatory to forming a succeeding bed sheet or blank. It is evident that this would substantially limit the productive capacity of such a machine and, therefore, we have provided a preferred means to advance each successive blank, after it is cut and folded, through the machine while a subsequent web portion is being drawn across the machine whereby the machine may operate upon a plurality of successive blanks simultaneously.

The machine as heretofore described cannot operate upon more than one article simultaneously because of the necessary reduction in speed of the blank as it is passed through the sewing machines 540 and 540'. It is also evident that the carrier belts must remain at a standstill during the period in which the web is drawn across the machine by the web feeding mechanism 205, and during the clamping, cutting and first fold operations.

The modified form of blank advancing means is only shown schematically in Figure 24 and in association with the complete machine in Figure 1–A and the same reference characters shall apply to those parts shown in Figure 24 which are identical to, and perform the same function as, corresponding parts shown in the original form of blank advancing mechanism. However, front and rear carrier belts are substituted for the belts 323, 324, 325, 323', 324' and 325' shown in the original form of blank advancing means in Figure 4. The group of rear carrier belts includes outside longitudinally extending belts 700, 700' and intermediate belts 701, 702, 701' and 702'.

The rear portions of the belts 700 to 702 and 700' to 702' are mounted on the corresponding pulleys 327, 331, 327' and 331' on the transverse shafts 332 and 332'.

However, these belts are relatively shorter than the carrier belts shown in the original form of the invention (Figure 4) and the upper reaches thereof are preferably of only slightly greater length than the width of the web material W. It will be observed in Figures 24 and 1–A that the front portions of the carrier belts 700 to 702 are mounted on pulleys 703 and the front portions of the belts 700' to 702' are mounted on pulleys or wheels 703'.

The pulleys or wheels 703, 703' are fixed on respective transverse shafts 704, 704' journaled on the frame of the machine. The rear portions of respective front carrier belts 705 to 707 and 705' to 707' are disposed in overlapping side-by-side relation to, and immediately adjacent, the front portions of the respective rear carrier belts 700 to 702 and 700' to 702'. The rear portions of these front carrier belts 705 to 707 are mounted on corresponding pulleys or wheels 710 and the rear portions of the front carrier belts 705' to 707' are mounted on corresponding wheels or pulleys 710'. The pulleys 710, 710' are fixed on respective transverse shafts 711, 711' suitably journaled in the frame of the machine.

The front portions of the belts 705 to 707 are mounted on the corresponding pulleys 346, 345 fixed on the shaft 350, and the front portions of the belts 705' to 707' are mounted on the corresponding pulleys 346', 345' which are fixed on the shaft 350'. The shafts 350, 350' are driven in identically the same manner in both forms of blank advancing means shown in Figures 4 and 24, with the exception that the sprocket wheels 361 and 361', in the modified form of blank advancing means, are engaged by respective sprocket chains 712, 712' (Figure 24) in lieu of the sprocket chains 362, 362' (Figure 4).

The sprocket chains 712, 712' not only engage the corresponding sprocket wheels 361, 361', 363 and 363', but also engage sprocket wheels 713, 713' (Figure 24) fixed on the proximal ends of the transverse shafts 704, 704'.

Thus, the electric motors 364, 364' drive both the front and rear groups of carrier belts simultaneously. The arrangement of the electrical circuit for controlling the electric motors 364, 364', 580 and 580' is identical for both forms of means for advancing the blank through the machine, shown in Figures 4 and 24.

Therefore, when the leading edge of each successive blank B elevates the switch actuating fingers 544, 544' in Figure 23, this stops the electric motors 364, 364' which, in the preferred form of advancing means shown in Figures 1–A and 24, causes the front and rear groups of carrier belts to stop simultaneously. However, when the cam 581 causes the start switch 583 to be closed momentarily, the magnetic relay 567 (Figure 23) causes the motors 580, 580' to be energized in the manner heretofore described and, due to the overriding clutch mechanisms 355, 355' the shafts 350, 350' (Figure 24) will then be driven independently of the shafts 704, 704'.

This results in the front carrier belts 705 to 707 and 705' to 707' moving at a relatively slow rate of speed while the rear carrier belts 700 to 702 and 700' to 702' remain stationary. Thus, the various cams for actuating the web feeding mechanism 205 and the cutting and folding means may be so timed as to operate the corresponding mechanisms while the front belts 705 to 707 and 705' to 707' are advancing a corresponding blank through the underfolding mechanisms 510 and 511 (Figures 17 to 22) and the sewing machines 540 and 540' (Figures 3, 3–A, 5 and 5–A) at a slow speed.

It is evident that the cycle of the machine will then be carried out in the manner heretofore described. That is, the trailing edge of a preceding blank will move past and beyond the fingers 551, 551' (Figure 23) thus de-energizing the electric motors 580, 580' to stop further movement of the front carrier belts 705 to 707 and 705' to 707', inclusive.

Thereafter, the cam 560 (Figures 3–C and 23) would be so positioned on the cam shaft 208 as to momentarily close the start switch 562 to again start the electric motors 364, 364' to effect another cycle in the operation of the machine.

It is thus seen that we have provided an improved apparatus for successively cutting relatively large sheets of material from a roll of web material and forming hems of different widths on the opposite raw edges of each successive blank, then under-folding the raw edges between the previously formed folds and the body of the blank and subsequently passing each successive blank through sewing machines to thus automaticaly form completely hemmed bed sheets, table cloths and the like.

Throughout the specification and claims, the terms "transverse" and "longitudinal" as applied to the blank and to the machine are indicative of the vertical and horizontal directions in Figure 1, respectively; but as applied to the web material or cloth W, these terms have their ordinary meaning.

In the drawings and specification there has been set forth a preferred embodiment of the invention and, although specific terms are employed, they are used in a generic and descriptive sense only and not for purposes of limitation, the scope of the invention being defined in the claims.

We claim:
1. In a machine for making bed sheets and the like from a source of relatively wide web material; the combination of a carriage mounted for movement longitudinally to said web material, a plurality of grippers carried by said carriage, at least one endless cable connected to said carriage, means for driving said cable in a reciprocatory manner at predetermined intervals to cause said carriage to reciprocate transversely of the machine and longitudinally of the web material, means for controlling said grippers in timed relation to reciprocation of the carriage whereby the grippers grasp and draw a predetermined portion of the web material across the machine, a driven endless cutting blade positioned adjacent the path of travel of the web material as it is drawn across the machine, a plurality of carrier belts extending longitudinally of the machine, but transversely of the web material, means operable automatically upon said portion of the web material being drawn across the machine for clamping the web material against certain of said carrier belts to effect traction between the web material and said certain belts, means operable automatically upon said clamping means clamping the web material against said certain belts to move at least one of the reaches of said driven cutting blade through the web material for severing a blank from the web material, means operable automatically upon said blank being severed from the web material for imparting movement to said belts to feed the blank transversely of the longitudinal axis of the web material and longitudinally of said machine, at least one sewing machine disposed adjacent at least one of said belts, means operable automatically upon each successive blank approaching the sewing machine for reducing the speed of said belts and to effect operation of the sewing machine for sewing the corresponding portion of the blank.

2. In a machine for making bed sheets or the like from a continuous sheet of web material, said machine having means for drawing off from the web a portion thereof to form a blank, means for severing said blank from the web, and sewing mechanisms disposed in substantially spaced relation to one of the longitudinal side edges of the blank thus formed and being spaced from each other a distance substantially the same as the end edges of the blank thus formed; the combination of an improved means to advance the blank to the sewing mechanisms transversely of the web comprising a plurality of endless carrier belts across and above which the web material is drawn in forming said blank, pressure applying means operable automatically upon said blank being formed for pressing said blank into engagement with some of said carrier belts to maintain traction between the blank and said carrier belts, means operable automatically upon operation of said pressure applying means to impart movement to said carrier belts for moving the blank towards the sewing mechanisms and transversely of the longitudinal axis of the web, endless pressure applying belts positioned above and in parallel relation to portions of said carrier belts, subsequent to said pressure applying means, for maintaining traction between the blank and the carrier belts as the blank moves from between the pressure applying means and said carrier belts, and said carrier belts also extending through said sewing mechanisms for feeding the blank through the same for sewing the blank.

3. In a machine for making bed sheets or the like from a continuous sheet of web material, said machine having means for drawing off from the web a portion thereof to form a blank, means for severing said blank from the web, means for forming a transverse slack in the blank and sewing mechanisms disposed in substantially spaced relation to one of the longitudinal side edges of the blank thus formed and being spaced from each other a distance substantially the same as the end edges of the blank with the slack therein; the combination of an improved means to advance the blank to the sewing mechanisms transversely of the web comprising a plurality of endless carrier belts across and above which the web material is drawn in forming said blank, pressure applying means operable automatically upon said blank being formed for pressing said blank into engagement with some of said carrier belts to maintain traction between the blank and said carrier belts, means operable automatically upon operation of said pressure applying means to impart movement to said carrier belts for moving the blank towards the sewing mechanisms and transversely of the longitudinal axis of the web, endless pressure applying belts positioned above and in parallel relation to portions of said carrier belts, subsequent to said pressure applying means, for maintaining traction between the blank and the carrier belts as the blank moves from between the pressure applying means and said belts, said carrier belts also extending through said sewing mechanisms for feeding the blank through the same for sewing the blank, and means operable automatically upon said blank approaching the sewing mechanisms for reducing the speed of the endless belts.

4. In a machine for making bed sheets or the like from a continuous sheet of web material, said machine having means for drawing off from the web a portion thereof to form a blank, means for severing said blank from the web, and normally non-operating sewing mechanisms disposed in substantially spaced relation to one of the longitudinal side edges of the blank thus formed and being spaced from each other a distance substantially the same as the end edges of the blank thus formed; the combination of an improved means to advance the blank to the sewing mechanisms transversely of the web comprising a plurality of endless carrier belts across and above which the web material is drawn in forming said blank, pressure applying means operable automatically upon said blank being formed for pressing said blank into engagement with some of said carrier belts to maintain traction between the blank and said carrier belts, means operable automatically upon operation of said pressure applying means to impart movement to said carrier belts for moving the blank towards the sewing mechanisms and transversely of the longitudinal axis of the web, endless pressure applying belts positioned closely above and extending in parallel relation to portions of said carrier belts, subsequent to said pressure applying means, for maintaining traction between the blank and the carrier belts as the blank moves from between the pressure applying means and said carrier belts, said carrier belts also extending through said sewing mechanisms for feeding the blank through the same for sewing the blank, and means operable automatically upon said blank approaching the sewing mechanisms for simultaneously reducing the speed of said endless belts and effecting operation of the sewing mechanisms for sewing the edges of the blank simultaneously.

5. In a machine for making bed sheets or the like from a continuous sheet of web material, said machine having means for drawing off from the web a portion thereof to form a blank, means for severing said blank from the web, means for forming a transverse slack in the severed blank and sewing mechanisms disposed in substantially spaced relation to one of the longitudinal side edges of the blank thus formed and being spaced from each other a distance substantially the same as the end edges of the blank; the combination of an improved means to advance the blank to the sewing mechanisms transversely of the web comprising a plurality of endless carrier belts across and above which the web material is drawn in forming said blank, pressure applying means operable automatically upon said blank being formed for pressing said blank into engagement with some of said carrier belts to maintain traction between the blank and said carrier belts, means operable automatically upon operation of said pressure applying means to impart movement to said carrier belts for moving the blank towards the sewing mechanisms and transversely of the longitudinal axis of the web, endless pressure applying belts positioned closely above and in substantially parallel relation to portions of said carrier belts, subsequent to said pressure applying means, for maintaining traction between the blank and the carrier belts as the blank moves from between the pressure applying means and said carrier belts, said carrier belts also extending through said sewing mechanisms for feeding the blank through the same for sewing the blank, and means for varying the relative speeds of the sewing mechanisms and the carrier belts to thereby vary the lengths of the stitches formed by the sewing mechanisms in sewing the edges of the blank.

6. In a machine for making bed sheets or the like from a continuous sheet of web material, said machine having means for drawing off from the web a portion thereof to form a blank, means for severing said blank from the web, means for forming a transverse slack in the blank and sewing mechanisms disposed in substantially spaced relation to one of the longitudinal side edges of the blank thus formed and being spaced from each other a distance substantially the same as the end edges of the blank thus formed; the combination of an improved means to advance the blank to the sewing mechanisms transversely of the web comprising a plurality of endless carrier belts across and above which the web material is drawn in forming said blank, pressure applying means operable automatically upon said blank being formed for pressing said blank into engagement with some of said carrier belts to maintain traction between the blank and said carrier belts, means operable automatically upon operation of said pressure applying means to impart movement to said carrier belts for moving the blank towards the sewing mechanisms and transversely of the longitudinal axis of the web, endless pressure applying belts positioned closely above and extending in parallel relation to portions of said carrier belts, subsequent to said pressure applying means, for maintaining traction between the blank and the carrier belts as the blank moves from between the pressure applying means and said carrier belts, said carrier belts also extending through said sewing mechanisms for feeding the blank through the same for sewing the blank, and means for varying the relative speeds of the belts and the sewing mechanisms to thereby vary the length of the stitches formed in the blank by the sewing mechanisms.

7. In a machine for making bed sheets or the like from a continuous sheet of web material, said machine having means for drawing off from the web a portion thereof to form a blank, means for severing said blank from the web, and sewing mechanisms disposed in substantially spaced relation to one of the end edges of the blank thus formed and being spaced from each other a distance substantially the same as the end edges of the blank thus formed; the combination of an improved means to advance the blank to the sewing mechanisms transversely of the longitudinal axis of the web comprising a first group of endless belts across and above which the web is drawn in forming said blank, said first group of endless belts extending transversely to the web and beyond at least one longitudinal side edge of the web as it is drawn across the machine, a second group of spaced endless belts disposed adjacent the first group of endless belts and partially overlapping said first group of endless belts in side-by-side relation thereto and extending substantially beyond the first group of endless belts, certain of said second group of endless belts extending through said mechanisms, means operable automatically upon said blank being formed for simultaneously imparting movement in a common direction to both of the groups of endless belts at the same speed to advance the blank towards the sewing mechanisms transversely of the web, and means operable automatically upon said blank approaching the sewing mechanisms for stopping the first group of belts and for imparting movement to the second group of belts only whereby the second group of belts passes the blank through the sewing mechanisms for sewing the same and whereby a succeeding blank may be formed above the first group of endless belts as the preceding blank is passed through the sewing mechanisms.

8. In a machine for making bed sheets or the like from a continuous sheet of web material, said machine having means for drawing off from the web a portion thereof to form a blank, means for severing said blank from the web, and sewing mechanisms disposed in substantially spaced relation to one of the side edges of the blank thus formed and being spaced from each other a distance substantially the same as the end edges of the blank thus formed; the combination of an improved means to advance the blank to the sewing mechanisms transversely of the longitudinal axis of the web comprising a first group of endless belts across and above which the web is drawn in forming said blank, said first group of endless belts extending transversely to the web and beyond at least one longitudinal side edge of the web as it is drawn across the machine, a second group of spaced endless belts disposed adjacent the first group of endless belts and partially overlapping said first group of endless belts in side-by-side relation thereto and extending substantially beyond the first group of endless belts, certain of said second group of endless belts extending through said mechanisms, means operable automatically upon said blank being formed for simultaneously imparting movement in a common direction to both of the groups of endless belts at the same speed to advance the blank towards the sewing mechanisms transversely of the web, means operable automatically upon said blank approaching the sewing mechanisms for stopping the first group of belts and for imparting movement to the second group of belts at a relatively slower speed than the speed at which both of the groups of belts previously moved whereby the second group of belts passes the blank through the sewing mechanisms for sewing the same, and whereby a succeeding blank may be formed above the first group of endless belts as the preceding blank is passed through the sewing mechanisms, and cam controlled means for rendering said means operable for drawing off from the web the portion of the web to form a blank substantially simultaneously with the stopping of the first group of endless belts and the starting of the movement of the second group of endless belts at a relatively slower speed.

9. In a machine for making bed sheets or the like from a continuous sheet of web material, said machine having means for drawing off from the web material a portion thereof to form a blank, means for severing said blank from the web, and a pair of sewing mechanisms disposed in substantially spaced relation to one of the longitudinal side edges of the blank thus formed and being spaced from each other a distance substantially the same as the end edges of the blank thus formed; the combination of an improved means to advance the blank to the sewing mechanisms transversely of the web comprising a plurality of endless carrier belts across and above which the web material is drawn in forming said blank, pressure applying plates normally spaced above certain of said endless carrier belts means operable automatically upon said blank being formed for moving said pressure applying plates to press said blank into engagement with said certain of said belts to maintain traction between the blank and said certain belts, means operable automatically upon operation of said pressure applying plates to impart movement to said carrier belts for moving the blank toward the sewing mechanisms and transversely of the web, pressure applying belts positioned closely above and extending in parallel relation to portions of said certain endless belts, subsequent to said pressure applying plates, for maintaining traction between the blank and the endless carrier belts as the blank moves from between the presure applying plates and said certain carrier belts, and said certain endless carrier belts also extending through said sewing mechanisms for feeding the blank through the same for sewing the blank.

10. In a machine for making bed sheets or the like from a continuous sheet of web material, said machine having means for drawing off from the web material a portion thereof to form a blank, means for severing said blank from the web, means for forming a transverse slack in the web and a pair of sewing mechanisms disposed in substantially spaced relation to one of the longitudinal side edges of the blank thus formed and being spaced from each other a distance substantially the same as the end edges of the slackened blank thus formed; the combination of an improved means to advance the blank to the sewing mechanisms transversely of the web comprising a plurality of endless carrier belts across and above which the web material is drawn in forming said blank, pressure applying plates normally spaced above certain of said endless carrier belts, means operable automatically upon said blank being formed for moving said pressure applying plates to press said blank into engagement with said certain of said belts to maintain traction between the blank and said certain belts, means operable automatically upon operation of said pressure applying plates to impart movement to said carrier belts for moving the blank toward the sewing mechanisms and transversely of the longitudinal axis of the web, said certain endless carrier belts also extending through said sewing mechanisms for feeding the blank through the same for sewing the blank, cam controlled means for rendering operable the means for drawing off from the web a portion of the web to form a blank immediately following the passing of the blank through the sewing mechanisms, and cam controlled means for simultaneously stopping the endless carrier belts.

11. In a machine for making bed sheets or the like from a continuous sheet of web material, said machine having means for drawing off from the web a portion thereof to form a blank, means for severing said blank from the web, means for forming a transverse slack in the severed blank, and sewing mechanisms disposed in substantially spaced relation to one of the longitudinal side edges of the blank thus formed and being spaced from each other a distance substantially the same as the end edges of the blank thus formed; the combination of an improved means to advance the blank to the sewing mechanisms transversely of the web comprising a plurality of endless carrier belts across and above which the web material is drawn in forming said blank, pressure applying means operable automatically upon said blank being formed for pressing said blank into engagement with some of said carrier belts to maintain traction between the blank and said carrier belts, means operable automatically upon operation of said pressure applying means to impart movement to said carrier belts for moving the blank towards the sewing mechanisms and transversely of the longitudinal axis of the web, endless pressure applying belts positioned closely above and in parallel relation to portions of said carrier belts, subsequent to said presure applying means, for maintaining traction between the blank and the carrier belts as the blank moves from between the pressure applying means and said carrier belts, said carrier belts also extending through said sewing mechanisms for feeding the blank through the same for sewing the blank, and said carrier belts being severally grooved throughout their length to form transversely spaced longitudinally extending ridges thereon, said pressure applying belts also being severally grooved, and the grooves therein mating with the ridges on the carrier belts to thereby insure that the blank is prevented from slipping in either direction transversely of the carrier belts and the pressure applying belts.

12. In a machine for making bed sheets or the like from a source of web material, said machine having means normally maintaining the raw edge of the web material in a predetermined position; the combination of a web feeding mechanism comprising a carriage, a plurality of grippers on the carriage, said carriage being mounted for reciprocatory movement in said machine longitudinally to said web material, means to reciprocate said carriage comprising at least one cable secured to said carriage, a pair of rotatable pulleys carried by said machine and spaced from opposite ends of the length of a stroke spanned by the carriage and on which said cable is mounted, said cable being secured to at least one of said pulleys, cam controlled means for imparting rotation to said one of the pulleys in first one direction and then in the other direction at predetermined intervals, said grippers each including a pivotally immovable jaw and a pivoted jaw, resilient means for urging the pivoted jaw to closed position, first and second rows of gripper control fingers disposed adjacent respective opposite ends of each stroke of said carriage, there being one of said fingers in each row for each pivoted jaw, and cam controlled means for momentarily moving the fingers in each row into engagement with the pivoted jaws at the end of each corresponding stroke of the carriage for successively opening and closing said grippers whereby the grippers grasp and draw a portion of the web material across the machine to form a blank therefrom.

13. In a machine for making bed sheets or the like from a source of web material, said machine having means normally maintaining the raw edge of the web material in a predetermined position; the combination of a web feeding mechanism comprising a carriage, a plurality of grippers on the carriage, said carriage being mounted for reciprocatory movement in said machine longitudinally to said web material, means to reciprocate said carriage comprising at least one cable secured to said carriage, a pair of rotatable pulleys carried by said machine and spaced from opposite ends of the length of a stroke spanned by the carriage and on which said cable is mounted, said cable being secured to at least one of said pulleys, means for imparting rotation to said one of the pulleys in first one direction and then in the other direction at predetermined intervals, said grippers each comprising a pair of relatively movable jaws, resilient means to close said jaws, a row of gripper control fingers disposed adjacent each end of the stroke limit of said carriage, and said fingers in each row being operable automatically to momentarily move into operative relationship with said jaws in the course of each corresponding stroke of the carriage for opening and closing said grippers whereby the grippers grasp and draw a portion of the web material across the machine to form a blank therefrom.

14. A machine for making bed sheets and analogous articles from a source of relatively wide web material having means for drawing off from the source a portion of the web material to form a blank; the combination of a driven endless cutting blade extending transversely to the web material, means operable automatically to move one of the reaches of said endless cutting blade, upon said portion of the web material being drown from the source, to sever the blank from the web material, a plurality of endless belts extending transversely to the web material and beneath the portion of the web from which the blank is formed when the portion is drawn from said source, means operable automatically upon said blank being severed from the web to impart movement to the endless belts for moving the blank transversely of the web material, sewing mechanisms disposed adjacent the outermost of said endless belts, and means operable automatically upon the blank approaching said sewing mechanisms to reduce the speed of the endless belts and to effect operation of the sewing mechanisms for sewing the edges of the blank simultaneously.

15. A machine for making bed sheets and analogous articles from a source of relatively wide web material having means for drawing off from the source a portion of the web material to form a blank; the combination of a driven endless cutting blade extending transversely to the web material, means operable automatically to move one of the reaches of said endless cutting blade, upon said portion of the web material being drawn from the source, to sever the blank from the web material, a plurality of endless belts extending transversely to the web material and beneath the portion of the web from which the blank is formed when the portion is drawn from said source, means operable automatically upon said blank being severed from the web to impart movement to the endless belts for moving the blank transversely of the web material, at least one sewing machine disposed adjacent at least one of the outermost of said endless belts, and means operable automatically to reduce the speed of the belts as the blank approaches the sewing machine to thereby feed the blank through the sewing machine at a relatively slower speed.

16. In a machine for making bed sheets or the like from a continuous sheet of web material, said machine having means for drawing off from the web material a portion thereof to form a blank, means for severing said blank from the web material and at least one driven sewing machine disposed in substantially spaced relation to one of the longitudinal side edges of the blank thus formed, the combination therewith of means to advance the blank to the sewing machine transversely of the longitudinal axis of the web material comprising a first group of spaced substantially parallel endless carrier belts across and above the upper reaches of which the web material is drawn in forming said blank, first driving means operable automatically to impart movement to said first group of belts upon said blank being formed for moving the blank transversely of the longitudinal axis of the web material, a second group of spaced substantially parallel endless carrier belts serially arranged relative to said first group and onto which said blank is directed by the first group of belts, said second group of belts extending past the sewing machine, said first driving means also being operable to drive said second group, means to render the first driving means inoperative upon said blank being moved a given distance by the second group of belts, a second driving means for the second group of belts only, and means automatically operable, following rendering of the first driving means inoperative, to actuate the second driving means whereby said blank is moved past the sewing machine as a succeeding blank is formed across and above the first group of belts.

17. In a machine for making bed sheets and analogous articles from a source of relatively wide web material, said machine having means for drawing off from said source a portion of the web material to form a blank, means to sever the blank from the web material, and at least one sewing mechanism spaced substantially from one longitudinal side edge of said portion of the web material as it is drawn from said source; the combination of a plurality of endless belts extending transversely of the web material and beneath the portion of the web material from which the blank is formed when the portion is drawn from said source, means operable automatically upon said blank being severed from the web to impart movement to the endless belts for moving the blank transversely of the longitudinal axis of the web material and past said sewing mechanism, and means operable automatically upon the blank reaching said sewing mechanism to reduce the speed of the endless belts and to effect operation of the sewing mechanism for sewing the blank.

18. In a machine for making bed sheets and analogous articles from a source of relatively wide web material, said machine having means for drawing off from said source a portion of the web material to form a blank, means to sever the blank from the web material, and at least one sewing mechanism spaced substantially from one longitudinal side edge of said portion of the web material as it is drawn from said source; the combination of a plurality of endless belts extending transversely of the web material and beneath the portion of the web material from which the blank is formed when the portion is drawn from said source, means operable automatically upon said blank being severed from the web to impart movement to the endless belts for moving the blank transversely of the longitudinal axis of the web material and past said sewing mechanism, and means operable automatically upon the blank reaching said sewing mechanism to reduce the speed of the endless belts while sewing the blank.

19. In a machine for making bed sheets or the like from a continuous sheet of web material, said machine having means for drawing off from the web material a portion thereof to form a blank, means for severing said blank from the web material, means for forming a transverse slack in the blank, and a pair of sewing mechanisms disposed in substantially spaced relation to one of the longitudinal side edges of the blank thus formed and being spaced from each other in distance substantially the same as the length of the slackened blank thus formed; the combination of an improved means to advance the blank past the sewing mechanisms transversely of the longitudinal axis of the web material comprising a first group of endless carrier belts across and above which the web material is drawn in forming said blank, a second group of endless carrier belts disposed to one side of the blank as it is formed and extending past said sewing mechanisms, a first driving means operable automatically upon said blank being formed to impart movement to both groups of carrier belts for moving the blank toward the sewing mechanisms, a second normally inoperative driving means for the second group of belts only, means under control of the blank for stopping the first driving means as the blank approaches the sewing mechanisms, cam controlled means for subsequently actuating the second driving means to move the blank past the sewing mechanisms as a succeeding blank is formed across and above the first group of belts, and means for varying the speed of said second group of endless carrier belts relative to the speed of the sewing mechanisms for varying the length of the stitches formed by the sewing mechanisms in sewing opposite edges of the blank simultaneously.

20. In a machine for making bed sheets and the like from a source of web material, said machine having means for drawing off from the source a portion of the web material to form a blank, means to sever the blank from the web material and at least one sewing mechanism spaced substantially from one longitudinal side edge of said portion of the web material as it is drawn from said source; the combination of means operable automatically upon the blank being severed from the web material to fold at least one end edge of the blank, means operable thereafter to initiate and effect movement of the blank transversely of the longitudinal axis of the web material and past said sewing mechanism, means to maintain said end edge of the blank in the folded state during movement of the blank transversely of the longitudinal axis of the web material, means operable automatically upon the blank reaching said sewing mechanism to reduce the speed of the blank as it passes the sewing mechanism, and said means for advancing the blank transversely of the longitudinal axis of the web material being so arranged as to maintain the blank in a stationary position as it is being severed from the web material while causing a preceding blank to move past the sewing mechanism.

21. In a machine for making bed sheets and the like from a source of web material, said machine having means for drawing off from the source a portion of the web material to from a blank, means to sever the blank from the web material and at least one sewing mechanism spaced substantially from one longitudinal side edge of said portion of the web material as it is drawn from said source; the combination of means operable automatically upon the blank being severed from the web material to initiate and effect movement of the blank transversely of the longitudinal axis of the web material and past said sewing mechanism, said means for advancing the blank transversely of the longitudinal axis of the web material being so arranged as to maintain the blank in a stationary position as it is being severed from the web material while causing a preceding blank to move past the sewing mechanism, means to fold at least one end edge of the blank while it is in said stationary position, means to maintain the fold thus formed in said end edge of the blank as the blank is advanced transversely of the longitudinal axis of the web material, and means for varying the speed at which the blank moves past the sewing mechanism to thereby vary the length of stitches formed by the sewing mechanism.

22. In a machine for making bed sheets and the like from a source of web material, said machine having means for drawing off from said source a portion of the web material to form a blank, the combination of means for paying out a substantial amount of the web material from said source in advance of the means for drawing off a portion thereof comprising a roll rotatably mounted in said machine between said source and said means for drawing off a portion of the web material, an electric motor, driving mechanical connections between said motor and said roll, an electrical circuit connected to said electric motor, photo-electric means interposed in said electrical circuit and being spaced substantially below the level of said roll and below the level of said means for drawing off a portion of the web material, a source of light spaced horizontally from said photo-electric means, said photo-electric means being so arranged as to complete the circuit to the electric motor upon being subjected to the source of light to thereby energize the electric motor for driving said roll, whereby the web material will be paid out from said source in advance of said means for drawing off from said source a portion of the web material and whereby, upon said web material moving, by gravity, between the source of light and the photo-electric means, the circuit to the electric motor will be broken thus forming a substantial amount of slack in the web material in advance of said means for drawing off a portion of the web material.

23. In a machine for making bed sheets and the like from a source of web material, said machine having means for drawing off from the source a portion of the web material to form a blank, means for severing said blank from the web material and at least one sewing mechanism disposed in substantially spaced relation to one of the side edges of the blank as it is formed; the combination of an improved means to advance the blank past the sewing mechanism transversely of the longitudinal axis of the web material comprising serially arranged first and second groups of endless carrier belts, said first group of endless carrier belts being so positioned that the web material is drawn thereacross and thereabove in forming said blank, said first group of endless belts extending transversely of the longitudinal axis of the web material as it is drawn across the machine, said second group of endless belts being disposed in substantially longitudinal alinement with the first group of endless belts, at least one of the endless belts of said second group extending past said sewing mechanism, means operable automatically upon said blank being severed from the web material for simultaneously imparting movement in a common direction to both of the groups of endless belts to advance the blank towards the sewing mechanism transversely of the longitudinal axis of the web material, and means operable automatically upon said blank leaving the first group of belts and for driving the second group of belts independently of the first group of belts whereby, as the second group of belts moves the blank past the sewing mechanism for sewing the same, a succeeding blank may be formed across the first group of endless belts.

24. In a machine for making bed sheets and the like from a source of web material having means for drawing off from the said source a portion of the web material to form a blank and means to sever the blank from the web material; the combination of means to advance the blank thus formed transversely of the longitudinal axis thereof comprising a plurality of endless carrier belts extending transversely of the web material and beneath the portion of the web material as it is drawn from said source, pressure applying means operable automatically upon said blank being severed from the web material to press the blank into engagement with certain of said carrier belts, means operable automatically upon operation of said pressure applying means to impart movement to the endless belts for moving the blank transversely of the longitudinal axis of the web material, an endless pressure applying belt positioned above and in engagement with certain of said carrier belts, the lower reaches of each of said pressure applying belts being of substantially less length than the length of the upper reaches of the corresponding carrier belts, and said pressure applying belts being positioned to one side of one of the longitudinal edges of the web material as said portion is drawn off said source, whereby, upon said carrier belts advancing the blank beyond the first-named pressure applying means, the corresponding portions of the blank will pass between the pressure applying belts and the carrier belts, and whereby the pressure applying belts will maintain traction between the blank and the corresponding carrier belts.

25. In a structure according to claim 24, spaced longitudinally extending ridges on the outer surfaces of said carrier belts defining grooves therebetween, and said pressure applying belts also being provided with longitudinally extending grooves in the outer surfaces thereof which mate with the ridges in the corresponding carrier belts to thereby prevent movement of the blank transversely of the carrier belts.

26. In a structure according to claim 24, at least those carrier belts coinciding with said pressure applying belts being provided with longitudinally extending transversely spaced grooves in the outer surfaces thereof forming longitudinally extending ridges thereon, and said pressure applying belts also being provided with longitudinally extending grooves therein coinciding with the longitudinally extending ridges on the carrier belts to thereby prevent movement of the blank transversely of the carrier belt.

27. In a machine for making bed sheets and the like from a source of web material having means for drawing off from the said source a portion of the web material to form a blank and means to sever the blank from the web material; the combination of means to advance the blank thus formed transversely of the longitudinal axis thereof comprising a plurality of endless carrier belts extending transversely of the web material and beneath the portion of the web material as it is drawn from said source, pressure applying means operable automatically upon said blank being severed from the web material to press the blank into engagement with certain of said carrier belts, means operable automatically upon operation of said pressure applying means to impart movement to the endless belts for moving the blank transversely of the longitudinal axis of the web material, an endless pressure applying belt positioned above and in engagement with certain of said carrier belts, the lower reaches of each of said pressure applying belts being of substantially less length than the length of the upper reaches of the corresponding carrier belts, and said pressure applying belts being positioned to one side of one of the longitudinal edges of the web material as said portion is drawn off said source, resilient means urging the adjacent reaches of the carrier belts and the pressure applying belts towards each other to thereby maintain traction between the blank and the carrier belts.

28. In a machine for making bed sheets and the like from a source of web material, said machine having means for drawing off from the source a portion of the web material to form a blank, means for severing said blank from the web material and at least one sewing mechanism disposed in substantially spaced relation to one of the end edges of the blank thus formed; the combination of an improved means to advance the blank past the sewing mechanism transversely of the longitudinal axis of the web material comprising serially arranged first and second groups of endless belts, said first group of endless belts being so positioned that the web material is drawn thereacross and thereabove in forming said blank, said first group of endless belts extending transversely to the web material as it is drawn across the machine, said second group of endless belts being disposed in substantially longitudinal alinement with the first group of endless belts, at least one of the endless belts of said second group extending past said sewing mechanism, means operable automatically upon said blank being severed from the web material for simultaneously imparting movement in a common direction to both of the groups of endless belts at a common speed to advance the blank towards the sewing mechanism, and means operable automatically upon said blank approaching the sewing mechanism for stopping the first group of belts and for imparting movement to the second group of belts at a relatively slower speed than the speed at which both of the groups of belts previously moved whereby a succeeding blank may be formed above the first group of endless belts as the preceding blank is moved past the sewing mechanism at a relatively slow speed for sewing the same.

29. In a machine for making bed sheets and the like from a source of web material having means for drawing off from the said source a portion of the web material to form a blank and means to sever the blank from the web material; the combination of means to advance the blank thus formed transversely of the longitudinal axis thereof comprising a plurality of endless carrier belts extending transversely of the web material and beneath said portion of the web material as it is drawn from said source, pressure applying means operable automatically upon said blank being severed from the web material to press the blank into engagement with certain of said carrier belts, means operable automatically upon operation of said pressure applying means to impart movement to the endless belts for moving the blank transversely of the longitudinal axis of the web material, an endless pressure applying belt positioned above and in engagement with certain of said carrier belts, the lower reaches of each of said pressure applying belts being of substantially less length than the length of the upper reaches of the corresponding carrier belts, said pressure applying belts being positioned to one side of one of the longitudinal edges of the web material as said portion is drawn off said source, and resilient means urging said pressure applying endless belts into engagement with corresponding portions of said carrier belts whereby, upon said carrier belts advancing the blank beyond the first-named pressure applying means, the corresponding portions of the blank will pass between the pressure applying belts and the carrier belts, and whereby the pressure applying belts will maintain traction between the blank and the corresponding carrier belts.

30. In a machine for making bed sheets or the like from a continuous sheet of web material, said machine having means for drawing off from the web a portion thereof to form a blank, means for severing said blank from the web, and sewing mechanisms disposed in substantially spaced relation to one of the longitudinal side edges of the blank thus formed and being spaced from each other a distance substantially the same as the end edges of the blank thus formed; the combination of an improved means to advance the blank to the sewing mechanisms transversely of the web comprising a plurality of endless carrier belts across and above which the web material is drawn in forming said blank, pressure applying means operable automatically upon said blank being formed for pressing said blank into engagement with some of said carrier belts to maintain traction between the blank and said carrier belts, means operable automatically upon operation of said pressure applying means to impart movement to said carrier belts for moving the blank towards the sewing mechanisms and transversely of the longitudinal axis of the web, endless pressure applying belts positioned closely above and in parallel relation to portions of said carrier belts, subsequent to said pressure applying means, for maintaining traction between the blank and the carrier belts as the blank moves from between the pressure applying means and said carrier belts, said carrier belts also extending through said sewing mechanisms for feeding the blank through the same for sewing the blank, the exterior surfaces of said carrier belts being longitudinally grooved to provide ridges therebetween, and the pressure applying belts also being provided with longitudinally extending grooves corresponding to the ridges on the carrier belts.

31. In a machine for making bed sheets or the like from a continuous sheet of web material, said machine having means for drawing off from the web material a portion thereof to form a blank, means for severing said blank from the web material and sewing mechanisms disposed in substantially spaced relation to one of the longitudinal side edges of the blank thus formed and being spaced from each other a distance substantially the same as the end edges of the blank thus formed; the combination of means to advance the blank to the sewing mechanisms transversely of the web material comprising a plurality of endless carrier belts across and above which the web material is drawn in forming said blank, means to fold hems on opposite end edges of said blank immediately following the severing operation and while said carrier belts are stationary, means operable automatically upon folding the hems on each successive blank to impart movement to said belts for moving the blank towards the sewing mechanisms tranversely of the web, certain of said endless carrier belts also extending through said sewing mechanisms for feeding the blank through the same for sewing the blank, and means for varying the rate of feed to the sewing mechanisms relative to the speed of the mechanisms to thus vary the length of stitches formed by the sewing mechanisms.

32. In a machine for making bed sheets and the like, said machine having means for successively severing predetermined lengths from a source of web material to form blanks and a pair of spaced sewing machines spaced from the point at which said blanks are formed; the combination of at least two endless carrier belts forming substantially continuous top belt runs onto portions of which said blanks are deposited as formed, and being spaced from each other in order to be engaged by opposite edge portions of each successive blank, means to drive said top belt runs after each blank is deposited thereon, said top belt runs extending past the respective sewing machines to cause opposite edges of the blank to be sewn simultaneously, means for applying pressure continuously on substantially the entire unsewn portion of each blank contacting said top belt runs, and means for separately controlling the intervals during which said carrier belts are driven, comprising control members engageable by the leading and trailing edges of a blank adjacent each end thereof.

33. In a machine for making bed sheets and the like, said machine having means for successively severing predetermined lengths from a source of web material to form blanks and a pair of spaced sewing machines spaced from the point at which said blanks are formed; the combination of at least two endless carrier belts onto which said blanks are deposited as formed, and being spaced from each other in order to be engaged by opposite edge portions of each successive blank, means to drive said carrier belts as each blank is deposited thereon, said carrier belts extending past the respective sewing machines to cause opposite edges of the blank to be sewn simultaneously, and means controlled by the leading end of the blank adjacent each edge thereof for separately controlling the intervals during which each of said carrier belts is driven.

34. In a machine for making bed sheets and the like, said machine having means for successively severing predetermined lengths from a source of web material to form blanks and a pair of spaced normally inactive sewing machines spaced from the point at which said blanks are formed; the combination of at least two endless carrier belts onto which said blanks are deposited as formed, and being spaced from each other in order to be engaged by opposite edge portions of each successive blank, means to drive said carrier belts as each blank is deposited thereon, said carrier belts extending past the respective sewing machines to cause opposite edges of the blank to be sewn simultaneously, means controlled by the leading end of the blank adjacent each edge thereof for separately stopping the corresponding carrier belts to position the leading ends of opposite edges of the blank uniformly relative to said sewing machines, means for again driving said carrier belts after the leading ends of opposite edges of the blank have reached the latter position, and means for simultaneously activating the sewing machines.

35. In a machine for making bed sheets and the like, said machine having means for successively severing predetermined lengths from a source of web material to form blanks and a pair of spaced sewing machines spaced from the point at which said blanks are formed; the combination of at least two endless carrier belts onto which said blanks are deposited as formed, and being spaced from each other in order to be engaged by opposite edge portions of each successive blank, means to drive said carrier belts as each blank is deposited thereon, said carrier belts extending past the respective sewing machines to cause opposite edges of the blank to be sewn simultaneously, means controlled by the leading end of the blank adjacent each edge thereof for separately stopping the corresponding carrier belts to position the leading ends of opposite edges of the blank uniformly relative to said sewing machines, means for again driving said carrier belts after the leading ends of opposite edges of the blank have reached the latter position, and means controlled by the trailing end of the blank adjacent each edge thereof for again separately stopping the corresponding carrier belts and the sewing machines as the edges of the blank are discharged from the sewing machines.

36. In a machine for making bed sheets and the like, said machine having means for successively severing predetermined lengths from a source of web material to form blanks and a pair of spaced sewing machines spaced from the point at which said blanks are formed; the combination of at least two endless carrier belts onto which said blanks are deposited as formed, and being spaced from each other in order to be engaged by opposite edge portions of each successive blank, means to drive said carrier belts as each blank is desposited thereon, said carrier belts extending past the respective sewing machines to cause opposite edges of the blank to be sewn simultaneously, means controlled by the leading end of the blank adjacent each edge thereof for separately stopping the corresponding carrier belts to position the leading ends of opposite edges of the blank uniformly relative to said sewing machines, and means for again driving said carrier belts after the leading ends of opposite edges of the blank have reached the latter position to thereby move the blank past the sewing machines.

37. In a machine for making bed sheets and the like, said machine having means for successively severing predetermined lengths from a source of web material to form blanks and a pair of spaced sewing machines spaced from the point at which said blanks are formed; the combination of at least two endless carrier belts onto which said blanks are deposited as formed, and being spaced from each other in order to be engaged by opposite edge portions of each successive blank, means to drive said carrier belts as each blank is desposited thereon, said carrier belts extending past the respective sewing machines to cause opposite edges of the blank to be sewn simultaneously, means controlled by the leading end of the blank adjacent each edge thereof for separately stopping the corresponding carrier belts to position the leading ends of opposite edges of the blank uniformly relative to said sewing machines, and means for again driving said carrier belts after the leading ends of opposite edges of the blank have reached the latter position to thereby move the blank past the sewing machines, and means controlled by the trailing end of the blank adjacent each edge thereof for again separately stopping the corresponding carrier belts as the edges of the blank are discharged from the sewing machines.

38. In a machine for making bed sheets and the like having means for drawing off from a web a portion of the web to form a blank; the combination of a cutting machanism comprising a driven endless ribbon-like cutting blade having its two reaches extending transversely of the web and across and above which the web is drawn, means pivotally supporting said cutting mechanism on an axis substantially parallel to the reaches of said blade, said axis extending at an angle relative to the plane of the web whereby corresponding end portions of the two reaches are normally disposed in closer proximity to the lower surface of the web than the opposite corresponding end portions of said reaches, and means operable automatically upon said portion of the web being drawn off from the web for tilting said mechanism about its axis whereby one of the reaches of said endless cutting blade will pass through the web progressively from one edge of the web to the other edge thereof for severing the blank from the web.

39. In a machine for making bed sheets or the like from a source of web material, said machine having means normally maintaining the raw edge of the web material in a predetermined position, a web feeding mechanism comprising a carriage, a plurality of grippers on said carriage, said carriage being mounted for reciprocatory movement in said machine longitudinally of said web material, and means for opening and closing said grippers in the course of each stroke of the carriage in either direction whereby the grippers grasp and draw a portion of the web material across the machine to form a blank therefrom; the combination of improved means to reciprocate said carriage comprising at least one endless cable secured to said carriage, a pair of rotatable pulleys carried by said machine and spaced from opposite ends of the strokes spanned by the carriage and on which said endless cable is mounted, said cable being secured to at least one of said pulleys, cam controlled means for imparting rotation to said one of the pulleys in first one direction and then in the other direction at predetermined intervals including a reversible electric motor, driving connections between said motor and at least one of said pulleys, first and second normally open switches in a circuit to said motor positioned adjacent opposite ends of the span of travel of said carriage, a reversing electrically operable relay interposed in said circuit and being responsive to repeatedly drive said motor in one and then the other direction in response to successive closings of the respective first and second switches, and cam means on said carriage for engaging and closing the corresponding switches at substantially the end of each stroke in each direction.

40. A machine for making bed sheets and analogous articles from a source of relatively wide web material comprising means for drawing off from the source a portion of the web material in a substantially horizontal plane to form a blank, means for paying out a substantial amount of the web material from the source in advance of the means for drawing off a portion of the web material, a driven endless ribbon-like cutting blade extending transversely to the web material, means operable automatically to move one of the reaches of said endless cutting blade, upon said portion of the web material being drawn from the source, to sever the blank from the web material, said cutting blade being so arranged that said one of its reaches passes substantially vertically through the web material at an angle relative to the horizontal plane of the web material, a plurality of endless belts extending transversely to the web material and beneath the portion of the web material from which the blank is formed when the portion is drawn from said source, means operable automatically upon said blank being severed from the web material to impart movement to the endless belts for moving the blank transversely of the longitudinal axis of the web material, a normally inactive sewing mechanism disposed adjacent at least one of said endless belts, and means operable automatically upon the blank approaching said sewing mechanism to reduce the speed of the endless belts and to effect operation of the sewing mechanism for sewing the blank.

41. In a machine for making bed sheets and the like from a source of relatively wide web material; the combination of a carriage mounted for movement longitudinally to said web material, a plurality of grippers carried by said carriage, at least one endless cable connected to said carriage, means for driving said cable in a reciprocatory manner at predetermined intervals to cause said carriage to reciprocate transversely of the machine and longitudinally of the web material, means for controlling said grippers in timed relation to reciprocation of the carriage whereby the grippers grasp and draw a predetermined portion of the web material across the machine to form a blank, a driven endless cutting blade positioned adjacent the path of travel of the web material as it is drawn across the machine, a plurality of carrier belts forming substantially continuous top belt runs extending longitudinally of the machine, but transversely under and away from the web material, means operable automatically upon said portion of the web material being drawn across the machine for pressing the web material against the top belt runs adjacent the ends of the blank to be cut to effect traction between the web material and each of said top belt runs, means operable automatically upon said means pressing the web material against said belt runs to move at least one of the reaches of said driven cutting blade through the web material for severing a blank from the web material, means for folding a hem on at least one end of the blank, means operable automatically for imparting movement to said belts to guide and feed the blank transversely of the longitudinal axis of the web material and longitudinally of said top belt runs, at least one sewing machine disposed adjacent at least one of said top belt runs, and means to effect operation of the sewing machine for sewing a hem on the folded end of the blank.

42. In a machine for making bed sheets or the like from a continuous sheet of web material, said machine having means for drawing off from the web a portion thereof to form a blank, means for severing said blank from the web, and sewing mechanisms disposed in substantially spaced relation to one of the longitudinal side edges of the blank thus formed and being spaced from each other a distance substantially the same as the end edges of the blank thus formed; the combination of an improved means to advance the blank to the sewing mechanisms transversely of the web comprising a plurality of carrier belts forming substantially continuous top belt runs across portions of which the web material is drawn in forming said blank, means operable automatically upon said blank being formed for folding wide hems along the ends of the blank and for pressing said hems into engagement with some of said top belt runs to maintain traction between the hems and said top belt runs, means operable automatically to impart movement to said top belt runs for moving the blank and guiding the hems towards the sewing mechanisms, and pressure applying belts positioned above other portions of said top belt runs for maintaining traction between the hems and the top belt runs as the blank moves from the folding and pressing means to said sewing mechanisms, said top belt runs and pressure applying belts also extending through said sewing mechanisms for feeding and guiding the hems through the same for sewing the hems.

43. In a machine for making bed sheets or the like from a continuous sheet of web material, said machine having means for drawing off from the web a portion thereof to form a blank, means for severing said blank from the web, and sewing mechanisms disposed in substantially spaced relation to one of the longitudinal side edges of the blank thus formed and being spaced from each other a distance substantially the same as the end edges of the blank thus formed; the combination of an improved means to advance the blank to the sewing mechanisms transversely of the web comprising a plurality of endless carrier belts forming substantially continuous top belt runs across portions of which the web material is drawn in forming said blank, pressure applying means operable automatically upon said blank being formed for pressing said blank substantially throughout its width into engagement with some of said top belt runs adjacent to the ends of the blank to maintain traction between the blank and said top belt runs and to maintain the ends of the blank parallel to the top belt runs, means operable automatically upon operation of said pressure applying means to impart movement to said top belt runs for moving the blank towards the sewing mechanisms and transversely of the longitudinal axis of the web, and endless pressure applying belts positioned above other portions of said top belt runs and having bottom runs in contact therewith, subsequent to said pressure applying means, for maintaining traction between the blank and the top belt runs as the blank moves from under the pressure applying means and to the sewing mechanisms, said top belt runs and bottom runs extending through said sewing mechanisms for feeding and guiding the blank through the same for sewing the blank.

44. In a machine for making rectangular articles, such as bed sheets or the like, from a continuous sheet of web material, said machine having means for drawing off from the web a portion thereof to form a blank, means for severing said blank from the web, and sewing mechanisms disposed in substantially spaced relation to one of the side edges of the blank thus formed and being spaced from each other a distance substantially the same as the end edges of the blank thus formed; the combination of an improved means to advance the blank to the sewing mechanisms transversely of the longitudinal axis of the web comprising a first group of endless belts across and above which the web is drawn in forming said blank, said first group of endless belts extending transversely to the web an beyond at least one longitudinal side edge of the web as it is drawn across the machine, a second group of spaced endless belts disposed adjacent the first group of endless belts and partially overlapping said first group of endless belts in side-by-side relation thereto and extending substantially beyond the first group of endless belts, certain of said second group of endless belts extending through said mechanisms, means operable automatically upon said blank being formed for simultaneously imparting movement in a common direction to both of the groups of endless belts at the same speed to advance the blank towards the sewing mechanisms transversely of the web, means operable after said blank leaves the first group of belts for stopping the first group of belts and for imparting movement only to the second group of belts to feed the blank through the sewing mechanisms for sewing the same, whereby a succeeding blank may be formed above the first group of endless belts as the preceding blank is passed through the sewing mechanisms, and means for rendering said means operable for drawing off from the web a portion of the web to form a blank substantially simultaneously with the stopping of the first group of endless belts.

45. In a machine for making rectangular articles, such as bed sheets or the like, from a continuous sheet of web material, said machine having means for drawing off from the web material a portion thereof to form a blank, means for severing said blank from the web, and a pair of sewing mechanisms disposed in substantially spaced relation to one of the longitudinal side edges of the blank thus formed and being spaced from each other a distance substantially the same as the end edges of the blank thus formed; the combination of an improved means to guide and advance the blank to the sewing mechanisms comprising a plurality of endless carrier belts forming substantially continuous top belt runs across and above portions of which the web material is drawn in forming said blank, pressure applying plates extending across and above said blank and normally spaced above certain of said top belt runs, means operable automatically upon said blank being formed for moving said pressure applying plates to press said blank adjacent to its end edges into engagement with said certain of said top belt runs to maintain traction between the blank and said top belt runs, means to fold hems on the blank over said plates, means operable automatically upon folding the hems to impart movement to said top belt runs for moving the blank with the folded hems toward the sewing mechanisms and transversely of the web, pressure applying belts positioned with bottom runs extending in continuous contact with other portions of said top belt runs, subsequent to said pressure applying plates, for maintaining traction between the hems and the top belt runs as the hems move from under the pressure applying plates, and said certain top belt runs also extending through said sewing mechanisms for feeding the blank through the same for sewing the hems.

46. A structure according to claim 45, having spaced longitudinally extending ridges on the upper surfaces of said top belt runs defining grooves therebetween, and complementary ridges and grooves on said pressure applying bottom runs meshing therewith to thereby prevent movement of the hems transversely of the top belt runs and guide the hems accurately to the sewing mechanisms.

47. In a machine for making rectangular bed coverings, such as bed sheets or the like, from a continuous sheet of web material, said machine having means for drawing off from the web material a portion thereof to form a blank, means for severing said blank from the web, and a pair of sewing mechanisms disposed in substantially spaced relation to one of the longitudinal side edges of the blank thus formed and being spaced from each other a distance substantially the same as the end edges of the blank thus formed; the combination of an improved means to guide and advance the blank to the sewing mechanisms comprising a plurality of endless carrier belts forming substantially continuous top belt runs across and above portions of which the web material is drawn in forming said blank, pressure applying plates extending across and above said blank and normally spaced above certain of said top belt runs, means operable automatically upon said blank being formed for moving said pressure applying plates to press said blank adjacent to its end edges into engagement with said certain of said top belt runs to maintain traction between the blank and said certain top belt runs, means to fold hems on said blank over said plates, means operable automatically upon folding the hems to impart movement to said top belt runs for moving the blank with the folded hems toward the sewing mechanisms and transversely of the web, means positioned above other portions of said top belt runs between the plates and sewing mechanisms operable to press the entire unsewn part of the folded hems against said runs and prevent movement of the hems transversely of the top belt runs so as to guide the hems accurately to the sewing mechanisms, and means for operating said sewing mechanisms for sewing the hems.

48. In a machine for making rectangular bed coverings, such as bed sheets and analogous articles, from a source of relatively wide web material, said machine having means for drawing off from said source a portion of the web material to form a blank, means to sever the blank from the web material, and at least one sewing mechanism spaced substantially from one longitudinal side edge of said portion of the web material as it is drawn from said source; the combination of a plurality of endless belts forming substantially continuous top belt runs extending transversely of the web material and having portions beneath the portion of the web material from which the blank is formed when the web portion is drawn from said source and having another portion extending to move a blank to said sewing mechanism, means operable automatically upon said blank being severed from the web to fold a hem on at least one end of the blank, means operable thereafter to impart movement to said top belt runs for moving the blank transversely of the longitudinal axis of the web material and past said sewing mechanism, and means to maintain the hem in folded position during said transverse movement of the blank.

49. In a machine for making rectangular bed coverings, such as bed sheets and the like, from a source of web material, said machine having means for drawing off a portion of the web material to form a blank, the combination of means for paying out and maintaining slack a substantial amount of the web material from said source in advance of the means for drawing off a portion thereof including an electric motor operable to pay out the material, photo-electric means operable to start and stop said electric motor independently of the means for drawing off a portion of the material, and a source of light directed onto said photo-electric means, said photo-electric means being so located as to stop the electric motor when a predetermined amount of payed out web material obstructs the light source and to start the electric motor when payed out material does not obstruct the light source.

50. In a machine for making rectangular bed coverings, such as bed sheets and the like, from a source of web material, said machine having means for drawing off a portion of the web material to form a blank, the combination of means for paying out and maintaining slack a substantial amount of the web material from said source in advance of the means for drawing off a portion thereof comprising a pair of rolls rotatably mounted in said machine between said source and said means for drawing off a portion of the web material and between which rolls the web material festoons, an electric motor for driving the roll nearest the source of web material and operable independently of the drawing off means, an electrical circuit connected to said electric motor, photo-electric means interposed in said electrical circuit and being spaced below the level of each of said rolls, a source of light spaced horizontally from and directed towards said photo-electric means, said photo-electric means being so arranged as to complete the circuit to the electric motor upon being subjected to the source of light to thereby energize the electric motor for driving said roll and paying out material from said source until said web material moving between the source of light and the photo-electric means obstructs the light source and stops the motor.

51. In a machine for cutting blanks from a source of web material, said machine having means for repeatedly drawing off portions of the web material to form blanks, the combination of means for paying out and maintaining slack a substantial amount of the web material from said source in advance of the means for drawing off portions thereof comprising a pair of spaced supports between which the material hangs in a slack loop from which such portions are drawn off, means for feeding web material over the support nearest the source to add to the slack loop, and means for starting and stopping said feeding means independently of the drawing off means including photo-electric means below the levels of said supports and a source of light directed onto said photo-electric means and operable to cause actuation of said feeding means until the payed out web material obstructs the light to the photo-electric means and thereby stops the feeding means.

52. In a machine for cutting blanks from a source of web material, said machine having means for repeatedly drawing off portions of the web material so as to form blanks, the combination of means for paying out and maintaining slack a substantial amount of the web material from said source in advance of the means for drawing off portions thereof so as to permit drawing off said portions from slack material, and means for starting and stopping said paying out means comprising means for stopping said paying out means when the material payed out in advance reaches a predetermined amount and for starting the paying out means when the material payed out in advance is less than a predetermined amount.

53. In a machine for making rectangular bed coverings, such as bed sheets and the like, from a source of web material having means for drawing off from the said source a portion of the web material to form a blank and means to sever the blank from the web material; the combination of means to advance the blank thus formed transversely of the longitudinal axis thereof comprising a plurality of endless carrier belts forming substantially continuous top belt runs extending transversely of the web material and with portions of said runs beneath the portion of the web material as it is drawn from said source, pressure applying means operable automatically upon said blank being severed from the web material to press the blank adjacent its ends into engagement with certain of said top belt runs and to fold hems on the blank over said top belt runs, means to impart movement to the top belt runs for moving the blank transversely of the longitudinal axis of the web material, endless pressure applying belts positioned above and in engagement with other portions of said top belt runs, and said pressure applying belts being positioned to one side of one of the longitudinal edges of the web material as said portion is drawn off said source, whereby, upon said top belt runs advancing the blank beyond the first-named pressure applying means, the hems of the blank will pass between the pressure applying belts and the top belt runs, and means to drive said belts so that the engaging runs thereof travel in the same direction to move the blank and guide the hems.

54. A structure according to claim 53 having spaced longitudinally extending intermeshing ridges and grooves on said top belt runs and said pressure applying belts to thereby prevent movement of the blank transversely of the carrier belts.

55. A structure according to claim 53 having at least those portions of the top belt runs coinciding with said pressure applying belts provided with longitudinally extending transversely spaced grooves in the outer surfaces thereof forming longitudinally extending ridges thereon, and said pressure applying belts also being provided with longitudinally extending grooves therein coinciding with the longitudinally extending ridges on the top belt runs to thereby prevent movement of the blank transversely of the top belt runs.

56. In a machine for making rectangular articles, such as bed sheets or the like, from a continuous sheet of web material, said machine having means for drawing off from the web material a portion thereof to form a blank, means for severing said blank from the web material and sewing mechanisms disposed in substantially spaced relation to one of the longitudinal side edges of the blank thus formed and being spaced from each other a distance substantially the same as the end edges of the blank thus formed; the combination of means to advance the blank to the sewing mechanisms transversely of the web material comprising a plurality of endless carrier belts forming substantially continuous top belt runs adjacent the end edges of the blank and across and above a portion of which the web material is drawn in forming said blank, means operable automatically upon each successive blank being formed to impart movement to said top belt runs for moving the blank towards the sewing mechanisms transversely of the web, said top belt runs also extending to said sewing mechanisms for feeding the edges of the blank through the same for sewing the blank, and pressure means superimposed over substantially the entire length of said top belt runs for maintaining the unsewn portions of the blank in continuous contact therewith during the advance of the blank to the sewing mechanisms and comprising pressure members some of which are mounted to move with said top belt runs during the advance of the blank.

57. In a machine for making bed coverings, such as bed sheets and the like, said machine having means for successively severing predetermined lengths from a source of web material to form blanks and a pair of spaced normally inactive sewing machines spaced from the point at which said blanks are formed; the combination of carrier belts forming substantially continuous top belt runs onto portions of which said blanks are deposited as formed, and being spaced from each other in order to be engaged by opposite end portions of each successive blank, means to drive said top belt runs after each blank is deposited thereon, said top belt runs having other portions extending past the respective sewing machines to cause opposite ends of the blank to be sewn simultaneously, means controlled by the leading edge of the blank adjacent each end thereof for separately stopping the corresponding top belt runs to position the leading edge of opposite ends of the blank uniformly relative to said sewing machines, means for again driving said other portions of the top belt runs after the leading edge of opposite ends of the blank have reached the latter position, and means then operable for activating the sewing machines.

58. In a machine for making rectangular articles, such as towels, blankets, bed sheets and the like, said machine having means for successively severing predetermined lengths from a source of web material to form blanks and a pair of spaced sewing machines spaced from the point at which said blanks are formed; the combination of substantially continuous carrier belts onto portions of which said blanks are deposited as formed, and being spaced from each other in order to be engaged by opposite edge portions of each successive blank, means to drive said carrier belts after each blank is deposited thereon, said carrier belts having other portions extending past the respective sewing machines to cause opposite edge portions of the blank to be sewn simultaneously, means controlled by the leading end of the blank adjacent each edge portion thereof for separately stopping the corresponding carrier belts to position the leading ends of opposite edge portions of the blank uniformly relative to said sewing machines, means for again driving said other carrier belt portions after the leading ends of opposite edge portions of the blank have reached the latter position, and means controlled by the trailing end of the blank adjacent each edge portion thereof for again separately stopping the corresponding carrier belts and the sewing machines as the edge portions of the blank are discharged from the sewing machines.

59. In a machine for making rectangular bed coverings from rectangular blanks of web material, a flat table-like support, and means for successively depositing the blanks one at a time on said support; the combination of means to advance a blank transversely of the longitudinal axis thereof comprising a plurality of endless carrier belts forming substantially continuous top belt runs extending transversely of the web material and with portions of said runs beneath each successive blank as it is deposited on said support, pressure applying means operable automatically upon each successive blank being deposited on the support to press the blank adjacent its ends into engagement with certain of said top belt runs and to fold hems on the blank over said top belt runs, means to impart movement to the top belt runs for moving the blank transversely of the longitudinal axis of the web material, endless pressure applying belts positioned above and in engagement with other portions of said top belt runs, and said pressure applying belts being positioned to one side of one of the longitudinal edges of the web material as each successive blank is deposited on said support whereby, upon said top belt runs advancing the blank beyond the first-named pressure applying means, the hems of the blank will pass between the pressure applying belts and the top belt runs, and means to drive said belts so that the engaging runs thereof travel in the same direction to move the blank and guide the hems.

60. A structure according to claim 59 having spaced longitudinally extending intermeshing ridges and grooves on said top belt runs and said pressure applying belts to thereby prevent movement of the blank transversely of the carrier belts.

61. A structure according to claim 59 having at least those portions of the top belt runs coinciding with said pressure applying belts provided with longitudinally extending transversely spaced grooves in the outer surfaces thereof forming longitudinally extending ridges thereon, and said pressure applying belts also being provided with longitudinally extending grooves therein coinciding with the longitudinally extending ridges on the top belt runs to thereby prevent movement of the blank transversely of the top belt runs.

62. In a machine for making rectangular articles, such as bed sheets or the like, from a continuous sheet of web material, said machine having means for drawing off from the web material a portion thereof to form a blank, means for severing said blank from the web material, means for forming a transverse trough in the blank, and sewing mechanisms disposed in substantially spaced relation to one of the longitudinal side edges of the blank thus formed and being spaced from each other a distance substantially the same as the end edges of the blank; the combination of means to advance the blank to the sewing mechanisms transversely of the web material comprising a first group of endless carrier belts across and above which the web material is drawn in forming said blank, first means operable automatically upon each successive blank being formed to impart movement to said first group of carrier belts for moving the blank towards the sewing mechanisms in a direction transversely of the longitudinal axis of the blank, a second group of endless carrier belts disposed adjacent and subsequent to said first group of endless carrier belts, said second group of carrier belts extending through said sewing mechanisms and being operatively connected with the first group of endless carrier belts for feeding each successive blank from the first group of carrier belts through the sewing mechanisms, means operable automatically for stopping the first and second groups of carrier belts upon each successive blank being advanced a predetermined distance by the second group of carrier belts, and means operable automatically, independently of said first means, for imparting movement to the second group of carrier belts only whereby a blank may be formed across and above the first group of carrier belts as a preceding blank is being fed through the sewing mechanisms.

63. In a machine for making substantially rectangular articles, such as table cloths, blankets, towels, bed sheets or the like, from a continuous sheet of web material, said machine having means for drawing off from the web a portion thereof to form a blank, means for severing said blank from the web, means for forming a transverse slack in the severed blank and sewing mechanisms disposed in substantially spaced relation to one of the longitudinal side edges of the blank thus formed and being spaced from each other a distance substantially the same as the end edges of the blank thus formed; the combination of an improved means to advance the blank to the sewing mechanisms transversely of the web comprising a first group of spaced substantially parallel endless carrier belts across and above which the web material is drawn in forming said blank, pressure applying means operable automatically upon said blank being formed for pressing said blank into engagement with some of said carrier belts in said first group to maintain traction between the blank and the latter carrier belts, a second group of spaced substantially parallel endless carrier belts disposed on substantially the same level as the first group of carrier belts and extending parallel to said first group and also being disposed to one side of said one of the longitudinal side edges of the blank as it is formed, said second group of carrier belts extending through the sewing mechanisms, a first driving means operable automatically upon operation of said pressure applying means to impart movement to both groups of carrier belts for moving the blank towards the sewing mechanisms and transversely of the longitudinal axis of the web, endless pressure applying belts positioned closely above and in parallel relation to portions of said second group of carrier belts and immediately subsequent to said pressure applying means for maintaining traction between the blank and the second group of carrier belts as the blank moves from between the pressure applying means and said first group of carrier belts, means to render the first driving means inoperative upon said blank being moved a given distance by the second group of carrier belts, a second driving means for the second group of belts only, means automatically operable, following rendering of the first driving means inoperative, to actuate the second driving means whereby said blank is moved past the sewing mechanisms as a succeeding blank is formed across and above the first group of belts, said pressure applying belts having spaced longitudinally extending ridges on the outer surfaces thereof defining grooves therebetween, and the outer surfaces of those belts of the second group complementary to the pressure applying belts being provided with ridges and grooves thereon meshing with the grooves and ridges, respectively, on the pressure applying belts to thereby prevent movement of the corresponding portions of the blank transversely of the second group of carrier belts.

64. In a machine for making rectangular bed coverings, such as bed sheets or the like, from a continuous sheet of web material, said machine having means for drawing off from the web material a portion thereof to form a blank, means for severing said blank from the web, and a pair of sewing mechanisms disposed in substantially spaced relation to one of the longitudinal side edges of the blank thus formed and being spaced from each other a distance substantially the same as the end edges of the blank thus formed; the combination of an improved means to guide and advance the blank to the sewing mechanisms comprising a plurality of endless carrier belts forming substantially continuous top belt runs across and above portions of which the web material is drawn in forming said blank, pressure applying plates extending across and above said blank and normally spaced above certain of said top belt runs, means operable automatically upon said blank being formed for moving said pressure applying plates to press said blank adjacent to its end edges into engagement with said certain of said top belt runs to maintain traction between the blank and said certain top belt runs, means to fold hems on said blank over said plates, means operable automatically upon folding the hems to impart movement to said top belt runs for moving the blank with the folded hems toward the sewing mechanisms and transversely of the web, and means for operating said sewing mechanisms for sewing the hems.

65. In a machine for making rectangular bed coverings, such as bed sheets or the like, from a continuous sheet of web material, said machine having means for drawing off from the web material a portion thereof to form a blank, means for severing said blank from the web, and a pair of sewing mechanisms disposed in substantially spaced relation to one of the longitudinal side edges of the blank thus formed and being spaced from each other a distance substantially the same as the end edges of the blank thus formed; the combination of an improved means to guide and advance the blank to the sewing mechanisms comprising a plurality of endless carrier belts forming substantially continuous top belt runs across and above portions of which the web material is drawn in forming said blank, means operable automatically upon said blank being formed for folding hems on said blank, means operable automatically upon folding the hems to impart movement to said top belt runs for moving the blank with the folded hems toward the sewing mechanisms and transversely of the web, means positioned above portions of said top belt runs operable to press the entire unsewn part of the folded hems against said runs and prevent movement of the hems transversely of the top belt runs so as to guide the hems accurately to the sewing mechanisms, and means for operating said sewing mechanisms for sewing the hems.

66. In a machine for making rectangular bed coverings from rectangular blanks of web material, having a flat table-like support and means for successively depositing the rectangular blanks one at a time on said support; the combination of means to advance a blank on said support transversely of the longitudinal blank axis comprising a plurality of endless carrier belts forming continuous top belt runs extending transversely of the blank and with portions of the runs beneath the end edges of the blank when positioned on said support, pressure applying means operable to press the blank adjacent its ends into engagement with the top belt runs thereunder and to fold hems on the blank over said top belt runs, means to impart movement to the top belt runs for moving the blank with the folded hems, and means positioned above other portions of said top belt runs and operable to press the entire exposed part of the folded hems against said runs and prevent movement of the hems transversely of the top belt runs during movement of the blank with the folded hems.

67. A structure according to claim 66 having spaced longitudinally extending ridges and grooves on said top belt runs to aid in guiding the hems and preventing movement of the hems transversely of the top belt runs.

References Cited in the file of this patent

UNITED STATES PATENTS

| 1,394,244 | Adair et al. | Oct. 18, 1921 |
| 2,004,080 | Roby | June 4, 1935 |
| 2,053,257 | Anderson | Sept. 8, 1936 |
| 2,168,415 | Laukhuff | Aug. 8, 1939 |
| 2,411,637 | Ramage | Nov. 26, 1946 |
| 2,546,831 | Newell | Mar. 27, 1951 |
| 2,551,762 | Pfeiffer | May 8, 1951 |

FOREIGN PATENTS

| 523,454 | France | Apr. 21, 1921 |